US 6,749,653 B2

(12) United States Patent
Castro et al.

(10) Patent No.: US 6,749,653 B2
(45) Date of Patent: Jun. 15, 2004

(54) ABRASIVE PARTICLES CONTAINING SINTERED, POLYCRYSTALLINE ZIRCONIA

(75) Inventors: Darren T. Castro, Woodbury, MN (US); Vincent W. Nehring, Stillwater, MN (US); Anatoly Z. Rosenflanz, Maplewood, MN (US); Thomas E. Wood, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 26 days.

(21) Appl. No.: 10/081,404

(22) Filed: Feb. 21, 2002

(65) Prior Publication Data

US 2003/0172594 A1 Sep. 18, 2003

(51) Int. Cl.$^7$ .............................. B24D 3/00; B24D 17/00
(52) U.S. Cl. .............................. 51/309; 51/307; 51/308; 51/295; 51/297; 51/298; 451/28
(58) Field of Search .................. 51/307, 308, 309, 51/295, 297, 298; 501/103, 104, 105; 451/28

(56) References Cited

U.S. PATENT DOCUMENTS

| | | |
|---|---|---|
| 1,910,444 A | 5/1933 | Nicholson |
| 2,958,593 A | 11/1960 | Hoover et al. |
| 3,041,156 A | 6/1962 | Rowse et al. |
| 3,454,385 A | 7/1969 | Amero |
| 3,607,162 A | 9/1971 | Bockstiegel et al. |
| 3,781,172 A | 12/1973 | Pett et al. |
| 3,881,282 A | 5/1975 | Watson |
| 3,891,408 A | 6/1975 | Rowse et al. |
| 3,893,826 A | 7/1975 | Quinan et al. |
| 3,909,991 A | 10/1975 | Coes, Jr. |
| 3,916,585 A | 11/1975 | Barks |
| 3,996,702 A | 12/1976 | Leahy |

(List continued on next page.)

FOREIGN PATENT DOCUMENTS

| | | |
|---|---|---|
| CA | 1113727 | 12/1981 |
| EP | 0 024 099 B1 | 1/1984 |
| EP | 0 291 029 B1 | 11/1988 |
| EP | 0 444 824 B1 | 9/1991 |
| EP | 0 480 678 A2 | 4/1992 |
| EP | 0 567 136 | 10/1993 |
| EP | 0 578 453 | 1/1994 |
| EP | 0 705 803 | 4/1996 |
| EP | 0 722 919 A1 | 7/1996 |
| GB | 2 011 880 A | 7/1979 |
| GB | 2 062 666 A | 5/1981 |
| JP | 58-009808 | 1/1983 |
| JP | 59 227726 | 12/1984 |
| JP | 7-215708 | 8/1995 |
| JP | 7-286166 | 10/1995 |
| SU | 1 768 561 | 10/1991 |
| WO | 94/07969 | 4/1994 |
| WO | 95/03370 | 2/1995 |
| WO | 96/18588 | 6/1996 |
| WO | WO 01/23321 | 4/2001 |

OTHER PUBLICATIONS

Hannink, Richard H. J., et al., "Transformation Toughening in Zirconia–Containing Ceramics", Journal of the American Ceramic Society, vol. 83, No. 3, Mar. 2000, pp. 461–466.

"CEH Abstract", Thiers, Eugene et al., CIN, [retrieved from the internet Sep. 7, 1999] URL <http://www–cmrc.sri.com/CIN/JulyAugust96/Article13.html>; One page, no date.

(List continued on next page.)

*Primary Examiner*—Michael Marcheschi
(74) *Attorney, Agent, or Firm*—Richard Francis; Gregory D. Allen

(57) ABSTRACT

Abrasive particles and methods of making abrasive particles are disclosed. The abrasive particles may be incorporated into a variety of abrasive articles, including bonded abrasives, coated abrasives, nonwoven abrasives, and abrasive brushes.

35 Claims, 10 Drawing Sheets

U.S. PATENT DOCUMENTS

| | | |
|---|---|---|
| 4,049,397 A | 9/1977 | Bockstiegel et al. |
| 4,059,417 A | 11/1977 | Ilmaier et al. |
| 4,126,429 A | 11/1978 | Watson |
| 4,311,489 A | 1/1982 | Kressner |
| 4,314,827 A | 2/1982 | Leitheiser et al. |
| RE31,620 E | 7/1984 | Leahy |
| 4,457,767 A | 7/1984 | Poon et al. |
| 4,518,397 A | 5/1985 | Leitheiser et al. |
| 4,543,107 A | 9/1985 | Rue |
| 4,588,419 A | 5/1986 | Caul et al. |
| 4,623,364 A | 11/1986 | Cottringer et al. |
| 4,652,275 A | 3/1987 | Bloecher et al. |
| 4,659,680 A | 4/1987 | Guile |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,138 A | 6/1988 | Tumey et al. |
| 4,755,365 A | 7/1988 | Funahashi et al. |
| 4,770,671 A | 9/1988 | Monroe et al. |
| 4,799,939 A | 1/1989 | Bloecher et al. |
| 4,800,685 A | 1/1989 | Haynes et al. |
| 4,829,028 A | 5/1989 | Seki et al. |
| 4,881,951 A | 11/1989 | Monroe et al. |
| 4,885,266 A | 12/1989 | Hughan et al. |
| 4,898,597 A | 2/1990 | Hay et al. |
| 4,937,212 A | 6/1990 | Funkenbusch et al. |
| 4,960,441 A | 10/1990 | Pellow et al. |
| 4,997,461 A | 3/1991 | Markhoff-Matheny et al. |
| 5,009,675 A | 4/1991 | Kunz et al. |
| 5,011,508 A | 4/1991 | Wald et al. |
| 5,037,453 A | 8/1991 | Narayanan et al. |
| 5,042,991 A | 8/1991 | Kunz et al. |
| 5,085,671 A | 2/1992 | Martin et al. |
| 5,090,968 A | 2/1992 | Pellow |
| 5,094,672 A | 3/1992 | Giles, Jr. et al. |
| 5,110,322 A | 5/1992 | Narayanan et al. |
| 5,118,326 A | 6/1992 | Lee et al. |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,177,040 A | 1/1993 | Tamamaki et al. |
| 5,201,916 A | 4/1993 | Berg et al. |
| 5,203,884 A | 4/1993 | Buchanan et al. |
| 5,203,886 A | 4/1993 | Sheldon et al. |
| 5,227,104 A | 7/1993 | Bauer |
| 5,248,318 A | 9/1993 | Tamamki et al. |
| 5,259,147 A | 11/1993 | Falz et al. |
| 5,282,875 A | 2/1994 | Wood et al. |
| 5,312,789 A | 5/1994 | Wood |
| 5,316,855 A | 5/1994 | Wang et al. |
| 5,366,523 A | 11/1994 | Rowenhorst et al. |
| 5,378,251 A | 1/1995 | Culler et al. |
| 5,383,945 A | 1/1995 | Cottringer et al. |
| 5,395,407 A | 3/1995 | Cottringer et al. |
| 5,409,415 A * | 4/1995 | Kawanami et al. ........... 451/39 |
| 5,411,690 A | 5/1995 | Ghosh et al. |
| 5,417,726 A | 5/1995 | Stout et al. |
| 5,427,595 A | 6/1995 | Pihl et al. |
| 5,429,647 A | 7/1995 | Larmie |
| 5,436,063 A | 7/1995 | Follett et al. |
| 5,443,906 A | 8/1995 | Pihl et al. |
| 5,489,204 A | 2/1996 | Conwell et al. |
| 5,496,386 A | 3/1996 | Broberg et al. |
| 5,498,269 A | 3/1996 | Larmie |
| 5,514,631 A | 5/1996 | Cottringer et al. |
| 5,520,711 A | 5/1996 | Helmin |
| 5,525,135 A | 6/1996 | Moltgen et al. |
| 5,547,479 A | 8/1996 | Conwell et al. |
| 5,549,962 A | 8/1996 | Holmes et al. |
| 5,551,963 A | 9/1996 | Larmie |
| 5,593,467 A | 1/1997 | Monroe |
| 5,609,706 A | 3/1997 | Benedict et al. |
| 5,651,801 A | 7/1997 | Monroe et al. |
| 5,653,775 A | 8/1997 | Plovnick et al. |
| 5,665,127 A | 9/1997 | Moltgen et al. |
| 5,679,067 A | 10/1997 | Johnson et al. |
| 5,725,162 A | 3/1998 | Garg et al. |
| 5,728,636 A | 3/1998 | Nawa et al. |
| 5,738,696 A | 4/1998 | Wu et al. |
| 5,863,308 A | 1/1999 | Qi et al. |
| 5,863,850 A | 1/1999 | Nawa et al. |
| 5,877,105 A | 3/1999 | Iwai et al. |
| 5,903,951 A | 5/1999 | Ionta et al. |
| 5,954,844 A | 9/1999 | Law et al. |
| 5,958,311 A | 9/1999 | Ghosh et al. |
| 5,961,674 A | 10/1999 | Gagliardi et al. |
| 5,975,988 A | 11/1999 | Christianson |
| 6,069,103 A | 5/2000 | Kwon |
| 6,123,744 A | 9/2000 | Huzinec |

OTHER PUBLICATIONS

"Applications and Preparations of Zirconia and Stabilized Zirconia Powders", Stanford Materials Company, San Mateo, California [on line]; [retrieved from internet Sep. 10, 1999] URL <http://www.stanfordmaterials.com/zr.html>; four pages, no date.

Druschitz, Alan P., "Processing Zirconia by Sintering/Hot Isostatic Pressing", Advanced Ceramic Materials, vol. 3, No. 3, 1988, no month.

Druschitz, Alan P. et al., "Hot Isostatic Pressing of a Presintered Yttria–Stabilized Zirconia Ceramic", Journal of American Ceramic Society, 72 [9] 1591–97 (1989), no month.

Jang, Byung–Koog, et al., "Fabrication and Microstructure of $Al_2O_3$ Matrix Composite by In–situ Reaction in the $Al_2O_3$–$La_2O_3$ System", Journal of the Ceramic Society of Japan, 106[8] 739–743 (1998), no month.

Miura, M., et al., "Formation of plate–like lanthanum–β–Aluminate crystal in Ce–TZP matrix", Chapman & Hall, pp. 262–268, (1994), no month.

Suzuki, Yashikazu, et al., "In Situ Formation of Hexaferrite Magnets within a 3Y–TZP Matrix: $La_2O_3$–NzO–$Fe_2O_3$ and BaO–$Fe_2O_3$ Systems", Journal American Ceramic Society 83 [6] 1346–50 (2000), no month.

Komarneni, Sridhar, "Some Significant Advances in Sol–Gel Processing of Dense Structural Ceramics", Journal of Sol–Gel Science and Technology 6 (2), 127–138 (1996), no month.

ASTM Test Method E384 Test Methods for Microhardness of Materials (1990), no month.

"Vickers Indentation Fracture Toughness Test, Part 1," Mater. Sci. & Tech., 5[9] (1989), no month.

Chen Z–H et al., "Microstructures of Laser–Treated $Al_2O_3$–$ZRO_2$–$CEO_2$ Composites", Structural Materials: Properties, Microstructure and Processing, Lausanne, Ch, vol. A196, No. 1/2, Jun. 15, 1995, pp. 253–260.

* cited by examiner

- ● Example 3
- ○ Example 2
- ■ Example 14
- □ Comp. Example A

ABRASIVE PARTICLES CONTAINING SINTERED, POLYCRYSTALLINE ZIRCONIA

FIELD OF THE INVENTION

The present invention relates to abrasive particles and methods of making the same. The abrasive particles may be incorporated into a variety of abrasive articles, including bonded abrasives, coated abrasives, nonwoven abrasives, and abrasive brushes.

BACKGROUND OF THE INVENTION

There are a variety of abrasive particles (e.g., diamond particles, cubic boron nitride particles, fused abrasive particles (including fused alumina, heat treated fused alumina, fused alumina zirconia, and the like), and sintered, ceramic abrasive particles (including sol-gel-derived abrasive particles) known in the art. In some abrading applications, the abrasive particles are used in loose form or a slurry, while in others the particles are incorporated into abrasive products (including: bonded abrasives, coated abrasives and nonwoven abrasives).

Bonded abrasives typically comprise a plurality of abrasive particles bonded together to form a shaped mass. Coated abrasives typically comprise a plurality of abrasive particles bonded to a backing. Nonwoven abrasives typically comprise a plurality of abrasive particles bonded onto and into a lofty, porous, nonwoven substrate. Typical bonding materials for bonded abrasives are organic binders, vitreous binders, and metallic binders, while for coated and nonwoven abrasives they are typically organic binders. Criteria used in selecting abrasive particles used for a particular abrading application typically include: abrading life, rate of cut, substrate surface finish, grinding efficiency, and product cost.

The abrasive industry and their customers are continually looking for ways to improve one or more of these abrading criteria. For the past one hundred years or so, fused alumina abrasive particles have been widely utilized. Fused alumina abrasive particles are typically made by charging a furnace with an alumina source (such as aluminum ore or bauxite), as well as other desired additives, heating the material above its melting point, cooling the melt to provide a solidified mass, crushing the solidified mass into particles, and then screening and grading the particles to provide the desired abrasive particle size distribution. Over the past thirty years or so, there have been numerous developments concerning abrasive particles, including fused alumina zirconia abrasive particles (see, e.g., U.S. Pat. No. 3,891,408 (Rowse et al.); U.S. Pat. No. 3,781,172 (Pett et al.); U.S. Pat. No. 3,893,826 (Quinan et al.); U.S. Pat. No. 4,059,417 (Ilmaier et al.); U.S. Pat. No. 4,126,429 (Watson); U.S. Pat. No. 4,457,767 (Poon et al.); U.S. Pat. No. 5,143,522 (Gibson et al.); and U.S. Pat. No. 5,248,318 (Tamamki et al.)) and fused zirconia abrasives particles (see, e.g., U.S. Pat. No. 3,996,702 (Leahy) and Reissued U.S. Pat. No. Re 31,620 (Leahy)).

Although fused alpha alumina abrasive particles and fused alumina-zirconia abrasive particles are still widely used in abrading applications (including those utilizing coated and bonded abrasive products), the premier abrasive particles for many abrading applications since about the mid-1980's are sol-gel-derived alpha alumina particles (also referred to as sintered, ceramic alpha alumina particles). (See e.g., U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 4,960,441 (Pellow et al.), U.S. Pat. No. 5,139,978 (Wood), U.S. Pat. No. 5,201,916 (Berg et al.), U.S. Pat. No. 5,366,523 (Rowenhorst et al.), U.S. Pat. No. 5,429,647 (Larmie), U.S. Pat. No. 5,547,479 (Conwell et al.), U.S. Pat. No. 5,498,269 (Larmie), U.S. Pat. No. 5,551,963 (Larmie), and U.S. Pat. No. 5,725,162 (Garg et al.)). Optionally, the sol-gel-derived alpha alumina may contain one or more secondary phases, including zirconia, up to about 60 percent by weight of the abrasive particle. (See e.g., JP 07-215708, "Complex Compounds of Hydrazine Used to Prepare Solid Solution Powders, Materials, Alumina-Zirconia Ceramics, and Alumina-Zirconia Abrasive Grains", August 1995).

Traditionally, it has been thought that in order to obtain acceptable cut rates for a given workpiece, abrasive particles having a relatively high hardness and toughness must be used in an abrasive article. Hardness relates to an abrasive particle's ability to penetrate a workpiece, such as a metal, and cause chip removal from the workpiece. Toughness relates to an abrasive particle's ability to withstand forces during an abrading process such that the abrasive particle does not fracture. Conventional wisdom in the abrasives industry has placed a significant emphasis on the hardness of an abrasive particle. For example, Milton Shaw, in his text "Principles of Abrasive Processing," Oxford University Press, New York, N.Y. (1996), states, "Since the relative hardness of the contacting bodies is of prime importance in determining abrasive wear, abrasives of high hardness are desired." Furthermore, for example, Stephen Krar and Ernest Ratterman, in their text "Superabrasives: Grinding and Machining with CBN and Diamond," Glencoe/McGraw-Hill, Westerville, Ohio (1990), state, "The hardness property is very important for an abrasive. The harder the abrasive with respect to the workpiece, the more easily it can cut." The two major conventional abrasives, alumina and silicon carbide, have hardness values of about 16–22 GPa and 25–30 GPa, respectively. The two major superabrasives, diamond and cubic boron nitride, have hardness values well in excess of 40 GPa. Thus, softer abrasive materials, such as zirconia (hardness values of about 12–13 GPa), with hardness values below those of these common abrasives, have traditionally not generally been considered very useful in metal removal applications and were believed unable to provide acceptable cut rates on most workpieces.

There is a continuous effort to improve the abrading characteristics of abrasive particles. Properties such as abrasive particle hardness and toughness, cost of producing, and performance characteristics continue to be taken into account when selecting and developing given abrasive particles. Typically, the most important performance criteria when selecting a given abrasive particle and abrasive article is the amount of work that a given abrasive particle and article containing the same can do prior to failure.

What is needed in the art is an abrasive particle that provides improved work performance and lifetime over conventional abrasive particles on one or more given workpieces. Further, what is needed in the art is an abrasive article, which provides exceptional abrading performance as measured by amount and rate of workpiece abraded.

SUMMARY OF THE INVENTION

The present invention provides abrasive particles comprising zirconia. In one aspect, the present invention provides abrasive particles comprising at least 60 (65, 70, 75, 80, 85, 90, 95, 96, 97, 98, 99, or even 100) parts by weight of sintered polycrystalline zirconia based on the total weight of the abrasive particle. For certain abrasive particles according to the present invention, the zirconia is at least partially stabilized.

In another aspect, the present invention provides a plurality of particles having a particle size distribution ranging from fine to coarse, wherein at least a portion of the plurality of particles are abrasive particles according to the present invention.

In another aspect, the present invention provides a method of making abrasive particles containing at least 60 percent by weight of sintered, polycrystalline zirconia, based on the total weight of the abrasive particle. One method of making abrasive particles of the present invention comprises the following steps: (1) preparing an abrasive particle composition comprising at least 60 percent by weight of polycrystalline zirconia, based on the total weight of the abrasive particle composition; (2) sintering the abrasive particle composition to form one or more sintered articles; and (3) converting the one or more sintered articles to sintered, polycrystalline abrasive particles, wherein the abrasive particle composition is processed at one or more processing temperatures in the above steps, and wherein the one or more processing temperatures is less than a melting temperature of the abrasive particle composition.

In yet another aspect, the present invention provides a method of abrading a surface, wherein the method includes the step of contacting at least one abrasive particle comprising at least 60 percent by weight of sintered, polycrystalline zirconia, based on a total weight of the abrasive particle, with a surface of a workpiece.

Abrasive particles according to the present invention can be incorporated, for example, into abrasive articles, such as coated abrasive products, bonded abrasive products, nonwoven abrasive products, and abrasive brushes.

Embodiments of the present invention include abrasive particles having exceptional abrading properties, alone or when incorporated into an abrasive article, even though the abrasive particles having a relatively low hardness. In another aspect, embodiments of the present invention include abrasive particles having exceptional strength and toughness.

These and other features and advantages of the present invention will become apparent after a review of the following detailed description of the disclosed embodiments and the appended claims.

DETAILED DESCRIPTION OF THE INVENTION

Figure 1:
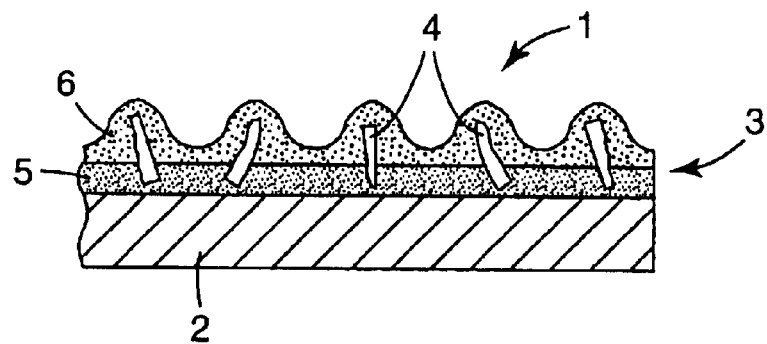
FIG. 1 is a fragmentary cross-sectional schematic view of a coated abrasive article including abrasive particles according to the present invention.

A number of terms are used throughout the description and claims of the present invention. Definitions of certain terms are given below.

Definitions

As used herein, the phrase "partially stabilized zirconia" (PSZ) (sometimes also referred to herein as "tetragonal zirconia polycrystal" (TZP)) means the zirconia contains a sufficient amount of stabilizing metal oxide(s) such that a portion of the zirconia is in a tetragonal phase configuration along with a portion that is in a cubic phase configuration; and may or may not also include a minor portion of zirconia in a monoclinic phase configuration (typically less than about 20 percent by volume).

As used herein, the phrase "fully stabilized" refers to a zirconia that contains a sufficient amount of stabilizing metal oxide(s) such that the majority of all of the zirconia is in a cubic phase configuration.

As used herein, the term "sintering" refers to a process of heating at a temperature below the melting temperature of the material being heated to provide densification and crystallite growth to provide a tough, hard, and chemically resistant ceramic material. "Sintered" abrasive particles are not made by a fusion process wherein heating is carried out at a temperature above the melting temperature of the material being heated.

As used herein, the term "particle size" refers to the longest dimension of a particle or particle.

As used herein, the term "hardness" refers to an abrasive particle's ability to penetrate a workpiece, such as a metal, and cause chip removal from the workpiece. Hardness, as used in the present invention, is measured according to the guidelines stated in ASTM Test Method E384 Test Methods for Microhardness of Materials (1991), (the disclosure of which is incorporated herein by reference). This is discussed below in Example 3.

As used herein, "toughness" refers to an abrasive particle's ability to withstand forces during an abrading process such that the abrasive particle does not shatter. Toughness is measured as described in "Vickers Indentation Fracture Toughness Test, Part 1," *Mater. Sci. & Tech.*, 5 [9] (1989) (the disclosure of which is incorporated herein by reference), discussed below in Example 19.

I. Abrasive Particles of the Present Invention

A. Chemical Composition of the Abrasive Particles

Embodiments of the present invention include abrasive particles comprising sintered, polycrystalline zirconia, wherein the zirconia is at least partially stabilized. The partially stabilized zirconia (PSZ) may be stabilized, for example, by the addition of one or more stabilizing metal oxides into the zirconia structure. The amount of stabilizing metal oxides incorporated into the zirconia structure may vary, for example, depending on a number of factors including, but not limited to, the stabilizing metal oxide used, and the degree of "stabilization" desired.

Typically, PSZ abrasive particles according to the present invention comprise one or more stabilizing metal oxides in an amount of up to about 14.0 percent by weight, based on the total weight of the abrasive particle. In one desired embodiment of the present invention, PSZ/TZP abrasive particles comprise from about 91.0 to about 97.0 percent by weight of sintered, polycrystalline zirconia, and from about 9.0 to about 3.0 percent by weight of one or more stabilizing metal oxides, based on the total weight of the respective abrasive particles.

The choice of stabilizing metal oxide may depend, for example, on a number of factors including, but not limited to, the desired properties of the abrasive particle, and the end use of the abrasive particle. Suitable stabilizing metal oxides for use in the present invention include, but are not limited to, calcium oxide, magnesium oxide, cerium oxide, yttrium oxide, gadolinium oxide, ytterbium oxide, neodymium oxide, terbium oxide, praseodymium oxide, dysprosium oxide, holmium oxide, samarium oxide, scandium oxide, lanthanum oxide, promethium oxide, europium oxide, erbium oxide, thulium oxide, lutetium oxide, titanium oxide, germanium oxide, iron oxide, copper oxide, zinc oxide, yttrium-niobium oxide, yttrium-tantalum oxide, and combinations thereof.

Desirably, PSZ abrasive particles according to the present invention are at least partially stabilized by one or more stabilizing metal oxides selected from calcium oxide, magnesium oxide, cerium oxide, yttrium oxide, scandium oxide, and combinations thereof. More desirably, PSZ abrasive particles according to the present invention are at least partially stabilized by one or more stabilizing metal oxides selected from calcium oxide, magnesium oxide, cerium oxide, yttrium oxide, and combinations thereof. Even more desirably, PSZ abrasive particles according to the present invention are at least partially stabilized by a stabilizing metal oxide in the form of yttrium oxide, cerium oxide, and magnesium oxide.

As discussed above, the amount of stabilizing metal oxide used to at least partially stabilize PSZ abrasive particles according to the present invention may vary, for example, depending on the particular stabilizing metal oxide used. For example, a desired amount of stabilizing calcium oxide that may be used to at least partially stabilize PSZ abrasive particles according to the present invention is from about 5 to about 9 mole percent, based on the total moles of abrasive particle components. A desired amount of stabilizing magnesium oxide that may be used to at least partially stabilize PSZ abrasive particles according to the present invention is, for example, from about 6 to about 10 mole percent, based on the total moles of abrasive particle components. A desired amount of stabilizing cerium oxide that may be used to at least partially stabilize PSZ abrasive particles according to the present invention is, for example, from about 8 to about 12 mole percent, based on the total moles of abrasive particle components. A desired amount of stabilizing yttrium oxide that may be used to at least partially stabilize PSZ abrasive particles according to the present invention is, for example, from about 2 to about 5 mole percent, based on the total moles of abrasive particle components.

In a further embodiment of the present invention, abrasive particles according to the present invention may comprise up to 40 percent by weight of one or more additional metal oxides, based on the total weight of the abrasive particle. These metal oxides may alter the physical properties of the resulting abrasive grain and/or stabilize the zirconia. As used herein, the term "one or more additional metal oxides" refers to metal oxides, which may be used in combination with the zirconia, but are not being used to provide stabilization to the zirconia. In one embodiment according to the present invention, abrasive particles according to the present invention comprise from 0 to 40 percent by weight of one or more additional metal oxides, based on the total weight of the abrasive particle. Desirably, the abrasive particles according to the present invention comprise from 0 to about 2 (0 to about 7, 0 to about 12, 0 to about 17, 0 to about 22, 0 to about 27, 0 to about 32, or 0 to about 37) percent by weight of one or more additional metal oxides, based on the total weight of the abrasive particle. More desirably, the abrasive particles according to the present invention comprise from about 17 to about 22 percent by weight of one or more additional metal oxides, based on the total weight of the abrasive particle.

The choice of additional (non-stabilizing) metal oxides for use in the abrasive particles of the present invention depends, for example, on a number of factors including, but not limited to, the desired properties of the abrasive particle, the desired cost of the abrasive particle, and the end use of the abrasive particle. Suitable additional metal oxides include, but are not limited to, aluminum oxide, hafnium oxide, silicon oxide, iron oxide, calcium oxide, sodium oxide, magnesium oxide, lanthanum oxide, yttrium oxide, titanium oxide, nickel oxide, and combinations thereof. Desirably, abrasive particles according to the present invention comprise one or more additional metal oxides selected from aluminum oxide, hafnium oxide, yttrium oxide, silicon oxide, iron oxide, magnesium oxide, titanium oxide, nickel oxide, rare earth metal oxides and combinations thereof. More desirably, abrasive particles according to the present invention further comprise aluminum oxide.

The amount and type of secondary metal oxide may be selected to modify a physical property(s) of the resulting zirconia abrasive particle. For example, the addition of alumina may increase the overall hardness of the abrasive particle. Similarly, the amount and type of secondary metal oxide may alter the fracture characteristics and/or grinding characteristics of the resulting zirconia abrasive particle.

Abrasive particles according to the present invention may contain reaction products of metal oxides. For example, alumina may react with one or more rare-earth oxides and/or other metal oxides (e.g., oxides of Mn, Co, Y, Fe, Ti, Mn, V, Cr, Co, Ni, Cu, Mg, Ca, Sr, La, Ce, Pr, Nd, Pm, Sm, and Eu) to form a distinct compound. Examples of such compounds may include: $LaAl_{11}O_{18}$, $GdAlO_3$, $CeAlO_3$, $EuAlO_3$, $NdAlO_3$, $PrAlO_3$, $Dy_3Al_5O_{12}$, $Er_3Al_5O_{12}$, and $Y_3Al_5O_{12}$. Morphological characteristics (e.g., aspect ratio, width) of third phases of crystals and the amount of such phases may impact fracture/grinding characteristics of the resulting abrasive particle.

In one embodiment of the present invention, abrasive particles according to the present invention comprise at least 60 percent by weight of sintered, polycrystalline zirconia, up to about 14 percent by weight of one or more stabilizing metal oxides, and from 0 to about 40 weight percent of one or more additional metal oxides. Desirably, abrasive particles according to the present invention comprise at least 60 to about 97 percent by weight of the sintered, polycrystalline zirconia, from about 3 to about 9 percent by weight of one or more stabilizing metal oxides, and from 0 to about 37 weight percent of one or more additional metal oxides. More desirably, abrasive particles according to the present invention comprise at least 60 to about 87 percent by weight of the sintered, polycrystalline zirconia, from about 3 to about 9 percent by weight of one or more stabilizing metal oxides, and from 10 to about 37 weight percent of one or more additional metal oxides. Even more desirably, abrasive particles according to the present invention comprise at least 60 to about 77 percent by weight of the sintered, polycrystalline zirconia, from about 3 to about 9 percent by weight of one or more stabilizing metal oxides, and from 20 to about 37 weight percent of one or more additional metal oxides.

In one desired embodiment of the present invention, abrasive particles according to the present invention comprise at least 60 to about 97 percent by weight of the sintered, polycrystalline zirconia, from about 3 to about 8 percent by weight of stabilizing yttrium oxide, and from 0 to about 37 weight percent of aluminum oxide.

B. Physical Properties of the Abrasive Particles

The degree of partially stabilized zirconia or the amount of tetragonal zirconia and/or cubic zirconia in abrasive particles according to the present invention may vary, for example, depending on the amount and type of stabilizing metal oxide used in the abrasive particle composition. Desirably, abrasive particles according to the present invention are partially stabilized, such that at least 50 (60, 70, 80, or even 90) percent by volume of the zirconia has a tetragonal crystalline structure.

Abrasive particles according to the present invention typically have an average crystal size of less than about 5 micrometers. Desirably, abrasive particles according to the present invention have an average crystal size of less than about 3 micrometers. More desirably, abrasive particles according to the present invention have an average crystal size of from about 0.3 to about 2.5 micrometers. Even more desirably, abrasive particles according to the present invention have an average crystal size of from about 0.3 to about 1.5 micrometers.

The longest dimension of the abrasive particles according to the present invention is typically at least about 10 micrometers. Abrasive particles described herein can be readily made with a length of greater than about 5 micrometers, and larger abrasive particle (e.g., greater than about 1000 micrometers or even greater than about 5000, 10,000, or even 25,000 micrometers) can also be readily made. Generally, the preferred abrasive particle has a length in the range from about 50 to about 5000 micrometers (typically in the range from about 100 to about 3000 micrometers), although other sizes are also useful, and may even be preferred for certain applications. In another aspect, abrasive particles according to the present invention typically have an aspect ratio of at least 1.2:1, preferably, at least 1.51, and more preferably, at least 2.0:1 and even 2.5:1.

The specific density of abrasive particles according to the present invention may vary, for example, depending on a number of factors including, but not limited to, chemical composition of the abrasive particles, and processing conditions. Desirably, the specific density of abrasive particles according to the present invention is greater than 85% (90%, 95%, 98%, or even 98.5%) of the theoretical density.

Certain abrasive particles according to the present invention have an average hardness (i.e., resistance to deformation; also referred to as "microhardness") of at least 8 GPa; desirably, at least 10 GPa; more desirably, at least 12 GPa; and even more desirably, at least 13 GPa, at least 14 GPa, or even at least 16 GPa.

In another aspect, certain abrasive particles according to the present invention typically have an average toughness (i.e., resistance to fracture) of at least 4 MPa $m^{1/2}$; desirably at least 5 MPa $m^{1/2}$; more desirably at least 6 MPa $m^{1/2}$; and even more desirably, at least 7 MPa $m^{1/2}$, at least 8 MPa $m^{1/2}$, or even at least 10 MPa $m^{1/2}$.

II. Methods of Making Abrasive Particles of the Present Invention

Sources of zirconia for making abrasive particles according to the present invention include commercially available, and include powders and precursor materials. Sources of $ZrO_2$ commonly also include other metal oxides such as $HfO_2$. Desirably, the zirconia is in powder form and contains less than about 2 percent by weight of impurities such as $HfO_2$, $Al_2O_3$, $SiO_2$, $Fe_2O_3$, CaO, $Na_2O$, and other metal oxides. More desirably, the zirconia contains less than about 1 percent by weight of the above-noted impurities. Suitable zirconia for use in the present invention includes, but is not limited to, zirconia powder obtained under the trade designation "DK-1" from Zirconia Sales, Inc. of Marietta, Ga.; yttria-stabilized zirconia powder obtained under the trade designation "HSY 3.0" from Zirconia Sales, Inc.; magnesia-stabilized zirconia powder obtained under the trade designation "MSZ 8.0" from Zirconia Sales, Inc.; yttria-stabilized zirconia/alumina powder obtained under the trade designation "ATZ-80" from Zirconia Sales, Inc.; yttria-stabilized zirconia powder obtained under the trade designation "TZ-3Y" from Tosoh Ceramics Division of Bound Brook, N.J.; yttria-stabilized zirconia/alumina co-precipitated powder obtained under the trade designation "TZ-3Y20A" from Tosoh Ceramics; and ceria-stabilized zirconia powder obtained under the trade designation "CEZ 10" from Zirconia Sales, Inc.

Other zirconia sources include, but are not limited to, zirconia sols (available, for example, from Nyacol Nano Technologies of Ashland, Mass.), zirconium hydroxide (available, for example, from Southern Ionics of West Point, Miss.), zirconium acetate (available, for example, from Southern Ionics), and zirconium oxychloride (available, for example, from Stanford Materials Company of San Mateo, Calif.). Additional details regarding processing of colloidal zirconia-based materials can be found, for example, in U.S. Pat. No. 4,937,212 (Funhenbusch et al.), the disclosure of which is incorporated herein by reference. Other suitable materials for making abrasive particles according to the present invention may be apparent to one skilled in the art after review of the present disclosure. Sources of alumina and other additive oxides for making abrasive particles according to the present invention include commercially available powders and other precursor materials, such as alpha aluminum oxide powder, obtained under the trade designation "A-16SG" from Alcoa Industrial Chemicals of Bauxite, Ark.; trade designations "CERALOX APA" and "CERALOX HPA" from Condea Vista of Tucson, Ariz.; trade designations "BAIKALOX CR" and "BAIKALOX SM-8" from Baikowski International of Charlotte, N.C.; trade designation "AKP" from Sumitomo Chemical Co. of Tokyo, Japan; alumina sol-gel precursor boehmite (gamma-alumina monohydrate), obtained under the trade designation "DISPERAL" from Condea Chemical, Hamberg, Germany.

Typically, the abrasive particle composition components are mixed with a liquid medium, such as water, to form a dispersion or solution, which, in the case of a dispersion of powders, is then typically subjected to a milling step in order to deagglomerate the individual components and mix them together. The milling step typically takes place for up to about 60 hours. Once the composition components are sufficiently de-agglomerated (as needed) and mixed together, the liquid medium is removed (i.e., de-liquified). Alumina and other metal oxides may be incorporated into abrasive particles according to the present invention, for example, by introducing the same and/or precursors thereof after the mixing and deliquifying step (and even, for example, after calcining). For example, such oxides may be added via impregnation of porous $ZrO_2$ with solutions or dispersions comprising Al and other metal cation containing metal oxide precursors. For further detail on impregnation see, for example, U.S. Pat. No. 5,312,789 (Wood), the disclosure of which is incorporated herein by reference.

In general, techniques for de-liquifying (including drying) the composition (e.g., dispersion) are known in the art, including heating to promote evaporation of the liquid medium, or simply drying in air. The deliquifying step generally removes a significant portion of the liquid medium from the composition; however, there still may be a minor portion (e.g., about 10% or less by weight) of the liquid medium present in the dried composition.

One skilled in the art, after reviewing the disclosure herein, should be able to select other techniques for deliquifying the dispersion, as well as select appropriate conditions such as drying temperature(s), drying time(s), drying rate(s) (including the heating and/or cooling rate(s)), environment(s) (including relative humidity, pressure (i.e., atmospheric pressure or a pressure above or below the atmospheric pressure)), and/or the component(s) making up the deliquifying or drying atmosphere, other than those specifically provided herein. The more suitable deliquifying or drying conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the deliquifying technique (s), the drying temperature(s), the drying time(s), the drying rates(s), and the component(s) making up the deliquifying or drying atmosphere.

Alternatively, for example, the mixture may be converted into precursor particles prior to drying. This may occur, for example, if the mixture is processed into a desired grit shape and particle size distribution. For example, a dispersion or solution may be extruded into rods that are subsequently cut to the desired lengths and then dried. The final sintered abrasive rod may desirably have an aspect ratio ranging from about 1:1 to about 10:1, typically, in the range from 1.5:1 to about 5:1, or more desirably, about 2:1 to about 5:1. Further, the final sintered rod may be curved or straight.

Alternatively, for example, the mixture may be molded into a triangular shaped particle and then dried. Additional details concerning triangular shaped particles may be found in U.S. Pat. No. 5,201,916 (Berg et al.), the disclosure of which is incorporated herein by reference.

Following the deliquifying or drying step, the dried abrasive particle precursor may be subjected to a calcining or pre-sintering step. In general, techniques for calcining the deliquified material or ceramic precursor material, wherein essentially all the volatiles are removed, and the various components that were present in the dispersion are transformed into oxides, are known in the art. Such techniques include using a rotary or static furnace to heat deliquified dispersion at temperatures ranging from about 400–1000° C. (typically from about 450–800° C.) until the free water, and typically until at least about 90 wt % of any bound volatiles are removed. In some instances, it may be desirable to slowly heat the deliquified dispersion to a calcining temperature (e.g., heating the deliquified dispersion to 750° C. over a 6 hour period).

One skilled in the art, after reviewing the disclosure herein, may be able to select other techniques for calcining the deliquified dispersion, as well as select appropriate conditions such as calcining temperature(s), calcining time (s), calcining rate(s), (including the heating and/or cooling rate(s)), environment(s) (including relative humidity, pressure (i.e., atmospheric pressure or a pressure above or below the atmospheric pressure)), and/or the component(s) making up the calcining atmosphere, other than those specifically provided herein. More suitable calcining conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the calcining temperature(s), the calcining time (s), the calcining rates(s), and the component(s) making up the calcining atmosphere.

Calcining temperatures are typically less than 900° C. (more typically in the range from about 450° C. to about 800° C.). Desirably, the calcining temperatures are in the range from about 600° C. to about 700° C. It may, however, be desirable to utilize several different calcining conditions (including different temperatures) wherein, for example, the deliquified dispersion is partially calcined for a time at a temperature(s) below about 500° C., and then further calcined at a temperature(s) above about 600° C. Heating for the calcining step, which can be done, for example, using electrical resistance or gas, can be on a batch basis or on a continuous basis.

Following calcining or pre-sintering, the calcined or pre-sintered material is sintered. In general, techniques for sintering the calcined material, which include heating at a temperature effective for transforming monoclinic zirconia into tetragonal and/or cubic zirconia, causing any metal oxide precursors to either react with the zirconia or form metal oxide, and increasing the density of the ceramic material, are known in the art. The calcined material can be sintered, for example, by heating (e.g., using electrical resistance, microwave, plasma, laser, or gas combustion, on batch basis (e.g., using a static furnace) or a continuous basis (e.g., using a rotary kiln)) at temperatures ranging from about 1200° C. to about 1650° C. (typically, from about 1200° C. to about 1550° C., more typically, from about 1300° C. to about 1450° C., or even from about 1350° C. to about 1450° C.). The length of time, which the calcined material is exposed to the sintering temperature, depends, for example, on particle size, composition of the particles, and sintering temperature. Typically, sintering times range from a few seconds up to about 120 minutes (desirably, within about 3–60 minutes). Sintering is typically accomplished in an oxidizing atmosphere, although inert (e.g., argon or helium) or reducing atmospheres (e.g., hydrogen containing gas) may also be useful.

One skilled in the art, after reviewing the disclosure herein, may be able to select other techniques for sintering the calcined material, as well as select appropriate conditions such as sintering temperature(s), sintering time(s), sintering rate(s) (including the heating and/or cooling rate (s)), environment(s) (including relative humidity, pressure (i.e., atmospheric pressure or a pressure above (e.g., hot isostatic pressing)) or below the atmospheric pressure), and/or the component(s) making up the sintering atmosphere), other than those specifically provided herein. The more suitable sintering conditions may depend, for example, on one or more of the following: the particular dispersion (e.g., the percent solids of the dispersion, the components of the dispersion, the amounts, or relative amounts of the components of the dispersion, the particle sizes of the components of the dispersion, and/or the particle size distribution of the components of the dispersion), the sintering temperature(s), the sintering time(s), the sintering rates(s), and the component(s) making up the sintering atmosphere.

It may, however, be desirable to utilize several different sintering conditions (including different temperatures) wherein, for example, the calcined or ceramic precursor material may be partially sintered for a time at a temperature (s) below 1200° C., and then further sintered at a temperature(s) above 1350° C.

Additional details regarding sintering can be found, for example, in U.S. Pat. No. 4,314,827 (Leitheiser et al.), U.S. Pat. No. 5,489,204 (Conwell et al.), U.S. Pat. No. 5,653,775 (Plovnick et al.) and U.S. Pat. No. 5,725,162 (Garg et al.), the disclosures of which are incorporated herein by reference.

The resulting sintered material or even, for example, the calcined material (which after crushing or crushing and screening is sintered) may be reduced in size to a desired size. It should be noted that the abrasive particle material may be reduced in size prior to calcining and/or prior to sintering using the techniques described below. The resulting sintered material is typically larger in size than that desired for abrasive particles according to the present invention. The sintered material can be, and typically is, converted into smaller pieces using crushing and/or comminuting techniques known in the art, including roll crushing, canary milling, jaw crushing, hammer milling, ball milling, jet milling, impact crushing, and the like. In some instances, it is desired to have two or more crushing steps. For example, relatively large pieces or "chunks" of sintered abrasive material (e.g., a diameter greater than 5 cm) may be crushed in a first crushing step to form smaller pieces. Crushing of the larger chunks may be accomplished with a hammer mill, impact crusher, roll crusher or jaw crusher. The smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution.

Crushing may also occur before sintering or calcining. Material that is dried but unfired may be reduced in size by an explosive comminution process such as described in U.S. Pat. No. 5,725,162 (Garg et al.), the disclosure of which is incorporated herein by reference. Dried material may be fed into a furnace held at a temperature above which vaporizable components expand explosively, causing the particles to break apart. At certain elevated temperatures and residence times the heating may also be sufficient to form fully densified abrasive particles.

The shape of abrasive particles according to the present invention depends, for example, on the composition and/or microstructure of the abrasive particles, and the manner in which the abrasive material is crushed (i.e., the crushing technique used). The crushing technique may also be changed to achieve different desired shapes.

Abrasive particles according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, more typically from about 1 to about 2000 micrometers; desirably from about 5 to about 1500 micrometers, and more desirably from about 100 to about 1500 micrometers.

In a given particle size distribution, there will be a range of particle sizes, from coarse particles to fine particles. In the abrasive art this range is sometimes referred to as "coarse", "control", and "fine" fractions. Abrasive particles graded according to industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS 240, JIS280, JIS320, JIS360, JIS400, JIS400, JIS600, JIS800, JIS1000, JIS1500, JIS2500, JIS4000, JIS6000, JIS8000, and JIS 10,000.

After crushing and screening, for example, of calcined materials, there will typically be a multitude of different particle size distributions or grades. These multitudes of grades may not match a manufacturer's or supplier's needs at that particular time. To minimize inventory, it is possible to recycle the off-demand grades. The off-demand grades may be used, for example, as a raw material source for making abrasive particles according to the present invention.

It is also within the scope of the present invention to provide a surface coating on the abrasive particles according to the present invention. Surface coatings are known, for example, to improve the adhesion between the abrasive particles and a binder material in an abrasive article as described below. Such surface coatings are described, for example, in U.S. Pat. No. 1,910,444 (Nicholson), U.S. Pat. No. 3,041,156 (Rowse et al.), U.S. Pat. No. 4,997,461 (Markhoff-Matheny et al.), U.S. Pat. No. 5,009,675 (Kunz et al.), U.S. Pat. No. 5,042,991 (Kunz et al.), and U.S. Pat. No.

5,085,671 (Martin et al.), the disclosures of which are incorporated herein by reference. Further, in some instances, the addition of the coating improves the abrading characteristics of the abrasive particles. In another aspect, the surface coating may improve adhesion between the abrasive particle according to the invention and the binder.

Abrasive particles according to the present invention, prepared as described above, may be used alone or combined with other abrasive particles. Further, the abrasive particles according to the present invention may be incorporated into various abrasive products such as coated abrasives, bonded abrasives, nonwoven abrasives, and abrasive brushes.

III. Plurality of Abrasive Particles and Abrasive Particle Mixtures

Abrasive particles according to the present invention may be used alone or in combination with other abrasive particles to form abrasive articles as described below. When the abrasive particles are used in combination with other abrasive particles, it is desirable to have at least about 2 percent by weight, more desirably at least about 5 percent by weight, and even more desirably about 30–99 percent by weight, of the abrasive particles according to the present invention. In some instances, the abrasive particles according the present invention may be blended with other abrasive particles and/or diluent particles at a weight percent of between 5 to 75 percent by weight, about 25 to 75 percent by weight, about 40 to 60 percent by weight, or about 50/50 percent by weight (i.e., in equal amounts by weight).

Examples of suitable conventional abrasive particles for blending with the abrasive particles of the present invention include, but are not limited to, fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include, but are not limited to, marble, gypsum, flint, silica, iron oxide, aluminum silicate, glass (including glass bubbles and glass beads), alumina bubbles, alumina beads and diluent agglomerates. Abrasive particles according to the present invention can also be combined with one another or with other abrasive particles to form abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), the disclosures of which are incorporated herein by reference.

IV. Abrasive Articles Containing Abrasive Particles of the Present Invention

The abrasive particles according to the present invention may be used alone or in combination with other abrasive particles to produce conventional abrasive products, such as coated abrasive products, bonded abrasive products (including vitrified, resinoid, and metal bonded grinding wheels, cutoff wheels, mounted points, and honing stones), nonwoven abrasive products, and abrasive brushes. Typically, abrasive products (i.e., abrasive articles) include binder and abrasive particles, at least a portion of which are abrasive particles according to the present invention, secured within the abrasive product by the binder. Methods of making such abrasive products and using abrasive products are well known to those skilled in the art. Furthermore, abrasive particles according to the present invention may be used in abrasive applications that utilize loose abrasive particles, such as slurries of abrading compounds (e.g., polishing compounds), milling media, shot blast media, vibratory mill media, and the like.

Coated abrasive products generally include a backing, abrasive particles, and at least one binder to hold the abrasive particles onto the backing. The backing may be any suitable material including, but not limited to, cloth, polymeric film, fibre, woven fabric, nonwoven web, paper, or combinations thereof, or treated versions thereof. The binder can be any suitable binder, including an inorganic or organic binder (including thermally curable resins and radiation curable resins). The abrasive particles can be present in one or more layers of the coated abrasive product.

An example of a coated abrasive product is depicted in FIG. 1. Referring to this figure, coated abrasive product 1 has a backing (substrate) 2 and abrasive layer 3. Abrasive layer 3 includes abrasive particles according to the present invention 4 secured to a major surface of backing 2 by make coat 5 and size coat 6. In some instances, a supersize coat (not shown) is used.

Bonded abrasive products typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive products typically comprise about 3–50% by volume bond material, about 30–90% by volume abrasive particles (or abrasive particle blends), up to 50% by volume additives (including grinding aids), and up to 70% by volume pores, based on the total volume of the bonded abrasive product.

Figure 2:
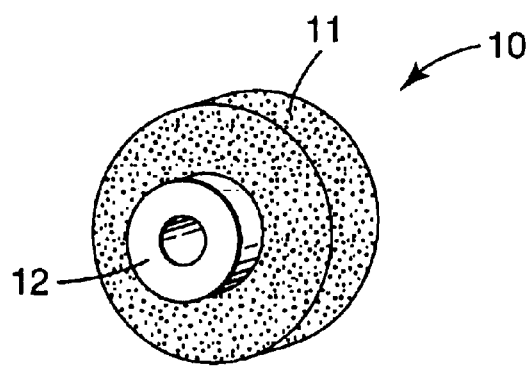
FIG. 2 is a perspective view of a grinding wheel including abrasive particles according to the present invention.

One desired abrasive article is a grinding wheel. Referring to FIG. 2, grinding wheel 10 is depicted, which includes abrasive particles according to the present invention 11, molded in a wheel and mounted on hub 12.

Figure 3:
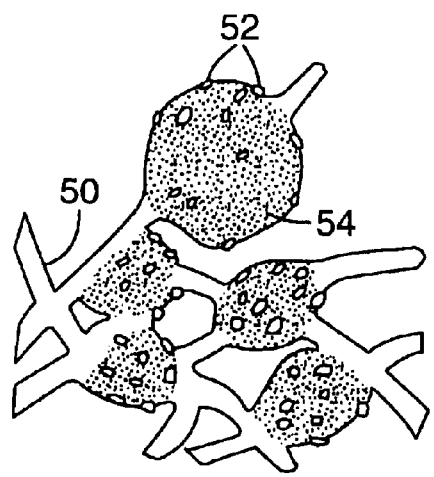
FIG. 3 is an enlarged schematic view of a nonwoven abrasive article including abrasive particles according to the present invention.

Nonwoven abrasive products typically include an open porous lofty polymer filament structure having abrasive particles according to the present invention distributed throughout the structure and adherently bonded therein by an organic binder. Examples of filaments include, but are not limited to, polyester fibers, polyamide fibers, and polyaramid fibers. In FIG. 3, a schematic depiction, enlarged about 100×, of a typical nonwoven abrasive product is provided. Such a nonwoven abrasive product comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427,595 (Pihl et al.); U.S. Pat. No. 5,443,906 (Pihl et al.); U.S. Pat. No. 5,679,067 (Johnson et al.); and U.S. Pat. No. 5,903,951 (Ionta et al.), the disclosures of all of which are incorporated herein by reference). Desirably, such brushes are made by injection molding a mixture of polymer and abrasive particles.

Suitable organic binders for making abrasive products include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant $\alpha,\beta$-unsaturated carbonyl groups, epoxy resins, acrylated urethane, acrylated epoxies, and combinations thereof. The binder and/or abrasive product may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.); U.S. Pat. No. 4,751,137 (Tumey et al.); and U.S. Pat. No. 5,436,063 (Follett et al.); the disclosures of all of which are incorporated herein by reference.

Binder materials may also contain filler materials or grinding aids, typically in the form of a particulate material. Typically, the particulate materials are inorganic materials. Examples of suitable fillers for use in the present invention include, but are not limited to, metal carbonates (e.g., calcium carbonate (e.g., chalk, calcite, marl, travertine, marble, and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive product. A grinding aid is a material that has a significant effect on the chemical and physical processes of abrading, which results in improved performance. Although not wanting to be bound by theory, it is believed that a grinding aid(s) (a) decreases the friction between the abrasive particles and the workpiece being abraded, (b) prevents the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, and/or (d) decreases the grinding forces.

Grinding aids encompass a wide variety of different materials and can be inorganic or organic based. Examples of chemical groups of grinding aids include, but are not limited to, waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroboate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect. One desired grinding aid is cryolite. Another more desired grinding aid is potassium tetrafluoroborate.

Grinding aids can be particularly useful in coated abrasive and bonded abrasive products. In coated abrasive products, grinding aid is typically used in the supersize coat, which is applied over the surface of the abrasive particles. Sometimes, however, the grinding aid is added to the size coat. Typically, the amount of grinding aid incorporated into coated abrasive products is about 50–300 $g/m^2$ (desirably, about 80–160 $g/m^2$). In vitrified bonded abrasive products, grinding aid is typically impregnated into the pores of the product.

The abrasive particles of the present invention may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive products can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christinason), the disclosures of which are incorporated herein by reference. Further details regarding bonded abrasive products can be found, for example, in U.S. Pat. No. 4,453,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,038,453 (Narayanan et al.), U.S. Pat. No. 5,110,332 (Narayanan et al.), and U.S. Pat. No. 5,863,308 (Qi et al.), the disclosures of which are incorporated herein by reference. Further, details regarding vitreous bonded abrasives can be found, for example, in U.S. Pat. No. 4,543,107 (Rue), U.S. Pat. No. 4,898,597 (Hay), U.S. Pat. No. 4,997,461 (Markhoff-Matheny et al.), U.S. Pat. No. 5,094,672 (Giles et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No. 5,863,308 (Qi), the disclosures of which are incorporated herein by reference. Further details regarding nonwoven abrasive products can be found, for example, in U.S. Pat. No. 2,958,593 (Hoover et al.), the disclosure of which is incorporated herein by reference.

V. Methods of Abrading Using Abrasive Particles of the Present Invention

Methods for abrading with abrasive particles according to the present invention range, for example, from snagging (i.e., high pressure high stock removal) to polishing (e.g., polishing medical implants with coated abrasive belts), wherein the latter is typically done with finer grades (e.g., less ANSI 220 and finer) of abrasive particles. Abrasive particles according to the present invention may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include, but are not limited to, water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be used to abrade workpieces such as aluminum metal, carbon steels, mild steels, tool steels, stainless steel, hardened steel, titanium, glass, ceramics, wood, wood-like materials, paint, painted surfaces, organic coated surfaces and the like. The applied force during abrading typically ranges from about 1 to about 100 kilograms.

In one embodiment of the present invention, the abrasive particles of the present invention are particularly useful for abrading low carbon steel metals, such as 1008, 1012, or 1018 mild steel or other lower hardness metals, such as aluminum. It has been determined that the abrasive particles of the present invention perform exceptionally well when abrading low carbon steel using a coarser grade size under higher applied loads. Two desired coarser grade sizes are Grade 24 and Grade 36. Desired applied loads are greater than about 10 kilograms.

EXAMPLES

This invention is further illustrated by the following examples, but the particular materials and amounts thereof recited in these examples, as well as other conditions and details, should not be construed to unduly limit this invention. Various modifications and alterations of the present invention will become apparent to those skilled in the art. All parts and percentages are by weight unless otherwise indicated.

Example 1

A polyethylene bottle (1000 ml, 8.9 cm diameter) was charged with 823.8 grams of yttria-stabilized zirconia powder (obtained under the trade designation "HSY 3.0" (nominal composition of 94 wt % $ZrO_2$ (+$HfO_2$), and 5.4 wt % $Y_2O_3$, with the balance being comprised of impurities such as $Al_2O_3$, $SiO_2$, $Fe_2O_3$, CaO, and $Na_2O$) from Zirconia Sales, Inc. of Marietta, Ga.), 3.0 grams of ammonium hydrogen citrate powder (catalog #24,756-1; obtained from Aldrich Chemical Company of Milwaukee, Wis.), and 405.4 grams of distilled water. About 550 grams of magnesia-stabilized zirconia milling media (12.7 mm diameter; 97% zirconia; obtained from U.S. Stoneware Corp. of East Palestine, Ohio) were added to the bottle, and the mixture milled at 120 rpm for 2 hours to deagglomerate the powder.

Following milling, the slurry was prepared for spray-drying by removing the milling media, and adding the following: 51.9 grams of acrylic resin (obtained under the trade designation "DURAMAX B-1000 BINDER" from Rohm and Haas Company of Philadelphia, Pa.) diluted with 106.3 grams of distilled water, 5.7 grams of a plasticizer (obtained under the trade designation "CARBOWAX POLY-ETHYLENE GLYCOL 400" from Union Carbide of Danbury, Conn.) diluted with 19.1 grams of distilled water, 0.3 gram of a dispersing agent (obtained under the trade designation "TERGITOL MIN-FOAM 1X SURFACTANT" from Union Carbide), 0.4 gram of ammonium hydroxide (obtained from Alfa Aesar of Ward Hill, Mass.), and 0.5 gram of a defoamer to reduce entrapped air in the solution (obtained under the trade designation "FOAMKILL 852" from Crucible Chemical Company of Greenville, S.C.). The resulting slurry was mixed with a magnetic stir bar and spray dried (using a Buchi Mini Spray Dryer B-191 obtained from Brinkman Instruments of Westbury, N.Y.). The inlet temperature during spray drying was approximately 195° C., and the outlet temperature was approximately 100° C. The resulting powder was non-agglomerated, free-flowing, and able to be readily pressed into pellets.

The powder was pressed into pellets weighing approximately 14.5 grams using an applied pressure of approximately 100 MPa using a press obtained from Carver Laboratory Press (Model M; Carver Inc., Wabash, Ind.). The diameter of the pellets was 3.18 cm, and the height approximately 0.5 cm. Organic components were burned out of the pellets by heating the pellets in a furnace at a heating rate of about 1° C./min. in air to about 690° C., holding the temperature at about 690° C. for 1 hour, and allowing the pellets to cool to room temperature by turning off the power to the furnace. The pellets were then pre-sintered by heating the pellets in an electrically heated furnace (obtained under the trade designation "RAPID TEMP FURNACE TYPE 1706 FL" from CM Furnaces of Bloomfield, N.J.) to 1400° C., at a rate of about 20° C./min. After holding the temperature at 1400° C. for 2 hours, the furnace was cooled at a controlled cooling rate of about 20° C./min.

The resulting pre-sintered pellets had a density of approximately 5.94 g/cm$^3$, which was 98.2% of what was believed to be theoretical density. The pellets were hot isostatically pressed (HIPed) in a HIP unit (Model No. IPS Eagle 6-45; from International Pressure Services/American Isostatic Presses, Columbus, Ohio). The pellets were HIPed by heating them to 1375° C. in Argon at a pressure of about 207 MPa. The pellets were heated from room temperature to 1200° C. at a heating rate of 20° C./min., then from 1200° C. to 1375° C. at a heating rate of 13° C./min. The pellets were held at a temperature of 1375° C. for an hour. The pellets were then cooled from 1375° C. to room temperature at a cooling rate of approximately 30° C./min. The density of the resulting Example 1 material, was 6.04 g/cm$^3$, which was 99.8% of what was believed to be theoretical density.

Figure 4:
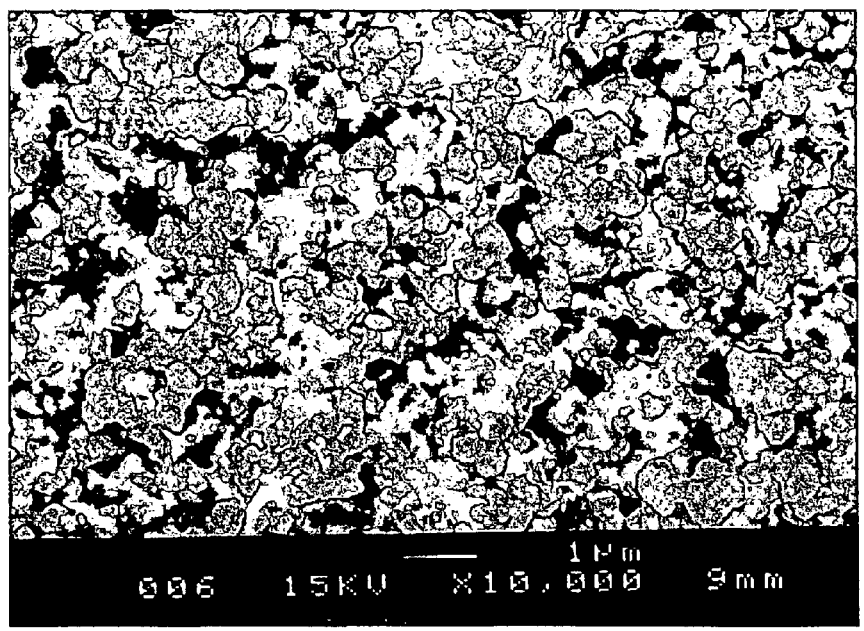
FIG. 4 is a scanning electron photomicrograph of a fractured cross-section of Example 1 abrasive materials.

FIG. 4 is a digital image of a scanning electron microscope (SEM) photomicrograph of a fractured surface of Example 1 material. A piece of Example 1 was broken into small pieces. The newly exposed, fractured surface was mounted on an aluminum SEM stub and coated with a thin layer of gold-palladium and viewed using a scanning electron microscope (obtained under the trade designation "JEOL SEM" (Model JSM 6400 from JEOL, Ltd. of Akishima, Japan)). The material was observed to be dense, with an average grain size of about 0.5 micrometer.

Example 1 HIPed material was crushed using a "Chipmunk" jaw crusher (Model No. 241-34, Type VD, manufactured by BICO Inc., of Burbank, Calif.) into (abrasive) particles and graded to retain the −25+30 and −30+35 mesh fractions. These two mesh fractions were combined to provide a 50/50 weight percent blend. About thirty grams of the 50/50 blend of −25+30 and −30+35 mesh fractions were incorporated into each coated abrasive disc.

The coated abrasive discs were made according to conventional procedures. The sintered abrasive particles were bonded to 17.8 cm diameter, 0.8 mm thick vulcanized fiber backings (having a 2.2 cm diameter center hole) using a conventional calcium carbonate-filled phenolic make resin (48 wt % resole phenolic resin, 52 wt % calcium carbonate, diluted to 81 wt % solids with water and glycol ether) and a conventional cryolite-filled phenolic size resin (32 wt % resole phenolic resin, 2 wt % iron oxide, 66 wt % cryolite, diluted to 78 wt % solids with water and glycol ether). The wet make resin coating was applied at a coating weight of about 185 g/m$^2$. Immediately after the make coat was applied, the sintered abrasive particles were electrostatically coated. The make resin was precured for 120 minutes at 88° C. Then the cryolite-filled phenolic size coat was coated over the make coat and abrasive particles. The wet size coating was applied at a coating weight of about 500 g/m$^2$. The size resin was cured for 12 hours at 99° C. The coated abrasive disc was flexed prior to testing.

Comparative Example A

Comparative Example A coated abrasive discs were prepared as described in Example 1, except sol-gel derived abrasive particles (marketed by the 3M Company, St. Paul, Minn. under the trade designation "321 CUBITRON") were used in place of the Example 1 abrasive particles.

An effective uniaxial tensile strength of Comparative Example A abrasive particles was determined by grading a course fraction of particles to retain the −14+16 mesh fraction. The fracture loads of individual particles were measured using a materials testing workstation (obtained under the trade designation "Sintech 10/D," available from MTS Systems Corporation of Eden Prairie, Minn.). A representative diameter of each particle to be tested was measured to 0.001 mm using a micrometer.

The particles were placed on the horizontally oriented stationary anvil of the micrometer and were transferred to the test frame in the same relative orientation. WC rods having a diameter of 1.27 cm (obtained under the trade designation "Grade CD-630," from Carbidie of Irwin, Pa.) were used for loading rods. The faces of the WC rods were prepared for test measurements by cutting off their ends with a high-speed diamond saw (obtained under the trade designation "Buehler Isomet 2000" from Buehler Ltd. of Lake Bluff, Ill.). The edges of the rod faces were beveled with a diamond abrasive belt (obtained under the trade designation "3M Flex Diamond Sanding Belt-74 µm," available from 3M Company of St. Paul, Minn.), and the faces of the rods were polished with a 9 micrometer diamond suspension (obtained under the trade designation "AUTOMET 3 Polisher" from Buehler Ltd. of Lake Bluff, Ill.) and a polishing cloth (obtained under the trade designation "TEXMET" polishing cloth from Buehler Ltd.).

Prior to testing the particles, the WC rods had a mirror-like finish. Individual particles were placed on the lower loading rod and the upper loading rod was lowered until it just touched the specimen. The particles were loaded at a crosshead speed of 0.50 mm/min. until fracture. Nominally 15 particles of each material were tested.

Load-displacement (LD) curves were recorded, as was the load at fracture. Typically LD curves were not linear to fracture, but contained one or more load drops, which were believed to correspond to cracking and chipping of the test specimen. Occasionally, specimens were oriented so that nearly flat faces contacted the loading rods. These specimens usually exhibited the highest fracture loads. In these cases, it is believed that compressive stresses were present instead of the induced tensile stress typical in diametral compression tests of cylindrical or spherical specimens. The effective uniaxial tensile strength of the particles was determined by an equation given in a paper by J. N. Brecker, "The Fracture Strength of Abrasive Particles," J. Eng. Ind., 96 [4] 1253–57 (1974), the disclosure of which is incorporated herein by reference. The tensile strength in this equation, which was determined from the mean of the strength of a sphere and a cube (as determined by maximum strain theory) is given by $$\sigma = 1.37 \frac{P}{a^2}$$

wherein: P is the fracture load and a is the particle diameter.

The average tensile strength and standard deviation for Comparative Example A, as determined by this technique, was 161 MPa±71 MPa. The Weibull modulus was 2.33.

Grinding Performance of Example 1 and Comparative Example A

Figure 5:
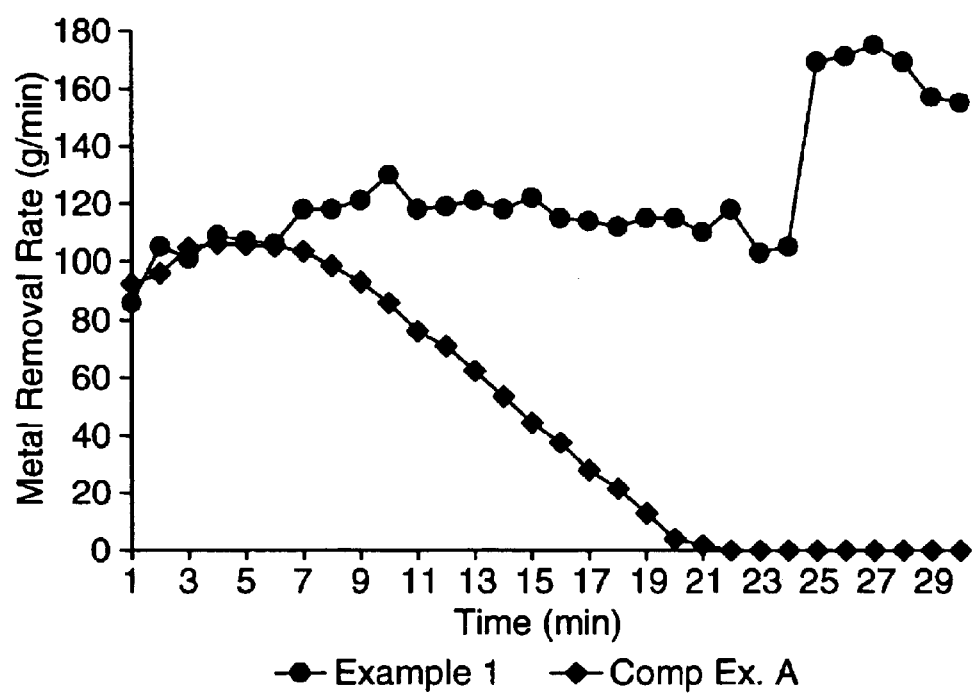
FIG. 5 is a graphical plot of Metal Removal Rate versus Time for abrasive discs of Example 1 and Comparative Example A.

The grinding performance of Example 1 and Comparative Example A abrasive discs were evaluated as follows. Each coated abrasive disc was mounted on a beveled aluminum back-up pad, and used to grind the face of a pre-weighed 1.26 cm×17.8 cm×10.2 cm, 1018 mild steel workpiece. The disc was driven at 5,000 rpm while the portion of the disc overlaying the beveled edge of the back-up pad contacted the workpiece at a load of 10.1 kg for the first 24 minutes of the test. After 24 minutes, the load was increased to 17.3 kg for the final 6 minutes of the test. Each disc was used to grind individual workpieces in sequence for one-minute intervals. The total cut was the sum of the amount of material removed from the workpieces throughout the test period. The cut recorded for each minute is shown plotted in FIG. 5. The total cut after 12, 24, and 30 minutes is reported in Table 1, below.

TABLE 1

| Example | 12 Min. total cut, g | 24 Min. total cut, g | 30 Min. total cut, g |
|---|---|---|---|
| Comp. Ex. A | 1138 | 1404 | 1404 |
| 1 | 1338 | 2706 | 3702 |

Example 2

A polyethylene bottle was charged with 295.7 grams of yttria-stabilized zirconia powder ("HSY 3.0"), 0.8 gram of ammonium hydrogen citrate powder (catalog #24,756-1), and 128.6 grams of distilled water. 0.4 gram of a dispersing agent ("TERGITOL MIN-FOAM 1X SURFACTANT") and 0.5 gram of a defoamer to reduce entrapped air in the solution ("FOAMKILL 852") were added to the mixture. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, the milling media were removed, and the slurry poured into a glass ("PYREX") pan. While slowly oscillating the pan to prevent settling of the powder, the slurry was dried using a heat-gun held approximately 46 cm (18 inches) from the slurry. After drying with the heat-gun, the pan was placed in a drying oven for an additional 30 minutes at 90° C. to more completely dry the material. The dried powder bed was scored with a spatula and scraped from the pan to form small flakes of material. Each flake weighed about 0.5 to 3 grams. Organic components were burned out of the flakes by heating the flakes in a furnace in air from room temperature to 690° C. at a heating rate of about 1° C./min. The temperature was held at 690° C. for 1 hour, and then cooled to room temperature by turning off the power to the furnace.

About 140 grams of the resulting flakes were sintered in argon at 1500° C. for an hour using a controlled atmosphere furnace (Model No. 1000-4560FP, Astro Industries of Santa Barbara, Calif.). The flakes were heated from room temperature to 1500° C. at about 10° C./min., held at 1500° C. for an hour, cooled to 800° C. at a cooling rate of about 10° C./min., and then cooled to room temperature by turning off the power to the furnace. The resulting flakes had a density of about 6.00 g/cm$^3$, which was 99.2% of what was believed to be the theoretical density.

The average tensile strength of Example 2 was measured as described for Comparative Example A. The average tensile strength and standard deviation of Example 2 was 685 MPa±529 MPa. The Weibull modulus was 1.65.

The sintered flakes were crushed and graded as described in Example 1. A 50/50 blend of the −25+30 and −30+35 mesh fractions was prepared. Example 2 coated abrasive discs were prepared as described in Example 1, except the 50/50 blend of Example 2 abrasive particles was used in place of the Example 1 abrasive particles.

Example 3

About 140 grams of the Example 2 flakes, which had been heated to 690° C., were pre-sintered in argon at 1450° C. for 1 hour using a controlled atmosphere furnace (Model No. 1000-4560FP). The flakes were heated from room temperature to 1450° C. at a heating rate of about 10° C./min., held at 1450° C. for 1 hour, cooled to 800° C. at a cooling rate of about 10° C./min., and then cooled to room temperature by turning off the power to the furnace.

The resulting flakes had a density of approximately 5.97 g/cm$^3$, which was 98.7% of what was believed to be theoretical density. The flakes were then HIPed as described in Example 1. The density of the resulting Example 3 material was 6.07 g/cm$^3$, which was 100.3% of what was believed to be what was believed to be theoretical density.

The average tensile strength and standard deviation of Example 3, as measured according to Comparative Example A, was 672 MPa±402 MPa. The Weibull modulus was 2.20.

Figure 6:
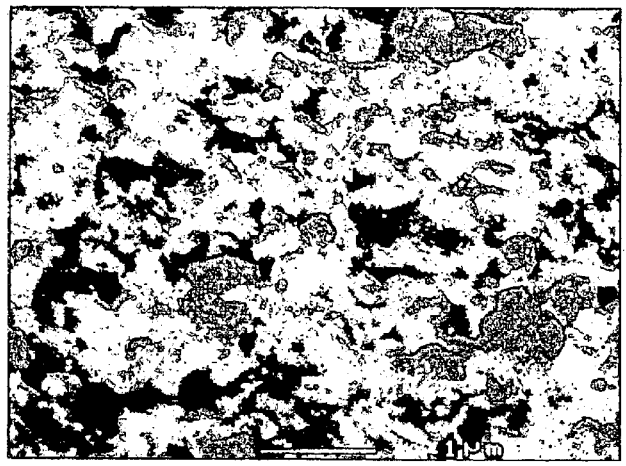
FIG. 6 is a scanning electron photomicrograph of a fractured cross-section of Example 3 abrasive materials.

FIG. 6 is a digital image of a scanning electron microscope (SEM) photomicrograph of a fractured surface of the Example 3 HIPed material. A piece of Example 3 was broken into small pieces. The newly exposed fractured surface was mounted on an aluminum SEM stub and coated with a thin layer of gold-palladium and viewed using a scanning electron microscope (obtained under the trade designation "JEOL SEM" (Model JSM 6400 from JEOL, Ltd. of Akishima, Japan). The average grain size of the Example 3 material was about 0.5 micrometer.

The average microhardness of Example 3 HIPed material was measured by mounting processed flakes in mounting resin (obtained under the trade designation "EPOXIDE" from Buehler Ltd., Lake Bluff, Ill.). More specifically, Example 3 material was secured in a 3.18 cm (1.25 inch) diameter, 1.9 cm (0.75 inch) tall cylinder of the resin. The mounted sample was polished using diamond lapping film (obtained under the trade designation "IMPERIAL DIAMOND LAPPING FILM" from the 3M Company, St. Paul, Minn.), with the final polishing step using a 0.5 micrometer diamond film to obtain polished cross-sections of the samples.

Hardness measurements were made using a conventional microhardness tester obtained under the trade designation "MITUTOYO MVK-VL" from Mitutoyo Corp. of Tokyo, Japan) fitted with a Vickers indenter using a 500-gram indent load. The hardness measurements were made according to the guidelines stated in ASTM Test Method E384 Test Methods for Microhardness of Materials (1991), the disclosure of which is incorporated herein by reference. The reported hardness values are an average of 10 measurements. The average microhardness of the Example 3 HIPed material was 13.2 GPa.

Example 3 coated abrasive discs were prepared as described in Example 1, except Example 3 abrasive particles in place of the Example 1 abrasive particles.

Grinding Performance of Examples 2–3 and Comparative Example A

Figure 7:
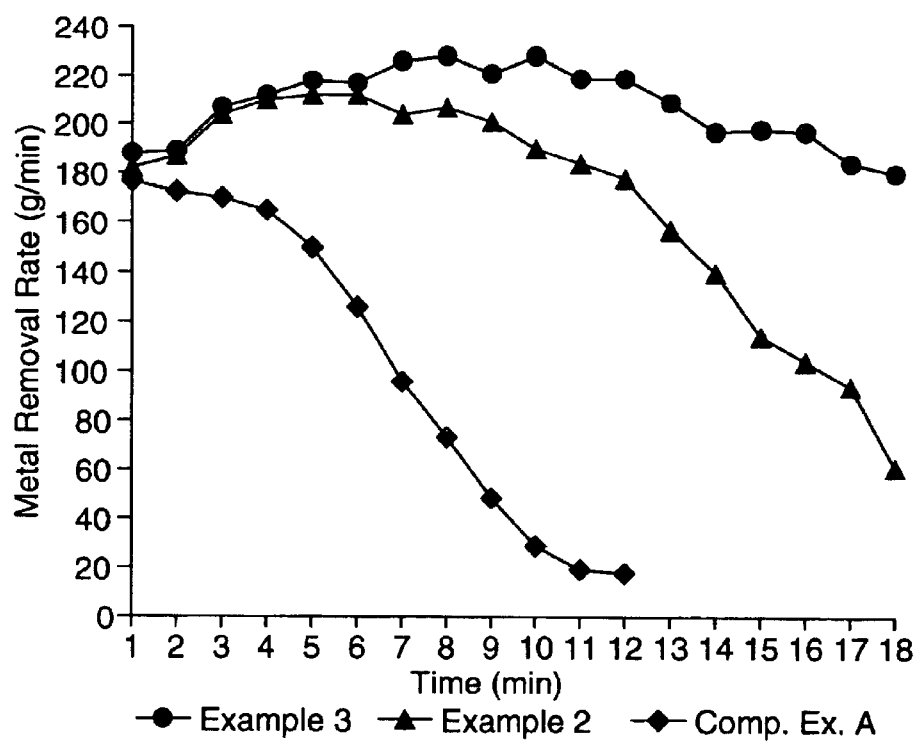
FIG. 7 is a graphical plot of Metal Removal Rate versus Time for abrasive discs of Examples 2 and 3, and Comparative Example A.

The grinding performance of Examples 2 and 3 and Comparative Example A coated abrasive discs were evaluated as described above under the heading "Grinding Performance of Example 1 and Comparative Example A", except the length of the test was 18 minutes, and the load was 17.3 kg. The cut recorded for each minute is shown plotted in FIG. 7. The total cuts after the 12 and 18 minutes of grinding are reported in Table 2, below.

TABLE 2

| Example | 12 Min. total cut, g | 18 Min. Total cut, g |
| --- | --- | --- |
| Comp. Ex. A | 1245 | * |
| 2 | 2371 | 3041 |
| 3 | 2572 | 3737 |

* test stopped after 12 minutes due to a low cut rate of 18 g/min.

Example 4

A polyethylene bottle was charged with 384.2 grams of yttria-stabilized zirconia powder ("HSY 3.0"), 0.7 gram of ammonium hydrogen citrate powder (catalog #24,756-1), and 350.6 grams of distilled water. 100.2 grams of magnesia-doped alumina powder obtained under the trade designation "CERALOX APA 0.5 with MgO" (nominal composition of 99.97 wt % $Al_2O_3$ and 500 ppm MgO, with the balance being comprised of impurities such as $SiO_2$, $Fe_2O_3$, CaO, and $Na_2O$) from the Condea Vista Company of Tucson, Ariz. was added to the mixture. About 500 grams of magnesia-stabilized zirconia milling media (12.7 mm and 9.53 mm diameter (two sizes, about 40% of larger size, and about 60% of smaller size), 97% zirconia, obtained from U.S. Stoneware Corp.) were added to the bottle, and the mixture was milled for 54 hours to de-agglomerate and mix the powders.

Following milling, flakes of pre-abrasive material of Example 4 were prepared as described in Example 2. Organic components were burned out of the flakes by heating the flakes in air to 670° C. for 1 hour. The flakes were heated from room temperature to 670° C. at a heating rate of about 1° C./min., held at 670° C. for 1 hour, and cooled to room temperature by turning off the power to the furnace.

About 160 grams of the resulting flakes were sintered in argon at 1600° C. for 2 hours using a controlled atmosphere furnace (Model No. 1000-4560FP). The flakes were heated from room temperature to 1600° C. at a heating rate of about 10° C./min., held at 1600° C. for 2 hours, cooled to 800° C. at a cooling rate of about 10° C./min., and then cooled to room temperature by turning off the power to the furnace.

Example 4 coated abrasive discs were prepared as described in Example 1, except Example 4 abrasive particles were used in place of the Example 1 abrasive particles.

Example 5

About 160 grams of the Example 4 flakes that had been heated to 670° C. were sintered in air at 1600° C. for 2 hours using an electrically heated furnace ("RAPID TEMP FURNACE TYPE 1706 FL"). The flakes were heated from room temperature to 1600° C. at a heating rate of about 20° C./min. After holding the temperature at 1600° C. for 2 hours, the furnace was cooled at a controlled cooling rate of about 20° C./min. The resulting flakes had a density of approximately 5.42 g/cm$^3$, which was 99.0% of what was believed to be theoretical density.

Example 5 coated abrasive discs were prepared as described in Example 1, except Example 5 abrasive particles were used in place of the Example 1 abrasive particles.

Example 6

A polyethylene bottle was charged with 384.7 grams of yttria-stabilized zirconia powder ("HSY 3.0"), 0.7 gram of ammonium hydrogen citrate powder (catalog #24,756-1), and 359.8 grams of distilled water. 100.0 grams of magnesia-doped alumina powder ("CERALOX APA 0.5 with MgO") was added to the mixture. About 500 grams of magnesia-stabilized zirconia milling media (12.7 mm and 9.53 mm diameter (two sizes, about 40% of larger size, and about 60% of smaller size), 97% zirconia, obtained from U.S. Stoneware Corp.) were added to the bottle, and the mixture was milled for 54 hours to de-agglomerate and mix the powders.

Following milling, the milling media were removed, and the slurry poured into a plastic beaker. The plastic beaker was put on a hot plate with a spinning stirbar to evaporate water from the slurry. Additionally, an infrared lamp mounted above the beaker was used to further facilitate evaporation of the water. The dried powder cake was scraped from the beaker in large chunks. Each chunk weighed from about 10 to about 25 grams. Organic components were burned out of the chunks by heating the chunks in air at 670° C. for 1 hour. The chunks were heated from room temperature to 670° C. at a heating rate of about 1° C./min., held at 670° C. for 1 hour, and cooled to room temperature by turning off the power to the furnace.

Following burnout at 670° C., the powder chunks were crushed using a mortar and pestle such that all the powder particles passed through a #70 sieve. The powder particles were then consolidated into a large block by using a cold isostatic press (Model #IP4-22-60, Autoclave Engineers of Erie, Pa.) and rubber cold isostatic pressing bags (1.6 mm wall thickness, 7.62 cm diameter×61.0 cm long, Trexler Rubber Company of Ravenna, Ohio). A cold isostatic pressure of 172 MPa was applied for 1 minute. Following removal of the consolidated large block from the isopress bag, the large powder block was broken into smaller 0.5 to 10 gram chunks of material, again using a mortar and pestle.

About 175 grams of the resulting chunks were sintered in argon at 1600° C. for 2 hours using a controlled atmosphere furnace (Model No. 1000-4560FP). The chunks were heated from room temperature to 1600° C. at a heating rate of about 10° C./min., held at 1600° C. for 2 hours, cooled to 800° C. at a cooling rate of about 10° C./min., and then cooled to room temperature by turning off the power to the furnace.

Example 6 coated abrasive discs were prepared as described in Example 1, except Example 6 abrasive particles were used in place of the Example 1 abrasive particles.

Example 7

About 175 grams of the Example 6 chunks that had been cold isostatic pressed were sintered in air at 1600° C. for 2 hours using an electrically heated furnace (obtained under the trade designation "RAPID TEMP FURNACE MODEL 1700S-D" from CM Furnaces of Bloomfield, N.J.). The chunks were heated from room temperature to 1600° C. at a heating rate of about 20° C./min., held at 1600° C. for 2 hours, and then cooled to room temperature at a controlled cooling rate of about 20° C./min. The resulting flakes had a density of approximately 5.41 g/cm$^3$, which was 98.8% of what was believed to be theoretical density.

Example 7 coated abrasive discs were prepared as described in Example 1, except Example 7 abrasive particles were used in place of the Example 1 abrasive particles.

Grinding Performance of Examples 4–7 and Comparative Example A

The grinding performance of Examples 4–7 and Comparative Example A coated abrasive discs were evaluated as described above under the heading "Grinding Performance of Example 1 and Comparative Example A," except the length of the test was 12 minutes, and the load was 17.3 kg. The total cut after 12 minutes of grinding is reported in Table 3, below.

TABLE 3

| Example | 12 Min. total cut, g |
|---|---|
| Comp. Ex. A | 1245 |
| 4 | 2044 |
| 5 | 1802 |
| 6 | 1075 |
| 7 | 1251 |

Example 8

A polyethylene bottle was charged with 310.2 grams of yttria-stabilized zirconia powder ("HSY 3.0"), 0.7 gram of ammonium hydrogen citrate powder (catalog #24,756-1), and 349.8 grams of distilled water. 175.1 grams of magnesia-doped alumina powder ("CERALOX APA 0.5 with MgO"), was added to the mixture. About 500 grams of magnesia-stabilized zirconia milling media (12.7 mm and 9.53 mm diameter (two sizes, about 40% of larger size, and about 60% of smaller size); 97% zirconia; obtained from U.S. Stoneware Corp.) were added to the bottle, and the mixture was milled for 54 hours to de-agglomerate and mix the powders.

Following milling, flakes of burned-out (i.e., calcined at 670° C. for 1 hour) pre-abrasive material were prepared as described in Example 4.

About 160 grams of the resulting flakes were sintered in argon at 1600° C. for 2 hours as described in Example 4.

Example 8 coated abrasive discs were prepared as described in Example 1, except Example 8 abrasive particles were used in place of the Example 1 abrasive particles.

Example 9

About 225 grams of the Example 8 flakes that had been heated to 670° C. were sintered in air at 1600° C. for 2 hours as described in Example 5. The resulting flakes had a density of approximately 5.07 g/cm$^3$, which was 99.3% of what was believed to be theoretical density.

Example 9 coated abrasive discs were prepared as described in Example 1, except Example 9 abrasive particles were used in place of the Example 1 abrasive particles.

Example 10

A polyethylene bottle was charged with 309.1 grams of yttria-stabilized zirconia powder ("HSY 3.0"), 0.8 gram of ammonium hydrogen citrate powder (catalog #24,756-1), and 350.3 grams of distilled water. 175.0 grams of magnesia-doped alumina powder ("CERALOX APA 0.5 with MgO"), was added to the mixture. About 500 grams of magnesia-stabilized zirconia milling media (12.7 mm and 9.53 mm diameter (two sizes, about 40% of larger size, and about 60% of smaller size); 97% zirconia; obtained from U.S. Stoneware Corp.) were added to the bottle, and the mixture was milled for 54 hours to de-agglomerate and mix the powders.

Following milling, chunks of burned-out and cold isostatic pressed pre-abrasive material were prepared as described in Example 6.

About 175 grams of the resulting chunks were sintered in argon at 1600° C. for 2 hours as described in Example 6.

Example 10 coated abrasive discs were prepared as described in Example 1, except Example 10 abrasive particles were used in place of the Example 1 abrasive particles.

Example 11

About 175 grams of the Example 10 chunks that had been cold isostatic pressed were sintered in air at 1600° C. for 2 hours as described in Example 7. The resulting flakes had a density of approximately 5.09 g/cm$^3$, which was 99.6% of what was believed to be theoretical density.

Example 11 coated abrasive discs were prepared as described in Example 1, except Example 11 abrasive particles were used in place of the Example 1 abrasive particles.

Grinding Performance of Example 8–11 and Comparative Example A

The grinding performance of Examples 8–11 and Comparative Example A coated abrasive discs were evaluated as described above under the heading "Grinding Performance of Example 1 and Comparative Example A," except the length of the test was 12 minutes, and the load was 17.3 kg. The total cuts after 12 minutes of grinding are reported in Table 4, below.

TABLE 4

| Example | 12 Min. total cut, g |
|---|---|
| Comp. Ex. A | 1245 |
| 8 | 1990 |
| 9 | 1500 |
| 10 | 1080 |
| 11 | 936 |

Example 12

About 500 grams of yttria-stabilized zirconia/alumina co-precipitated powder particles (obtained under the trade designation "ATZ-80" (nominal composition of 75 wt % $ZrO_2$ (+$HfO_2$), 4.1 wt % $Y_2O_3$, 19.5 wt % $Al_2O_3$ with the balance being comprised of impurities such as $SiO_2$, $Fe_2O_3$, CaO, and $Na_2O$) from Zirconia Sales, Inc. of Marietta, Ga.), were consolidated into small chunks by using a cold isostatic press (Model #IP4-22-60) and crushing using the procedure as described in Example 6.

About 180 grams of the resulting chunks were sintered in air at 1500° C. for 2.1 hours using an electrically heated furnace ("RAPID TEMP FURNACE TYPE 1706 FL"). The chunks were heated from room temperature to 1500° C. at a heating rate of about 20° C./min., held at 1500° C. for 2.1 hours, and then cooled to room temperature at a controlled cooling rate of about 20° C./min. The resulting flakes had a density of approximately 5.50 g/cm$^3$, which was 100.0% of what was believed to be theoretical density.

Example 12 coated abrasive discs were prepared as described in Example 1, except Example 12 abrasive particles were used in place of the Example 1 abrasive particles.

Example 13

About 175 grams of the Example 12 chunks that had been cold isostatic pressed were pre-sintered in air at 1470° C. for 2.1 hours using an electrically heated furnace ("RAPID TEMP FURNACE TYPE 1706 FL"). The chunks were heated from room temperature to 1470° C. at a heating rate of about 20° C./min., held at 1470° C. for 2.1 hours, and then cooled to room temperature at a controlled cooling rate of about 20° C./min.

The resulting pre-sintered chunks had a density of approximately 5.36 g/cm$^3$, which was 97.5% of what was believed to be theoretical density. The chunks were then hot isostatically pressed (HIPed) in a HIP unit (Model No. IPS Eagle 6-45). The chunks were HIPed by heating them to 1400° C. for 1 hr in Argon at a pressure of about 207 MPa. The chunks were heated from room temperature to 1200° C. at a heating rate of 20° C./min., heated from 1200° C. to 1400° C. at a heating rate of 13° C./min., held at 1400° C. for 1 hr, then cooled to room temperature at a controlled cooling rate of 30° C./min. The density of the resulting Example 13 material was 5.44 g/cm$^3$, which was 98.9% of what was believed to be theoretical density.

Example 13 coated abrasive discs were prepared as described in Example 1, except Example 13 abrasive particles were used in place of the Example 1 abrasive particles.

Example 14

About 2000 grams of yttria-stabilized zirconia/alumina co-precipitated powder particles (obtained under the trade designation "TZ-3Y20A" (nominal composition of 76.0 wt % ZrO$_2$ (+HfO$_2$), 3.9 wt % Y$_2$O$_3$, 20.0 wt % Al$_2$O$_3$ with the balance being comprised of impurities such as SiO$_2$, Fe$_2$O$_3$ and Na$_2$O) from Tosoh Ceramics Division of Bound Brook, N.J.) were consolidated into small chunks by using a cold isostatic press (Model #IP4-22-60) and crushed using the procedure as described in Example 6.

About 750 grams of the resulting chunks were sintered in air at 1500° C. for 1.5 hours using an electrically heated furnace ("RAPID TEMP FURNACE MODEL 1700S-D"). The chunks were heated from room temperature to 1500° C. at a heating rate of about 15° C./min., held at 1500° C. for 1.5 hours, and then cooled to room temperature at a controlled cooling rate of about 15° C./min.

Figure 8:
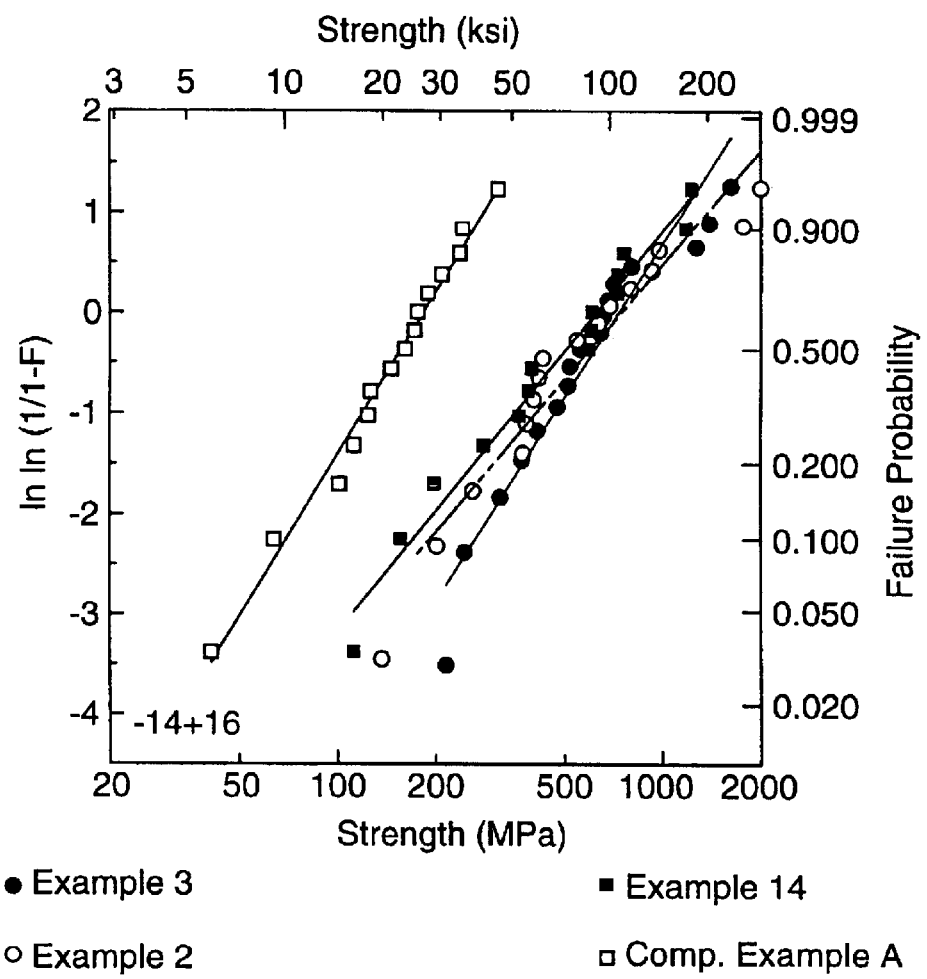
FIG. 8 is a graphical plot of Strength versus Failure Probability for abrasive particles of Examples 2, 3, 14, and Comparative Example A.

The average tensile strength of Example 14 material was measured as described in Comparative Example A. The average tensile strength and standard deviation of Example 14 material was 556 MPa±339 MPa. The Weibull modulus was 1.73. A plot of the strength data for material produced in Comparative Example A and Examples 2, 3 and 14 is shown in FIG. 8.

Example 14 coated abrasive discs were prepared as described in Example 1, except 36 grams of Example 14 abrasive particles were used in place of the Example 1 abrasive particles.

Example 15

About 750 grams of the Example 14 chunks that had been cold isostatic pressed were crushed into particles using a mortar and pestle and graded to retain the +40 mesh fraction (USA Standard Testing Sieves). The +40 mesh fraction particles were sintered in air at 1500° C. for 1.5 hours as described for Example 14.

Example 15 coated abrasive discs were prepared as described in Example 1, except 36 grams of Example 15 abrasive particles were used in place of the Example 1 abrasive particles.

Grinding Performance of Example 12–15 and Comparative Example A

The grinding performance of Examples 12–15 and Comparative Example A coated abrasive discs were evaluated as described above under the heading "Grinding Performance of Example 1 and Comparative Example A," except the length of the test was 12 minutes, and the load was 17.3 kg. The total cuts after 12 minutes of grinding are reported in Table 5, below.

TABLE 5

| Example | 12 Min. total cut, g |
|---|---|
| Comp. Ex. A | 1245 |
| 12 | 2146 |
| 13 | 2370 |
| 14 | 2433 |
| 15 | 2486 |

Example 16

About 480 grams of the Example 15 abrasive particles that had been sintered in air at 1500° C. for 1.5 hours were hot isostatically pressed (HIPed) in a HIP unit (Model No. SL-1, Mini-Hipper, Conaway Pressure Systems Inc., of Dublin, Ohio). The abrasive particles were HIPed by heating the particles at 1450° C. for 1 hr in Argon at a pressure of about 172 MPa. The particles were heated from room temperature to heating rate to 1450° C. at a heating rate of 16° C./min., held at 1450° C. for 1 hr, and then cooled to room temperature at a controlled cooling rate of 30° C./min.

Example 16 coated abrasive discs were prepared as described in Example 1, except 36 grams of Example 15 abrasive particles were used in place of the Example 1 abrasive particles.

Comparative Example B

Comparative Example B coated abrasive discs were prepared as described in Example 1, except 27 grams of sol-gel derived abrasive particles ("321 CUBITRON") were used in place of 30 grams of the Example 1 abrasive particles.

Grinding Performance of Example 16 and Comparative Example B

The grinding performance of Example 16 and Comparative Example B coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 6, below.

TABLE 6

| Example | 12 Min. total cut, g | 18 Min. total cut, g |
|---|---|---|
| Comp. Ex. B | 1126 | * |
| 16 | 2570 | 3385 |

* test stopped after 12 minutes due to a relatively low cut rate of 3 g/min.

Example 17

Example 15 abrasive particles were used to prepare coated abrasive discs as described in Example 1, except 22 grams of Example 15 abrasive particles were used in place of the Example 1 abrasive particles.

Example 18

Example 16 abrasive particles were used to prepare coated abrasive discs as described in Example 1, except 22 grams of Example 16 abrasive particles were used in place of the Example 1 abrasive particles.

Comparative Example C

Comparative Example C coated abrasive discs were prepared as described in Example 1 except 20 grams of sol-gel derived abrasive particles ("321 CUBITRON") were used in place of 30 grams of the Example 1 abrasive particles.

Grinding Performance of Examples 17–18 and Comparative Example C

The grinding performance of Examples 17–18 and Comparative Example C coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 7, below.

TABLE 7

| Example | 12 Min. total cut, g | 18 Min. total cut, g |
| --- | --- | --- |
| Comp. Ex. C | 1210 | * |
| 17 | 2710 | 3690 |
| 18 | 2637 | 3817 |

* test stopped after 12 minutes due to a low cut rate of 5 g/min.

Example 19

Flakes of burned-out pre-abrasive material were prepared as described in Example 2 (i.e., heated to 690° C. for 1 hour). About 375 grams of these flakes that had been heated to 690° C. were pre-sintered in argon at 1465° C. for 65 minutes using a controlled atmosphere furnace (Model No. 1000-4560FP). The flakes were heated from room temperature to 1465° C. at a heating rate of about 10° C./min., held at 1465° C. for 65 minutes, cooled to 800° C. at a cooling rate of about 10° C./min., and then cooled to room temperature by turning off the power to the furnace. The resulting flakes had a density of approximately 6.01 g/cm³, which was 99.3% of what was believed to be theoretical density.

The flakes were then HIPed by heating them to 1385° C. for 65 minutes in argon at a pressure of about 207 MPa. The flakes were heated from room temperature to 1200° C. at a heating rate of about 20° C./min., heated from 1200° C. to 1385° C. at a heating rate of about 13° C./min., held at 1385° C. for 65 minutes, and then cooled from 1385° C. to room temperature at a cooling rate of about 30° C./min. The density of the resulting Example 19 material was 6.06 g/cm³, which was 100.1% of what was believed to be what was believed to be theoretical density.

The average microhardness of Example 19 material was measured as described for Example 3. The average microhardness of Example 19 material was 13.5 GPa.

Figure 9:
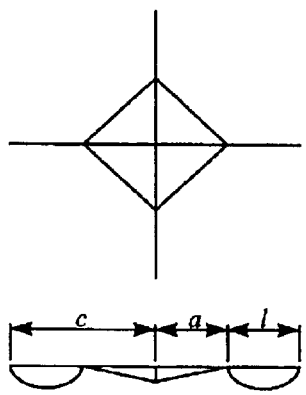
FIG. 9 is a plan and cross-sectional view of an indent showing dimensions a and l used to calculate the toughness of an abrasive particle.

The average indentation toughness of the Example 19 material was calculated by measuring the crack lengths extending from the apices of the vickers indents made using a 2000 gram load with a microhardness tester (obtained from E. Leitz, Inc. of Wetzlar, Germany under the trade designation "Leitz Miniload"). Indentation toughness ($K_C$) was calculated according to the equation:

$$K_C = 0.0319 F/[a(l)^{1/2}]$$

wherein:

F=Newtons of force on the indenter;

a and l are defined as shown in FIG. 9.

This equation was selected from several in C. B. Ponton and R. D. Rawlings, "Vickers Indentation Fracture Toughness Test, Part 1," Mater. Sci. & Tech., 5 [9] (1989), the disclosure of which is incorporated herein by reference. The equation is for a Palmqvist type crack system. Samples for toughness were prepared as described above for the microhardness test. The reported indentation toughness values are an average of 5 measurements. Crack (c) and indent diagonal lengths (a) were measured with a digital caliper on photomicrographs taken using a scanning electron microscope ("JEOL SEM" (Model JSM 6400)). The average indentation toughness of the Example 19 HIPed material was 8.0 MPa·m$^{1/2}$.

Rietveld parameter refinement fitting a calculated x-ray diffraction intensity pattern to the measured x-ray diffraction intensity pattern was performed using software (available under the trade designation "SIROQUANT" from Sietronics of Belconnen, Canberra, Australia) to give a semi-quantitative phase analysis of Example 19. By this technique, Example 19 was found to consist of about 93.0 wt % (±0.5 wt %) cubic/tetragonal zirconia and 7.0 wt % (±0.5 wt %) monoclinic zirconia.

Example 19 coated abrasive discs were prepared as described in Example 1, except 27 grams of Example 19 abrasive particles were used in place of the Example 1 abrasive particles.

Example 20

Flakes of burned-out pre-abrasive material were prepared as described in Example 2 (i.e., heated to 690° C. for 1 hour). About 250 grams of the flakes that had been heated to 690° C. were pre-sintered in air at 1470° C. for 65 minutes using an electrically heated furnace ("RAPID TEMP FURNACE TYPE 1706 FL"). The flakes were heated from room temperature to 1470° C. at a heating rate of about 10° C./min., held at 1470° C. for 65 minutes, cooled to 800° C. at a cooling rate of about 10° C./min., and then cooled to room temperature by turning off the power to the furnace.

The flakes were then HIPed as described in Example 19. The density of the resulting Example 20 material was 6.05 g/cm³, which was 100.0% of what was believed to be theoretical density.

The average microhardness of Example 20 was measured as described in Example 3. The average microhardness of Example 20 was 13.1 GPa.

Semi-quantitative phase analysis of Example 20 was performed as described for Example 19. By this technique, Example 20 was found to consist of about 89.1 wt % (±0.4 wt %) cubic/tetragonal zirconia and 10.9 wt % (±0.4 wt %) monoclinic zirconia.

Example 20 coated abrasive discs were prepared as described in Example 1, except 27 grams of Example 20 abrasive particles were used in place of the Example 1 abrasive particles.

Example 21

Dried powder bed flakes of pre-abrasive material (not burned-out) were prepared as described in Example 2 (i.e., dried with a heat-gun and in a drying oven for 30 minutes at 90° C.). The flakes were crushed using a "Chipmunk" jaw crusher (Model No. 241-34) into particles and graded to retain the −18+20, −20+25 and −25+30 mesh fractions (USA Standard Testing Sieves). Organic components were burned out of 160 grams of the particles by heating them in air at 690° C. for 1 hour. The particles were heated from room temperature to 690° C. in a furnace at a heating rate of about 1° C./min., held at 690° C. for 1 hour, and then cooled to room temperature by turning off the power to the furnace.

About 160 grams of these particles that had been heated to 690° C. were pre-sintered in argon at 1465° C. for 65 minutes as described in Example 19. The particles were then HIPed as described in Example 19. The density of the resulting Example 21 particles was 6.06 g/cm$^3$, which was 100.2% of what was believed to be what was believed to be theoretical density.

The average microhardness of Example 21 was measured as described for Example 3. The average microhardness of Example 21 material was 13.5 GPa.

Example 21 coated abrasive discs were prepared as described in Example 1, except 27 grams of Example 21 abrasive particles were used in place of the Example 1 abrasive particles.

Example 22

Powder from Example 21 flakes, which had been crushed and graded to retain the −70 mesh fraction (USA Standard Testing Sieves), was used to produce Example 22 material. A polyethylene bottle was charged with 295.7 grams of the −70 Example 21 powder, 0.2 gram of a dispersing agent ("TERGITOL MIN-FOAM 1X SURFACTANT"), and 128.7 grams of distilled water. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, the slurry was dried and flakes were burned out as described for Example 2. About 210 grams of the flakes that had been heated to 690° C. were pre-sintered in argon at 1465° C. for 65 minutes as described in Example 19. The resulting flakes had a density of approximately 5.93 g/cm$^3$, which was 98.0% of what was believed to be theoretical density.

The particles were then HIPed as described in Example 19. The density of the resulting Example 22 flakes was 6.05 g/cm$^3$, which was 100.0% of what was believed to be theoretical density.

The average microhardness of Example 22 was measured as described for Example 3. The average microhardness of Example 22 was 13.5 GPa.

Example 22 coated abrasive discs were prepared as described in Example 1, except 27 grams of Example 22 abrasive particles were used in place of the Example 1 abrasive particles.

Example 23

Powder from Example 21 flakes, which had been crushed and graded to retain the −70 mesh fraction (USA Standard Testing Sieves), was used to produce Example 23 material. A polyethylene bottle was charged with 295.4 grams of the −70 Example 21 powder, 0.2 gram of a dispersing agent ("TERGITOL MIN-FOAM 1X SURFACTANT"), and 128.6 grams of distilled water. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, the slurry was dried as described in Example 2. The dried powder bed flake pre-abrasive material (not burned-out) was crushed using a "Chipmunk" jaw crusher (Model No. 241-34) into particles and graded to retain the −18+20, −20+25 and −25+30 mesh fractions (USA Standard Testing Sieves). Organic components were then burned out of the resulting particles by heating them in air at 690° C. for 1 hour as described in Example 21.

About 100 grams of these particles that had been heated to 690° C. were pre-sintered in argon at 1465° C. for 65 minutes as described in Example 19. The resulting particles had a density of approximately 5.99 g/cm$^3$, which was 99.0% of what was believed to be theoretical density.

The particles were then HIPed as described in Example 19. The density of the resulting Example 23 particles was 6.06 g/cm$^3$, which was 100.1% of what was believed to be what was believed to be theoretical density.

The average microhardness of Example 23 particles was measured as described for Example 3. The average microhardness of Example 23 was 13.5 GPa.

Example 23 coated abrasive discs were prepared as described in Example 1, except 27 grams of Example 23 abrasive particles were used in place of the Example 1 abrasive particles.

Example 24

Flakes of burned-out pre-abrasive material were prepared as described in Example 2 (i.e., heated to 690° C. for 1 hour). These flakes were crushed using a "Chipmunk" jaw crusher (Model No. 241-34) into particles and graded to retain the −18+20, −20+25 and −25+30 mesh fractions (USA Standard Testing Sieves). About 100 grams of these (abrasive) particles were pre-sintered in argon at 1465° C. for 65 minutes as described in Example 19. The resulting particles had a density of approximately 6.02 g/cm$^3$, which was 99.5% of what was believed to be theoretical density.

The particles were then HIPed as described in Example 19. The density of the resulting Example 24 particles was 6.06 g/cm$^3$, which was 100.1% of what was believed to be what was believed to be theoretical density.

The average microhardness of Example 24 particles was measured as described in Example 3. The average microhardness of Example 24 was 13.6 GPa.

Example 24 coated abrasive discs were prepared as described in Example 1, except 27 grams of Example 24 abrasive particles were used in place of the Example 1 abrasive particles.

Example 25

Powder from Example 24 flakes, which had been crushed and graded to retain the −70 mesh fraction (USA Standard Testing Sieves), was used to produce Example 25 material. A polyethylene bottle was charged with 295.7 grams of the −70 Example 24 powder, 0.8 gram of ammonium hydrogen citrate powder (catalog #24,756-1), and 128.6 grams of distilled water. 0.4 gram of a dispersing agent ("TERGITOL MIN-FOAM 1X SURFACTANT") and 0.5 gram of a defoamer to reduce entrapped air in the solution ("FOAMKILL 852") were added to the mixture. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, the slurry was dried and flakes were burned out as described for Example 2. About 290 grams of these flakes that had been heated to 690° C. were pre-sintered in argon at 1465° C. for 65 minutes as described in Example 19. The resulting flakes had a density of approximately 6.00 g/cm$^3$, which was 99.2% of what was believed to be theoretical density.

The flakes were then HIPed as described in Example 19. The density of the resulting Example 25 flakes was 6.06 g/cm$^3$, which was 100.2% of what was believed to be what was believed to be theoretical density.

The average microhardness of Example 25 was measured as described in Example 3. The average microhardness of Example 25 was 12.7 GPa.

Example 25 coated abrasive discs were prepared as described in Example 1, except 27 grams of Example 25 abrasive particles were used in place of the Example 1 abrasive particles.

Example 26

Powder from Example 24 flakes, which had been crushed and graded to retain the −70 mesh fraction (USA Standard Testing Sieves), was used to produce Example 26 material. A polyethylene bottle was charged with 295.7 grams of the −70 Example 24 powder, 0.8 gram of ammonium hydrogen citrate powder (catalog #24,756-1), and 128.6 grams of distilled water. 0.4 gram of a dispersing agent ("TERGITOL MIN-FOAM 1X SURFACTANT") and 0.5 gram of a defoamer to reduce entrapped air in the solution ("FOAMKILL 852") were added to the mixture. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, the slurry was dried and flakes were burned out as described for Example 2. The burned-out material was crushed using a "Chipmunk" jaw crusher (Model No. 241-34) into particles and graded to retain the −18+20, −20+25 and −25+30 mesh fractions (USA Standard Testing Sieves). About 110 grams of these particles were pre-sintered and HIPed as described in Example 19. The density of the resulting Example 26 particles was 6.05 g/cm$^3$, which was 100.1% of what was believed to be what was believed to be theoretical density.

The average microhardness of Example 26 was measured as described in Example 3. The average microhardness of Example 25 material was 13.5 GPa.

Example 26 coated abrasive discs were prepared as described in Example 1, except 27 grams of Example 26 abrasive particles were used in place of the Example 1 abrasive particles.

Example 27

Flakes of burned-out material were prepared as described in Example 2 (i.e., heating to 690° C. for 1 hour). About 300 grams of the flakes that had been heated to 690° C. were pre-sintered in argon at 1465° C. for 65 minutes as described in Example 19. The resulting flakes had a density of approximately 5.99 g/cm$^3$, which was 99.0% of what was believed to be theoretical density.

These flakes were crushed using a "Chipmunk" jaw crusher (Model No. 241-34) into particles and graded to retain the −18+20, −20+25 and −25+30 mesh fractions (USA Standard Testing Sieves). 120 grams of the resultant particles were then HIPed as described in Example 19. The density of the resulting Example 27 material was 6.05 g/cm$^3$, which was 100.0% of what was believed to be theoretical density.

The average microhardness of Example 27 was measured as described in Example 3. The average microhardness of Example 27 was 13.3 GPa.

Example 27 coated abrasive discs were prepared as described in Example 1, except 27 grams of Example 27 abrasive particles were used in place of the Example 1 abrasive particles.

Example 28

About 345 grams of yttria-stabilized zirconia powder particles ("HSY 3.0") were consolidated into small chunks by using a cold isostatic press (Model #IP4-22-60) and crushing as described in Example 6. The smaller chunks of material were pre-sintered in argon, and then HIPed, both as described in Example 19. The density of the resulting Example 28 material was 6.07 g/cm$^3$, which was 100.3% of what was believed to be what was believed to be theoretical density.

The average microhardness of Example 28 was measured as described in Example 3. The average microhardness of Example 28 was 13.2 GPa.

Example 28 coated abrasive discs were prepared as described in Example 1, except 27 grams of Example 28 abrasive particles were used in place of the Example 1 abrasive particles.

Example 29

About 345 grams of small chunks of pre-abrasive material were prepared as described in Example 28. The small chunks of CIPed material were crushed by hand using a mortar and pestle into particles and graded to retain the −18+20, −20+25 and −25+30 mesh fractions (USA Standard Testing Sieves). About 120 grams of the resultant particles were then pre-sintered in argon and HIPed, both as described in Example 19. The density of the resulting Example 29 material was 6.06 g/cm$^3$, which was 100.1% of what was believed to be what was believed to be theoretical density.

The average microhardness of Example 29 was measured as described in Example 3. The average microhardness of Example 29 was 13.3 GPa.

Example 29 coated abrasive discs were prepared as described in Example 1, except 27 grams of Example 29 abrasive particles were used in place of the Example 1 abrasive particles.

Example 30

Powder from Example 29 chunks, which had been crushed and graded to retain the −70 mesh fraction (USA Standard Testing Sieves), was used to produce Example 30 material. About 225 grams of −70 Example 29 powder was consolidated into a large block by using a cold isostatic press and then broken into smaller chunks as described for Example 6. The small chunks of CIPed material were then crushed and graded into particles as described for Example 29. About 80 grams of the resultant particles were then pre-sintered in argon and HIPed, both as described in Example 19. The density of the resulting Example 30 material was 6.06 g/cm$^3$, which was 100.2% of what was believed to be what was believed to be theoretical density.

The average microhardness of Example 30 was measured as described in Example 3. The average microhardness of Example 30 was 13.3 GPa.

Example 30 coated abrasive discs were prepared as described in Example 1, except 27 grams of Example 30 abrasive particles were used in place of the Example 1 abrasive particles.

Grinding Performance of Example 19–30 and Comparative Example A

The grinding performance of Examples 19–30 and Comparative Example A coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 8, below.

TABLE 8

| Example | 12 Min. total cut, g | 18 Min. total cut, g |
| --- | --- | --- |
| Comp. Ex. A | 1142 | 1143* |
| 19 | 2565 | 3742 |
| 20 | 2364 | 3234 |
| 21 | 2314 | 3026 |
| 22 | 2335 | 3259 |
| 23 | 2387 | 2569** |
| 24 | 2250 | 3086 |
| 25 | 2481 | 3460 |
| 26 | 2285 | 3168 |
| 27 | 2475 | 3455 |
| 28 | 2432 | 3343 |
| 29 | 2455 | 3301 |
| 30 | 2171 | 3004 |

*Test stopped after 13 minutes due to a low cut rate of 1 g/min.
**Disc broke after 13 minutes Example 31

Flakes of burned-out pre-abrasive material were prepared as described in Example 2 (i.e., heating to 690° C. for 1 hour) except 295.9 grams of yttria-stabilized zirconia powder (obtained under the trade designation "HSY 3.0U" (nominal composition of 94 wt % $ZrO_2$ (+$HfO_2$), and 5.4 wt % $Y_2O_3$, with the balance being comprised of impurities such as $Al_2O_3$, $SiO_2$, $Fe_2O_3$, CaO, and $Na_2O$) from Zirconia Sales, Inc. of Marietta, Ga.), was used instead of 295.7 grams of the "HSY 3.0" powder. (The "HSY 3.0U" powder has a surface area of about 20 $m^2/g$ as compared to a surface area of about 6.5 $m^2/g$ for the "HSY 3.0" powder.)

About 375 grams of these flakes that had been heated to 690° C. were pre-sintered in argon at 1448° C. for 70 minutes using a controlled atmosphere furnace (Model No. 1000-4560FP). The flakes were heated from room temperature to 1448° C. at a heating rate of about 10° C./min., held at 1448° C. for 70 minutes, cooled to 800° C. at a cooling rate of about 10° C./min., and then cooled to room temperature by turning off the power to the furnace.

The flakes were then HIPed by heating them to 1395° C. for 70 minutes in argon at a pressure of about 207 MPa. The flakes were heated from room temperature to 1200° C. at a heating rate of about 20° C./min., heated from 1200° C. to 1395° C. at a heating rate of about 13° C./min., and then cooled to room temperature at a cooling rate of about 30° C./min. The density of the resulting Example 31 material was 6.06 $g/cm^3$, which was 100.2% of what was believed to be what was believed to be theoretical density.

Example 31 coated abrasive discs were prepared as described in Example 1, except 27 grams of Example 31 abrasive particles were used in place of the Example 1 abrasive particles.

Example 32

Small chunks of pre-abrasive material were prepared as described in Example 28 (broken by mortar and pestle after CIPing) except 325 grams of "HSY 3.0U" was used instead of 345 grams of the "HSY 3.0" powder. The smaller chunks of material were pre-sintered in argon and then HIPed, both as described in Example 31. The density of the resulting Example 32 material was 6.08 $g/cm^3$, which was 100.5% of what was believed to be what was believed to be theoretical density.

Example 32 coated abrasive discs were prepared as described in Example 1, except 27 grams of Example 32 abrasive particles were used in place of the Example 1 abrasive particles.

Example 33

Small chunks of pre-abrasive material were prepared as described in Example 28 (broken by mortar and pestle after CIPing) except 325 grams of yttria-stabilized zirconia powder (obtained under the trade designation "TZ-3Y" (nominal composition of 94.8 wt % $ZrO_2$ (+$HfO_2$), and 5.1 wt % $Y_2O_3$, with the balance being comprised of impurities such as $Al_2O_3$, $SiO_2$, $Fe_2O_3$, and $Na_2O$) from Tosoh Ceramics Division of Bound Brook, N.J.), was used instead of 345 grams of the "HSY 3.0" powder. About 155 grams of the smaller chunks of material were pre-sintered in air at 1525° C. for 70 minutes using an electrically heated furnace (obtained under the trade designation "RAPID TEMP FURNACE Model #920001" from CM Furnaces of Bloomfield, N.J.). The chunks were heated from room temperature to 1525° C. at a heating rate of about 10° C./min., held at 1525° C. for 70 minutes, and then cooled to room temperature at a cooling rate of about 10° C./min. The flakes were then HIPed as described in Example 31. The density of the resulting Example 33 material was 6.07 $g/cm^3$, which was 100.3% of what was believed to be what was believed to be theoretical density.

Example 33 coated abrasive discs were prepared as described in Example 1, except 27 grams of Example 33 abrasive particles were used in place of the Example 1 abrasive particles.

Example 34

A polyethylene bottle was charged with 295.7 grams of magnesia-stabilized zirconia powder (obtained under the trade designation "MSZ 8.0" (nominal composition of 95.3 wt % $ZrO_2$ (+$HfO_2$), and 3.0 wt % MgO, with the balance being comprised of impurities such as CaO, and $Na_2O$) from Zirconia Sales, Inc. of Marietta, Ga.), 0.3 gram of ammonium hydrogen citrate powder (catalog #24,756-1), and 257.6 grams of distilled water. 0.5 gram of a dispersing agent ("TERGITOL MIN-FOAM 1X SURFACTANT") and 0.5 gram of a defoamer to reduce entrapped air in the solution ("FOAMKILL 852") were added to the mixture. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, the slurry was dried and the flakes were burned out as described in Example 2. The burned out flakes were pre-sintered in air at 1555° C. for 70 minutes using an electrically heated furnace ("RAPID TEMP FURNACE Model #920001"). The flakes were heated from room temperature to 1555° C. at a heating rate of about 10° C./min., held at 1555° C. for 70 minutes, and then cooled to room temperature at a cooling rate of about 10° C./min. The flakes were then HIPed as described in Example 31. The density of the resulting Example 34 material was 5.72 $g/cm^3$, which was 98.7% of what was believed to be theoretical density.

Example 34 coated abrasive discs were prepared as described in Example 1, except 27 grams of Example 34 abrasive particles were used in place of the Example 1 abrasive particles.

Example 35

Small chunks of pre-abrasive material were prepared as described in Example 28 (broken by mortar and pestle after CIPing) except 325 grams of magnesia-stabilized zirconia powder "MSZ-8.0" was used instead of 345 grams of the "HSY 3.0" powder. About 225 grams of the smaller chunks of material were pre-sintered in argon at 1465° C. for 70 minutes using a controlled atmosphere furnace (Model No. 1000-4560FP). The flakes were heated from room temperature to 1465° C. at a heating rate of about 10° C./min., held at 1465° C. for 70 minutes, cooled to 800° C. at a cooling rate of about 10° C./min., and then cooled to room temperature by turning off the power to the furnace. The chunks were then HIPed as described in Example 31. The density of the resulting Example 35 material was 5.73 g/cm$^3$, which was 98.8% of what was believed to be theoretical density.

Example 35 coated abrasive discs were prepared as described in Example 1, except 27 grams of Example 35 abrasive particles were used in place of the Example 1 abrasive particles.

Example 36

A polyethylene bottle was charged with 295.7 grams of ceria-stabilized zirconia powder (obtained under the trade designation "CEZ 10" (nominal composition of 86 wt % ZrO$_2$ (+HfO$_2$), and 13.3 wt % CeO$_2$, with the balance being comprised of impurities such as CaO, and Na$_2$O) from Zirconia Sales, Inc. of Marietta, Ga.), 2.3 gram of ammonium hydrogen citrate powder (catalog #24,756-1), and 257.6 grams of distilled water. 0.4 gram of a dispersing agent ("TERGITOL MIN-FOAM 1X SURFACTANT") and 0.5 gram of a defoamer to reduce entrapped air in the solution ("FOAMKILL 852") were added to the mixture. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, the slurry was dried and the flakes were burned out as described in Example 2. The burned out flakes were pre-sintered in air at 1555° C. for 70 minutes as described for Example 34. The density of the flakes after pre-sintering in air was 6.18 g/cm$^3$, which was 99.7% of what was believed to be theoretical density. The flakes were then HIPed as described in Example 31. The density of the resulting Example 36 material was 5.98 g/cm$^3$, which was 96.5% of what was believed to be theoretical density.

Example 36 coated abrasive discs were prepared as described in Example 1, except 27 grams of Example 36 abrasive particles were used in place of the Example 1 abrasive particles.

Example 37

Small chunks of pre-abrasive material were prepared procedure as described in Example 28 (broken by mortar and pestle after CIPing) except 290 grams of ceria-stabilized zirconia powder "CEZ-10" was used instead of 345 grams of the "HSY 3.0" powder. The small chunks were pre-sintered in air at 1555° C. for 70 minutes as described for Example 34. The density of the flakes after pre-sintering in air was 6.00 g/cm$^3$, which was 96.8% of what was believed to be theoretical density. The chunks were then HIPed as described in Example 31. The density of the resulting Example 37 material was 6.12 g/cm$^3$, which was 98.7% of what was believed to be theoretical density.

Example 37 coated abrasive discs were prepared as described in Example 1, except 27 grams of Example 37 abrasive particles were used in place of the Example 1 abrasive particles.

Example 38

Flakes of burned-out pre-abrasive material were prepared as described in Example 2 (i.e., heating to 690° C. for 1 hour) except 295.7 grams of yttria-stabilized zirconia powder (obtained under the trade designation "HSY 8.0" (nominal composition of 85.7 wt % ZrO$_2$ (+HfO$_2$), and 13.7 wt % Y$_2$O$_3$, with the balance being comprised of impurities such as Al$_2$O$_3$, CaO, and Na$_2$O) from Zirconia Sales, Inc. of Marietta, Ga.), was used instead of 295.7 grams of the "HSY 3.0" powder. (The "HSY 8.0" powder contains enough yttria to "fully-stabilize" the zirconia, while the "HSY 3.0" powder is only "partially-stabilized.") The flakes of burned-out material were pre-sintered in argon and then HIPed, both as described in Example 31. The density of the resulting Example 38 material was 5.94 g/cm$^3$, which was 100.7% of what was believed to be what was believed to be theoretical density.

The average microhardness of Example 38 material was measured as described in Example 3. The average microhardness of Example 38 material was 12.8 GPa.

The average indentation toughness of Example 38 material was measured as described in Example 19, except an indentation load of 500 grams was used. Additionally, the "MITUTOYO MVK-VL" hardness tester of Example 3 was used instead of the "LEITZ MINILOAD," and an optical microscope was used to measure indentation crack lengths. The average indentation toughness of Example 38 material was 2.9 MPa·m$^{1/2}$.

Example 38 coated abrasive discs were prepared as described in Example 1, except 27 grams of Example 38 abrasive particles were used in place of the Example 1 abrasive particles.

Example 39

Small chunks of pre-abrasive material were prepared as described in Example 28 (broken by mortar and pestle after HIPing) except 325 grams of yttria-stabilized zirconia powder "HSY 8.0" was used instead of 345 grams of the "HSY 3.0" powder. Small chunks of the material were pre-sintered in argon at 1465° C. for 70 minutes as described in Example 35. The chunks were then HIPed as described in Example 31. The density of the resulting Example 39 material was 5.94 g/cm$^3$, which was 100.7% of what was believed to be what was believed to be theoretical density.

Example 39 coated abrasive discs were prepared as described in Example 1, except 27 grams of Example 39 abrasive particles were used in place of the Example 1 abrasive particles.

Example 40

Small chunks of pre-abrasive material were prepared as described in Example 28 (broken by mortar and pestle after CIPing) except 325 grams of yttria-stabilized zirconia powder (obtained under the trade designation "TZ-8Y" (nominal composition of 96.5 wt % ZrO$_2$ (+HfO$_2$), and 13.3 wt % Y$_2$O$_3$, with the balance being comprised of impurities such as Al$_2$O$_3$, SiO$_2$, Fe$_2$O$_3$, and Na$_2$O) from Tosoh Ceramics Division of Bound Brook, N.J.) was used instead of 345 grams of the "HSY 3.0" powder. (The "TZ-8Y" powder contains enough yttria to "fully-stabilize" the zirconia, while the "TZ-3Y" powder is only "partially-stabilized.") About 155 grams of the small chunks of material were pre-sintered in air at 1525° C. for 70 minutes as described in Example 33. The chunks were then HIPed as described in Example 31. The density of the resulting Example 40 material was 5.96 g/cm³, which was 101.1% of what was believed to be what was believed to be theoretical density.

Example 40 coated abrasive discs were prepared as described in Example 1, except 27 grams of Example 40 abrasive particles were used in place of the Example 1 abrasive particles.

Example 41

Flakes of burned-out pre-abrasive material were prepared as described in Example 2 (i.e., heating to 690° C. for 1 hour). About 300 grams of flakes were heat-treated in argon at 1140° C. for 1 hour using a controlled atmosphere furnace (Model No. 1000-4560FP). The flakes were heated from room temperature to 1140° C. at a heating rate of about 10° C./min., held at 1140° C. for 1 hour, cooled to 800° C. at a cooling rate of about 10° C./min., and then cooled to room temperature by turning off the power to the furnace.

The heat-treated flakes were crushed and graded into particles as described in Example 29. About 120 grams of the resultant particles were then pre-sintered in argon as described in Example 35, and then HIPed as described in Example 31.

Example 41 coated abrasive discs were prepared as described in Example 1, except 27 grams of Example 41 abrasive particles were used in place of the Example 1 abrasive particles.

Grinding Performance of Examples 31–41 and Comparative Example A

The grinding performance of Examples 31–41 and Comparative Example A coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 9, below.

TABLE 9

| Example | 12 Min. total cut, g | 18 Min. total cut, g |
|---|---|---|
| Comp. Ex. A | 1161 | 1162* |
| 31 | 2284 | 3310 |
| 32 | 2400 | 3541 |
| 33 | 1279 | 1309** |
| 34 | 1454 | 1457*** |
| 35 | 1617 | 1863 |
| 36 | 569**** | — |
| 37 | 457^ | — |
| 38 | 102^^ | — |
| 39 | 75^^^ | — |
| 40 | 62^^^ | — |
| 41 | 2488 | 3717 |

*test stopped after 13 minutes due to a low cut rate of 1 g/min.
**test stopped after 15 minutes due to a low cut rate of 1 g/min.
***test stopped after 13 minutes due to a low cut rate of 3 g/min.
****test stopped after 10 minutes due to a low cut rate of 3 g/min.
^test stopped after 8 minutes due to a low cut rate of 2 g/min.
^^test stopped after 4 minutes due to a low cut rate of 5 g/min.
^^^test stopped after 3 minutes due to a low cut rate of 1 g/min.

Example 42

A polyethylene bottle was charged with 300.0 grams of yttria-stabilized zirconia powder ("HSY 3.0"), 1.5 grams of ammonium hydrogen citrate powder (catalog #24,756-1), and 80.2 grams of distilled water. About 470 grams of magnesia-stabilized zirconia milling media (12.7 mm diameter; 97% zirconia; obtained from U.S. Stoneware Corp.) were added to the bottle, and the mixture was milled for 1.5 hour to deagglomerate the powder.

Following milling, flakes of burned-out pre-abrasive material were prepared as described in Example 2. About 280 grams of the flakes that had been heated to 690° C. were pre-sintered in argon at 1440° C. for 70 minutes using a controlled atmosphere furnace (Model No. 1000-4560FP). The flakes were heated from room temperature to 1440° C. at a heating rate of about 10° C./min., held at 1440° C. for 70 minutes, cooled to 800° C. at a cooling rate of about 10° C./min., and then cooled to room temperature by turning off the power to the furnace. The flakes were then HIPed at 1385° C. for 65 minutes in argon at a pressure of about 207 MPa. The flakes were heated from room temperature to 1200° C. at a heating rate of about 20° C./min., heated from 1200° C. to 1385° C. at a heating rate of about 13° C./min., held at 1385° C. for 65 minutes, and then cooled to room temperature at a cooling rate of about 30° C./min. The density of the resulting Example 42 material was 6.07 g/cm³, which was 100.3% of what was believed to be what was believed to be theoretical density.

Example 42 coated abrasive discs were prepared as described in Example 1, except 27 grams of Example 42 abrasive particles were used in place of the Example 1 abrasive particles.

Example 43

A polyethylene bottle was charged with 300.3 grams of yttria-stabilized zirconia powder ("HSY 3.0"), 1.5 grams of ammonium hydrogen citrate powder (catalog #24,756-1), and 100.4 grams of distilled water. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, flakes of burned-out pre-abrasive material were prepared as described in Example 2. About 280 grams of flakes were pre-sintered in argon and HIPed, both as described in Example 42. The density of the resulting Example 43 material was 6.06 g/cm³, which was 100.1% of what was believed to be what was believed to be theoretical density.

Example 43 coated abrasive discs were prepared as described in Example 1, except 27 grams of Example 43 abrasive particles were used in place of the Example 1 abrasive particles.

Example 44

A polyethylene bottle was charged with 300.3 grams of yttria-stabilized zirconia powder ("HSY 3.0"), 1.6 gram of ammonium hydrogen citrate powder (catalog #24,756-1), and 120.0 grams of distilled water. About 470 grams of magnesia-stabilized zirconia milling media (12.7 mm diameter; 97% zirconia; obtained from U.S. Stoneware Corp.) were added to the bottle, and the mixture was milled for 1.5 hour to de-agglomerate the powder.

Following milling, flakes of burned-out pre-abrasive material were prepared as described in Example 2. About 280 grams of flakes were pre-sintered in argon and HIPed, both as described in Example 42.

Example 44 coated abrasive discs were prepared as described in Example 1, except 27 grams of Example 44 abrasive particles were used in place of the Example 1 abrasive particles.

Grinding Performance of Examples 42–44 and Comparative Example A

The grinding performance of Examples 42–44 and Comparative Example A coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 10, below.

TABLE 10

| Example | 12 Min. total cut, g | 18 Min. total cut, g |
| --- | --- | --- |
| Comp. Ex. A | 1150 | 1152* |
| 42 | 2425 | 3461 |
| 43 | 2373 | 3298 |
| 44 | 2391 | 3514 |

*test stopped after 13 minutes due to a low cut rate of 2 g/min.

Example 45

A 0.25 gallon (946 ml) polyurethane mill jar (obtained under the trade designation "Abbethane Jar" from Paul Abbe, Inc. of Little Falls, N.J.) was charged with 399.9 grams of yttria-stabilized zirconia powder ("HSY 3.0"), 99.9 grams of alumina powder ("APA 0.5"), 1.6 gram of ammonium hydrogen citrate powder (catalog #24,756-1), and 151.5 grams of distilled water. About 1200 grams of yttria-stabilized zirconia milling media (9.53 mm diameter; 95% zirconia; obtained from Tosoh Ceramics Division of Bound Brook, N.J.) were added to the mill jar, and the mixture was milled for 48 hours to de-agglomerate and mix the powders.

Following milling, the slurry was dried as described in Example 2. The organic component was burned out of the flakes by heating them in air at 600° C. for 1 hour. The flakes were heated from room temperature to 600° C. at a heating rate of about 1° C./min., held at 600° C. for 1 hour, and then cooled to room temperature by turning off the power to the furnace. About 250 grams of the burned-out flakes were sintered in air at 1475° C. for 2 hours using an electrically heated furnace (obtained under the trade designation "Model KKSK-666-3100" from Keith Furnaces of Pico Rivera, Calif.). The flakes were heated from room temperature to 1475° C. at a heating rate of about 20° C./min., held at 1475° C. for 2 hour, and then cooled to room temperature at a cooling rate of about 20° C./min.

The average microhardness of Example 45 material was measured as described in Example 3. The average microhardness of Example 45 material was 14.8 GPa.

Figure 10:
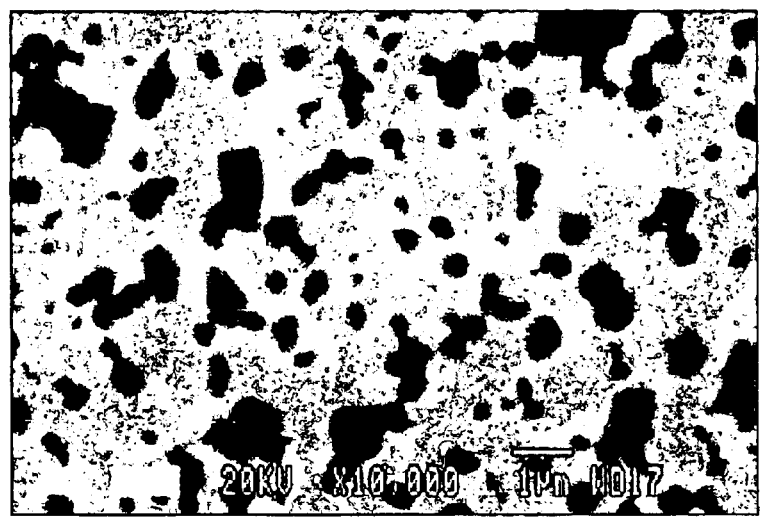
FIG. 10 is a scanning electron photomicrograph of a polished cross-section of Example 45 abrasive materials.

FIG. 10 is a digital image of a scanning electron microscope (SEM) micrograph of a polished surface of the Example 45 material. The polished surface was prepared as described in Example 3 for microhardness testing. The polished surface was coated with a thin layer of carbon and viewed at an angle normal to the polished face using a scanning electron microscope (obtained under the trade designation "JEOL Model 840 SEM" from JEOL, Ltd. of Akishima, Japan) in the backscattered electron-imaging (BSEI) mode. The average grain size of the $Al_2O_3$ phase (dark phase) in Example 45 material was about 0.9 micrometer (with a range of 0.4–1.6 micrometer).

Example 45 coated abrasive discs were prepared using the procedure as described in Example 1, except 25 grams of Example 45 abrasive particles were used in place of the Example 1 abrasive particles.

Example 46

A 0.25 gallon (946 ml) polyurethane mill jar ("Abbethane Jar") was charged with 300.5 grams of yttria-stabilized zirconia powder ("HSY 3.0"), 200.5 grams of alumina powder ("APA 0.5"), 1.6 gram of ammonium hydrogen citrate powder (catalog #24,756-1), and 152.9 grams of distilled water. About 1200 grams of yttria-stabilized zirconia milling media (9.53 mm diameter; 95% zirconia; obtained from Tosoh Ceramics) were added to the mill jar, and the mixture was milled for 48 hours to de-agglomerate and mix the powders.

Following milling, the slurry was dried as described in Example 2. The flakes were heated to 600° C. as described in Example 45 to burnout the organic component. About 250 grams of the burned-out flakes were sintered in air at 1475° C. for 2 hours as described in Example 45. The average microhardness of Example 46 material was measured as described in Example 3. The average microhardness of Example 46 material was 16.7 GPa.

Figure 11:
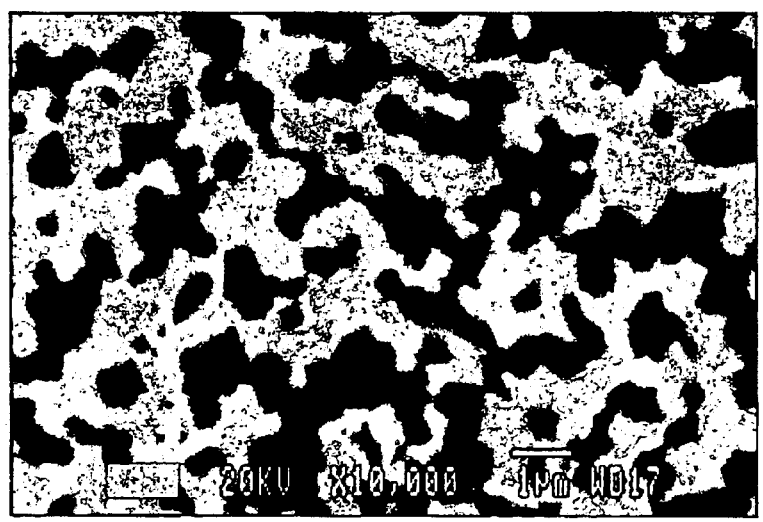
FIG. 11 is a scanning electron photomicrograph of a polished cross-section of Example 46 abrasive materials.

FIG. 11 is a digital image of a scanning electron microscope (SEM) micrograph of a polished surface of Example 46 material. The polished surface was prepared and imaged as described in Example 45. The average grain size of the $Al_2O_3$ phase (dark phase) in Example 46 material was about 1.1 micrometer (with a range of 0.6–1.8 micrometer).

Example 46 coated abrasive discs were prepared as described in Example 1, except 25 grams of Example 46 abrasive particles were used in place of the Example 1 abrasive particles.

Grinding Performance of Examples 45–46 and Comparative Example C

The grinding performance of Examples 45–46 and Comparative Example C coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 11, below.

TABLE 11

| Example | 12 Min. total cut, g | 18 Min. total cut, g |
| --- | --- | --- |
| Comp. Ex. C | 1169* | — |
| 45 | 2747 | 3738 |
| 46 | 2765 | 3645 |

*test stopped after 12 minutes due to a low cut rate of 3 g/min.

Example 47

About 200 grams of the burned-out flakes of Example 45 were pre-sintered in argon and then HIPed, as described in Example 42. The density of the resulting Example 47 material was 5.49 g/cm$^3$, which was 100.3% of what was believed to be what was believed to be theoretical density.

The average microhardness of Example 47 was measured as described in Example 3. The average microhardness of Example 47 was 15.3 GPa.

Figure 12:
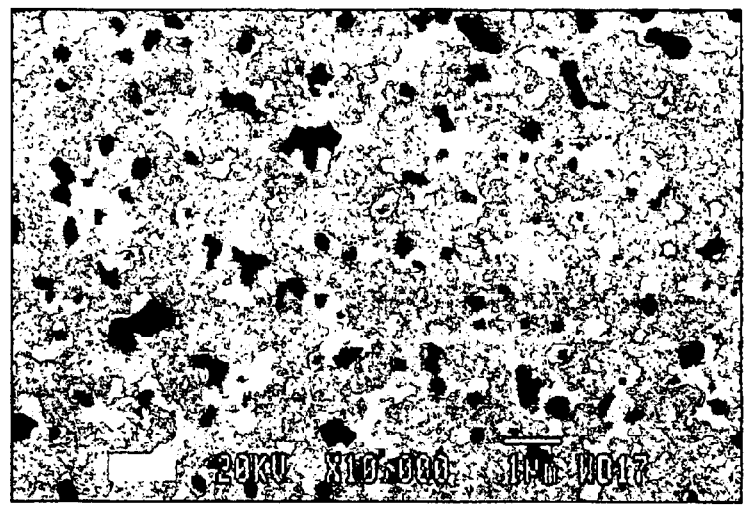
FIG. 12 is a scanning electron photomicrograph of a polished cross-section of Example 47 abrasive materials.

FIG. 12 is a digital image of a scanning electron microscope (SEM) micrograph of a polished surface of Example 47 material. The polished surface was prepared and imaged as described in Example 45. The average grain size of the Al$_2$O$_3$ phase (dark phase) in Example 47 material was about 0.5 micrometer (with a range of 0.3–0.8 micrometer).

Example 47 coated abrasive discs were prepared as described in Example 1, except 24 grams of Example 47 abrasive particles were used in place of the Example 1 abrasive particles.

Example 48

About 200 grams of the burned-out flakes of Example 46 were pre-sintered in argon and then HIPed as described in Example 42. The density of the resulting Example 48 material was 5.01 g/cm$^3$, which was 100.4% of what was believed to be what was believed to be theoretical density. The average microhardness of Example 48 material was measured as described in Example 3. The average microhardness of Example 48 material was 17.4 GPa.

Figure 13:
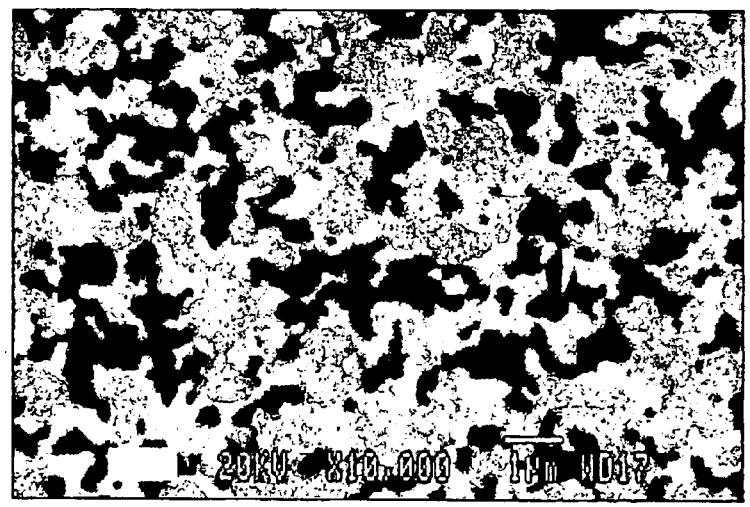
FIG. 13 is a scanning electron photomicrograph of a polished cross-section of Example 48 abrasive materials.

FIG. 13 is a digital image of a scanning electron microscope (SEM) micrograph of a polished surface of Example 48 material. The polished surface was prepared and imaged as described in Example 45. The average grain size of the Al$_2$O$_3$ phase (dark phase) in Example 48 material was about 0.6 micrometer (with a range of 0.4–1.2 micrometer).

Example 48 coated abrasive discs were prepared as described in Example 1, except 22 grams of Example 48 abrasive particles were used in place of the Example 1 abrasive particles.

Example 49

Flakes of burned-out material were prepared as described in Example 42 (i.e., heating to 690° C. for 1 hour). Flakes were then heat-treated in argon at 1140° C. for 1 hour as described in Example 41. Flakes were crushed by hand using a mortar and pestle and graded as described in Example 29 to produce particles.

The resultant particles were then pre-sintered in argon at 1455° C. for 70 minutes using a controlled atmosphere furnace (Model No. 1000-4560FP). The particles were heated from room temperature to 1455° C. at a heating rate of about 10° C./min., held at 1455° C. for 70 minutes, cooled to 800° C. at a cooling rate of about 10° C./min., and then cooled to room temperature by turning off the power to the furnace. The particles were then HIPed as described in Example 19.

The average microhardness of Example 49 material was measured as described in Example 3. The average microhardness of Example 49 material was 13.2 GPa.

Example 49 coated abrasive discs were prepared as described in Example 1, except 26.5 grams of Example 49 abrasive particles were used in place of the Example 1 abrasive particles.

Comparative Example D

Comparative Example D coated abrasive discs were prepared as described in Example 1, except 17.6 grams of sol-gel derived abrasive particles ("321 CUBITRON") were used in place of 30 grams of the Example 1 abrasive particles.

Grinding Performance of Examples 47–49 and Comparative Example D

The grinding performance of Examples 47–49 and Comparative Example D coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 12, below.

TABLE 12

| Example | 12 Min. total cut, g | 18 Min. total cut, g |
| --- | --- | --- |
| Comp. Ex. D | 1384 | 1401* |
| 47 | 2719 | 3834 |
| 48 | 2521 | 3258 |
| 49 | 2592 | 3320 |

*test stopped after 14 minutes due to a low cut rate of 3 g/min.

Example 50

Example 50 coated abrasive discs were prepared as described in Example 1, except 24 grams of Example 19 abrasive particles were used in place of the Example 1 abrasive particles, and the Example 19 particles had been graded to retain the −40+45 and −45+50 mesh fractions (USA Standard Testing Sieves). These two mesh fractions were combined to provide a 50/50 blend.

Comparative Example E

Comparative Example E coated abrasive discs were prepared as described in Example 1, except 24 grams of sol-gel derived abrasive particles ("321 CUBITRON") that had been graded to retain the −40+45 and −45+50 mesh fractions (USA Standard Testing Sieves) and combined to provide a 50/50 blend were used in place of 30 grams of the Example 1 abrasive particles.

Comparative Example F

Comparative Example F coated abrasive discs were prepared as described in Example 1, except 24 grams of sol-gel derived abrasive particles (marketed by the 3M Company, St. Paul, Minn. under the trade designation "222 CUBITRON") that had been graded to retain the −40+45 and −45+50 mesh fractions (USA Standard Testing Sieves) and combined to provide a 50/50 blend were used in place of 30 grams of the Example 1 abrasive particles.

Comparative Example G

Comparative Example G coated abrasive discs were prepared as described in Example 1, except 24 grams of sol-gel derived abrasive particles (marketed by the 3M Company, St. Paul, Minn. under the trade designation "201 CUBITRON") that had been graded to retain the −40+45 and −45+50 mesh fractions (USA Standard Testing Sieves) and combined to provide a 50/50 blend were used in place of 30 grams of the Example 1 abrasive particles.

Grinding Performance of Example 50 and Comparative Examples E–G

The grinding performance of Example 50 and Comparative Examples E–G coated abrasive discs were evaluated as described above under the heading "Grinding Performance of Example 1 and Comparative Example A," except the length of the test was up to 16 minutes, and the loads applied were 6.4, 7.3, 10.1 and 17.3 kg. The total cuts after 12 and 16 minutes of grinding are reported in Tables 13 (6.4 kg), 14 (7.3 kg), 15 (10.1 kg) and 16 (17.3 kg), respectively below.

TABLE 13

| Example | 12 Min. total cut, g | 16 Min. total cut, g |
| --- | --- | --- |
| 50 | 669 | 857 |
| Comp. Ex. E | 846 | 1035 |
| Comp. Ex. F | 916 | 1065 |
| Comp. Ex. G | 720 | 906 |

TABLE 14

| Example | 12 Min. total cut, g | 16 Min. total cut, g |
| --- | --- | --- |
| 50 | 746 | 924 |
| Comp. Ex. E | 736 | 847 |
| Comp. Ex. F | 828 | 894 |
| Comp. Ex. G | 809 | 950 |

TABLE 15

| Example | 12 Min. total cut, g | 16 Min. total cut, g |
| --- | --- | --- |
| 50 | 1130 | 1199 |
| Comp. Ex. E | 726 | 727* |
| Comp. Ex. F | 623** | — |
| Comp. Ex. G | 972 | 1052 |

*test stopped after 13 minutes due to a low cut rate of 1 g/min.
**test stopped after 11 minutes due to a low cut rate of 2 g/min.

TABLE 16

| Example | 12 Min. total cut, g |
| --- | --- |
| 50 | 998* |
| Comp. Ex. E | 463** |

*test stopped after 9 minutes due to a low cut rate of 2 g/min.
**test stopped after 7 minutes due to a low cut rate of 2 g/min.

Example 51

A 0.25 gallon (946 ml) polyurethane mill jar ("Abbethane Jar") was charged with 501.4 grams of yttria-stabilized zirconia powder ("HSY 3.0"), 1.5 grams of ammonium hydrogen citrate powder (catalog #24,756-1), and 150.8 grams of distilled water. About 1150 grams of yttria-stabilized zirconia milling media (9.53 mm diameter; 95% zirconia; obtained from Tosoh Ceramics) were added to the mill jar, and the mixture was milled for 54 hours to de-agglomerate and mill the powders.

Following milling, the slurry was dried and the flakes were heated to 690° C. as described in Example 2 to burnout the organic component. Flakes were then heat-treated in argon at 1140° C. for 1 hour as described in Example 41. Flakes were then crushed by hand using a mortar and pestle to produce particles that were graded to retain the −16+18, −18+20, −20+25, −25+30 and −30+35 mesh fractions (USA Standard Testing Sieves). About 100 grams of the resultant particles were then pre-sintered in argon at 1415° C. for 70 minutes using a controlled atmosphere furnace (Model No. 1000-4560FP). The particles were heated from room temperature to 1415° C. at a heating rate of about 10° C./min., held at 1415° C. for 70 minutes, cooled to 800° C. at a cooling rate of about 10° C./min., and then cooled to room temperature by turning off the power to the furnace. The density of the resulting Example 51 particles was 6.05 g/cm$^3$, which was 100.0% of what was believed to be theoretical density.

The particles were then HIPed by heating the particles to 1365° C. for 60 minutes in argon at a pressure of about 207 MPa. The particles were heated from room temperature to 1200° C. at a heating rate of about 20° C./min., heated from 1200° C. to 1365° C. at a heating rate of about 13° C./min., held at 1365° C. for 60 minutes, and then cooled to room temperature at a cooling rate of about 30° C./min. The density of the resulting Example 51 particles was 6.06 g/cm$^3$, which was 100.1% of what was believed to be what was believed to be theoretical density.

Example 51 coated abrasive discs were prepared as described in Example 1, except 26.5 grams of Example 51 abrasive particles were used in place of the Example 1 abrasive particles.

Example 52

About 100 grams of the Example 51 heat-treated, crushed and graded particles were sintered in argon at 1430° C. for 70 minutes using a controlled atmosphere furnace (Model No. 1000-4560FP). The particles were heated from room temperature to 1430° C. at a heating rate of about 10° C./min., held at 1430° C. for 70 minutes, cooled to 800° C. at a cooling rate of about 10° C./min., and then cooled to room temperature by turning off the power to the furnace. The density of the resulting Example 52 particles was 6.06 g/cm$^3$, which was 100.1% of what was believed to be what was believed to be theoretical density.

Example 52 coated abrasive discs were prepared as described in Example 1, except 26.5 grams of Example 52 abrasive particles were used in place of the Example 1 abrasive particles.

Example 53

Flakes of burned-out pre-abrasive material were prepared as described in Example 42 (i.e., heating to 690° C. for 1 hour). Flakes were then heat-treated in argon at 1140° C. for 1 hour as described in Example 41. Flakes were then crushed mechanically using a "Chipmunk" jaw crusher (Model No. 241-34) into particles and graded to retain the −16+18, −18+20, −20+25, −25+30, and −30+35 mesh fractions (USA Standard Testing Sieves).

The resultant particles were then pre-sintered in argon at 1455° C. for 70 minutes as described in Example 49. The density of the resulting particles was 6.05 g/cm$^3$, which was 100.0% of what was believed to be theoretical density. The particles were then HIPed as described in Example 19. The density of the resulting Example 53 particles was 6.06 g/cm$^3$, which was 100.1% of what was believed to be what was believed to be theoretical density.

Example 53 coated abrasive discs were prepared as described in Example 1 except 26.5 grams of Example 53 abrasive particles were used in place of the Example 1 abrasive particles.

Grinding Performance of Examples 51–53 and Comparative Example B

The grinding performance of Examples 51–53 and Comparative Example B coated abrasive discs were evaluated as described above under the heading "Grinding Performance of Example 1 and Comparative Example A," except the length of the test was up to 24 minutes and load was 17.3 kg. The total cuts after 12, 18 and 24 minutes of grinding are reported in Table 17, below.

TABLE 17

| Example | 12 Min. total cut, g | 18 Min. total cut, g | 24 Min. total cut, g |
|---|---|---|---|
| Comp. Ex. B | 1317* | * | * |
| 51 | 2376 | 3561 | 4521 |
| 52 | 2563 | 3656 | 4306 |
| 53 | 2504 | 3651 | 4222 |

*test stopped after 12 minutes due to a low cut rate of 5 g/min.

Examples 54–57

A 0.25 gallon (946 ml) polyurethane mill jar ("Abbethane Jar") was charged with 500.0 grams of yttria-stabilized zirconia powder ("HSY 3.0"), 1.5 grams of ammonium hydrogen citrate powder (catalog #24,756-1), and 150.0 grams of distilled water. About 1050 grams of yttria-stabilized zirconia milling media (9.53 mm diameter; 95% zirconia; obtained from Tosoh Ceramics) were added to the mill jar, and the mixture was milled for 54 hours to de-agglomerate and mill the powders.

Following milling, the slurry was dried and the flakes were heated to 690° C. as described in Example 2. Flakes were then heat-treated in argon at 1140° C. for 1 hour as described in Example 41. Flakes were then crushed mechanically using a "Chipmunk" jaw crusher using the procedure as described in Example 53 to produce particles that were graded to retain the −20+25, −25+30, −30+35, −35+40 and −40+45 mesh fractions (USA Standard Testing Sieves).

The resultant particles were then pre-sintered in argon at 1420° C. for 70 minutes using a controlled atmosphere furnace (Model No. 1000-4560FP). The particles were heated from room temperature to 1420° C. at a heating rate of about 10° C./min., held at 1420° C. for 70 minutes, cooled to 800° C. at a cooling rate of about 10° C./min., and then cooled to room temperature by turning off the power to the furnace. The particles were then HIPed by heating the particles to 1365° C. for 65 minutes in argon at a pressure of about 207 MPa. The particles were heated from room temperature to 1200° C. at a heating rate of about 20° C./min., heated from 1200° C. to 1365° C. at a heating rate of about 13° C./min., and then cooled to room temperature at a cooling rate of about 30° C./min. The density of the resulting Example 54 particles was 6.05 g/cm³, which was 100.0% of what was believed to be theoretical density.

The average microhardness of Example 54 material was measured as described in Example 3. The average microhardness of Example 54 material was 13.2 GPa. The average indentation toughness of Example 54 material was measured as described in Example 19. The average indentation toughness of Example 54 material was 6.3 MPa·m$^{1/2}$.

Multiple batches of Example 54 (abrasive) particles were made to perform the grinding steps described below. Exact amount of various raw materials in these multiple batches varied by less than 0.5% from the standard amounts stated above. Processing temperatures varied by less than ±5° C. from the standard temperatures stated above.

Examples 54, 55, 56 and 57 coated abrasive discs were prepared as described in Example 1, except 17.5 grams, 22.0 grams, 26.5 grams and 31.5 grams, respectively, of Example 54 abrasive particles were used in place of the Example 1 abrasive particles.

Grinding Performance of Examples 54–57 and Comparative Example B

The grinding performance of Examples 54–57 and Comparative Example B coated abrasive discs were evaluated as described above under the heading "Grinding Performance of Example 1 and Comparative Example A," except the length of the test was up to 30 minutes and load was 17.3 kg. The total cuts after 12, 18, 24, and 30 minutes of grinding are reported in Table 18, below.

TABLE 18

| Example | 12 Min. total cut, g | 18 Min. total cut, g | 24 Min. total cut, g | 30 Min. total cut, g |
|---|---|---|---|---|
| Comp. Ex. B | 1133 | 1140* | * | * |
| 54 | 2293 | 3356 | ** | ** |
| 55 | 2568 | 3828 | 4865 | *** |
| 56 | 2463 | 3658 | 4783 | 5836 |
| 57 | 2391 | 3261 | **** | **** |

*test stopped after 13 minutes due to a low cut rate of 7 g/min.
** test stopped after 18 minutes with a cut rate of 165 g/min.
*** test stopped after 24 minutes with a cut rate of 153 g/min.
**** test stopped after 18 minutes with a cut rate of 89 g/min.

Examples 58–60

Examples 58–60 coated abrasive discs were prepared as described in Example 1, except 18, 22, and 26 grams, respectively, of Example 54 abrasive particles were used in place of the Example 1 abrasive particles and the Example 54 particles had been graded to retain the −35+40 and −40+45 mesh fractions (USA Standard Testing Sieves). These two mesh fractions were combined to provide a 50/50 blend.

Comparative Example H

Comparative Example H coated abrasive discs were prepared as described in Example 1, except 14.9 grams of sol-gel derived abrasive particles ("321 CUBITRON") that had been graded to retain the −35+40 and −40+45 mesh fractions (USA Standard Testing Sieves) and combined to provide a 50/50 blend were used in place of 30 grams of the Example 1 abrasive particles.

Grinding Performance of Examples 58–60 and Comparative Example H

The grinding performance of Examples 58–60 and Comparative Example H coated abrasive discs were evaluated as described above under the heading "Grinding Performance of Example 1 and Comparative Example A," except the length of the test was 18 minutes and load was 10.1 kg. The total cuts after 12 and 18 minutes of grinding are reported in Table 19, below.

TABLE 19

| Example | 12 Min. total cut, g | 18 Min. total cut, g |
|---|---|---|
| Comp. Ex. H | 1105 | 1366 |
| 58 | 1501 | 2134 |
| 59 | 1468 | 2125 |
| 60 | 1438 | 1979 |

Example 61

A 0.25 gallon (946 ml) polyurethane mill jar ("Abbethane Jar") was charged with 265.7 grams of yttria-stabilized zirconia powder ("HSY 3.0"), 29.5 grams of alumina powder ("APA 0.5"), 0.9 grams of ammonium hydrogen citrate powder (catalog #24,756-1), and 90.0 grams of distilled water. About 470 grams of yttria-stabilized zirconia milling media (9.53 mm diameter; 95% zirconia; obtained from Tosoh Ceramics) were added to the mill jar, and the mixture was milled for 54 hours to de-agglomerate and mill the powders.

Following milling, the slurry was dried and the flakes were heated to 690° C. as described in Example 2. Flakes were then heat-treated in argon at 1220° C. for 1 hour using a controlled atmosphere furnace (Model No. 1000-3560-FP20, available from Astro Industries of Santa Barbara, Calif.). The flakes were heated from room temperature to 1220° C. at a heating rate of about 10° C./min., held at 1220° C. for 1 hour, cooled to 800° C. at a cooling rate of about 10° C./min., and then cooled to room temperature by turning off the power to the furnace.

Flakes were then crushed mechanically using a "Chipmunk" jaw crusher as described in Example 53 to produce particles. The resultant particles were then pre-sintered in argon at 1420° C. for 70 minutes as described in Example 54. The resulting pre-sintered particles had a density of approximately 5.73 g/cm$^3$, which was 99.6% of what was believed to be theoretical density. The particles were then HIPed at 1365° C. for 65 minutes as described in Example 54. The density of the resulting Example 61 particles was 5.75 g/cm$^3$, which was 100.0% of what was believed to be theoretical density.

The average microhardness of Example 61 material was measured as described in Example 3. The average microhardness of Example 61 material was 14.0 GPa.

Example 61 coated abrasive discs were prepared as described in Example 1, except 25.2 grams of Example 61 abrasive particles were used in place of the Example 1 abrasive particles.

Example 62

A 0.25 gallon (946 ml) polyurethane mill jar ("Abbethane Jar") was charged with 280.56 grams of yttria-stabilized zirconia powder ("HSY 3.0"), 14.8 grams of alumina powder ("APA 0.5"), 1.0 gram of ammonium hydrogen citrate powder (catalog #24,756-1), and 90.1 grams of distilled water. About 470 grams of yttria-stabilized zirconia milling media (9.53 mm diameter; 95% zirconia; obtained from Tosoh Ceramics) were added to the mill jar, and the mixture was milled for 54 hours to de-agglomerate and mill the powders.

Following milling, the slurry was dried and the flakes were heated to 690° C. as described in Example 2. Flakes were then heat-treated in argon at 1220° C. for 1 hour as described for Example 61.

Flakes were then crushed mechanically using a "Chipmunk" jaw crusher as described in Example 53 to produce particles. The resultant particles were then pre-sintered in argon at 1420° C. for 70 minutes as described in Example 54. The resulting pre-sintered particles had a density of approximately 5.89 g/cm$^3$, which was 99.8% of what was believed to be theoretical density. The particles were then HIPed at 1365° C. for 65 minutes as described in Example 54. The density of the resulting Example 62 particles was 5.90 g/cm$^3$, which was 100.1% of what was believed to be what was believed to be theoretical density.

The average microhardness of Example 62 material was measured as described in Example 3. The average microhardness of Example 62 material was 13.7 GPa.

Example 62 coated abrasive discs were prepared as described in Example 1, except 25.8 grams of Example 62 abrasive particles were used in place of the Example 1 abrasive particles.

Grinding Performance of Examples 61–62 and Comparative Example B

The grinding performance of Examples 61 and 62 and Comparative Example B coated abrasive discs were evaluated as described above under the heading "Grinding Performance of Example 1 and Comparative Example A," except the length of the test was 18 minutes, and the load was 17.3 kg. The total cuts after 12 and 18 minutes of grinding are reported in Table 20, below.

TABLE 20

| Example | 12 Min. total cut, g | 18 Min. total cut, g |
|---|---|---|
| Comp. Ex. B | 1157 | 1162* |
| 61 | 2356 | 3381 |
| 62 | 2384 | 3511 |

*test stopped after 13 minutes due to a low cut rate of 5 g/min.

Example 63

A 0.25 gallon (946 ml) polyurethane mill jar ("Abbethane Jar") was charged with 400.0 grams of unstabilized zirconia powder (obtained under the trade designation "DK-1" (nominal composition of 99.5 wt % $ZrO_2$ (+$HfO_2$), with the balance being comprised of impurities such as $Al_2O_3$, $SiO_2$, $Fe_2O_3$, $TiO_2$ and $Na_2O$) from Zirconia Sales, Inc. of Marietta, Ga.), 100.0 grams of alumina powder ("APA 0.5"), 2.4 grams of ammonium hydrogen citrate powder (catalog #24,756-1), and 316.2 grams of distilled water. About 990 grams of yttria-stabilized zirconia milling media (9.53 mm diameter; 95% zirconia; obtained from Tosoh Ceramics) were added to the mill jar, and the mixture was milled for 48 hours to de-agglomerate and mix the powders.

Following milling, the slurry was dried as described in Example 2. The organic component was burned out of the flakes by heating them in air 600° C. for 1 hour as described in Example 45. About 250 grams of the burned out flakes were infiltrated with an aqueous solution of $Y(NO_3)_3.6H_2O$ (Catalog #237957, from Aldrich Chemical Company, of Milwaukee, Wis.) dried and calcined in air at 600° C. for 1 hour. The flakes were heated from room temperature to 600° C. at a heating rate of about 1° C./min., held at 600° C. for 1 hour, and then cooled to room temperature by turning off the power to the furnace. The $Y(NO_3)_3.6H_2O$ concentration in the infiltrate solution was such that resultant amount of $Y_2O_3$ in the calcined flakes was 7.3 wt % (with 18.5 wt % $Al_2O_3$ and 74.2 wt % $ZrO_2$). About 250 grams of the infiltrated, calcined flakes were sintered in air at 1475° C. for 2 hours as described in Example 45.

Example 63 coated abrasive discs were prepared as described in Example 1, except 25 grams of Example 63 abrasive particles were used in place of the Example 1 abrasive particles.

Grinding Performance of Example 63 and Comparative Example C

The grinding performance of Example 63 and Comparative Example C coated abrasive discs were evaluated as described above under the heading "Grinding Performance of Example 1 and Comparative Example A," except the length of the test was 12 minutes, and the load was 17.3 kg. The total cuts after 12 minutes of grinding are reported in Table 21, below.

TABLE 21

| Example | 12 Min. total cut, g |
|---|---|
| Comp. Ex. C | 1153 |
| 63 | 2357 |

Example 64

Example 64 coated abrasive discs were prepared as described in Example 1, except 23.1 grams of Example 54 abrasive particles were used in place of the Example 1 abrasive particles and the Example 54 particles had been graded to retain the −35+40 and −40+45 mesh fractions (USA Standard Testing Sieves). These two mesh fractions were combined to provide a 50/50 blend.

Example 65

A 1.6 gallon (6054 ml) polyurethane mill jar (obtained under the trade designation "Abbethane Jar" from Paul Abbe, Inc. of Little Falls, N.J.) was charged with 3200 grams of yttria-stabilized zirconia powder ("HSY 3.0"), 800 grams of alumina powder ("APA 0.5"), 12.4 grams of ammonium hydrogen citrate powder (catalog #24,756-1), and 1050 grams of distilled water. About 3500 grams of yttria-stabilized zirconia milling media (9.53 mm diameter; 95% zirconia; obtained from Tosoh Ceramics) were added to the mill, and the mixture was milled for 48 hours to de-agglomerate, mill and mix the powders.

Following milling, the slurry was dried as described in Example 2. The flakes were heated to 600° C. as described in Example 45 to burnout the organic component. Flakes were then crushed by hand using a mortar and pestle to produce particles that were graded to retain the −18+20, −20+25, −25+30 and −30+35 mesh fractions (USA Standard Testing Sieves). The particles were sintered in air at 1475° C. for 2 hours as described in Example 45. The density of the resulting Example 65 particles was 5.46 g/cm$^3$, which was 99.7% of what was believed to be theoretical density.

The average microhardness of Example 65 material was measured as described in Example 3. The average microhardness of Example 65 material was 14.6 GPa. The average indentation toughness of Example 65 material was measured as described in Example 19. The average indentation toughness of Example 65 material was 12.0 MPa·m$^{1/2}$.

Multiple batches of Example 65 abrasive particles were made to perform the grinding steps described below. Exact amount of various raw materials in these multiple batches varied by less than 0.5% from the standard amounts stated above. Processing temperatures varied by less than ±5° C. from the standard temperatures stated above.

Example 65 coated abrasive discs were prepared as described in Example 1, except 20.9 grams of Example 65 abrasive particles were used in place of the Example 1 abrasive particles.

Example 66

A 1.6 gallon (6054 ml) polyurethane mill jar ("Abbethane Jar") was charged with 2400 grams of yttria-stabilized zirconia powder ("HSY 3.0"), 1600 grams of alumina powder ("APA 0.5"), 12.4 grams of ammonium hydrogen citrate powder (catalog #24,756-1), and 1050 grams of distilled water. About 3500 grams of yttria-stabilized zirconia milling media (9.53 mm diameter; 95% zirconia; obtained from Tosoh Ceramics) were added to the mill, and the mixture was milled for 48 hours to de-agglomerate, mill and mix the powders.

Following milling, the slurry was dried as described in Example 2. The flakes were heated to 600° C. as described in Example 45 to burnout the organic component. Flakes were then crushed by hand using the procedure as described in Example 65 to produce particles. The particles were sintered in air at 1475° C. for 2 hours as described in Example 45. The density of the resulting Example 66 particles was 5.00 g/cm$^3$, which was 100.0% of what was believed to be theoretical density.

The average microhardness of Example 66 material was measured as described in Example 3. The average microhardness of Example 66 material was 15.6 GPa. The average indentation toughness of Example 66 material was measured as described in Example 19. The average indentation toughness of Example 66 material was 6.3 MPa·m$^{1/2}$.

Multiple batches of Example 66 abrasive particles were made to perform the grinding described below. Exact amount of various raw materials in these multiple batches varied by less than 0.5% from the standard amounts stated above. Processing temperatures varied by less than ±5° C. from the standard temperatures stated above.

Example 66 coated abrasive discs were prepared as described in Example 1, except 19.1 grams of Example 66 abrasive particles were used in place of the Example 1 abrasive particles.

Comparative Example I

Comparative Example I coated abrasive discs were prepared as described in Example 1, except 14.8 grams of sol-gel derived abrasive particles ("201 CUBITRON") that had been graded to retain the −35+40 and −40+45 mesh fractions (USA Standard Testing Sieves) and combined to provide a 50/50 blend were used in place of 30 grams of the Example 1 abrasive particles.

Grinding Performance of Examples 64–66 and Comparative Examples H–I

The grinding performance of Examples 64–66 and Comparative Examples H–I coated abrasive discs were evaluated as described above under the heading "Grinding Performance of Example 1 and Comparative Example A," except the length of the test was either 12 or 18 minutes and applied loads were 10.1 kg or 7.3 kg. Additionally, the metal type varied as shown in the below tables. The total cuts after 12 minutes at 10.1 kg, 12 minutes at 7.3 kg, 18 minutes at 10.1 kg, and 18 minutes at 7.3 kg on the various metals are reported in Tables 22, 23, and 24, respectively, below.

TABLE 22

| Metal | Comp. Ex. H | Comp. Ex. I | Example 64 | Example 65 | Example 66 |
|---|---|---|---|---|---|
| 1008 | 925 g | 638 g | 1142 g | 1079 g | 1209 g |
| 1012 | 1200 g | 1145 g | 1456 g | 1389 g | 1327 g |
| 1018 | 1126 g | 1093 g | 1442 g | 1424 g | 1402 g |
| 1035 | 1068 g | 1050 g | 840 g | 1007 g | 1018 g |
| 1045 | 895 g | 810 g | 317 g | 392 g | 491 g |
| 1095 | 802 g | 612 g | 55 g* | 136 g | 436 g |
| 4140 | 943 g | 950 g | 138 g** | 254 g*** | 626 g |
| M2 | 455 g | 479 g | 11 g**** | 89 g | 284 g |
| 304 ss | 243 g | 179 g | 134 g | 147 g | 178 g |

\* test stopped after 8 minutes due to a low cut rate of 2 g/min.
\*\* test stopped after 8 minutes due to a low cut rate of 3 g/min.
\*\*\* test stopped after 11 minutes due to a low cut rate of 1 g/min.
\*\*\*\* test stopped after 3 minutes due to a low cut rate of 1 g/min.

Figure 14:
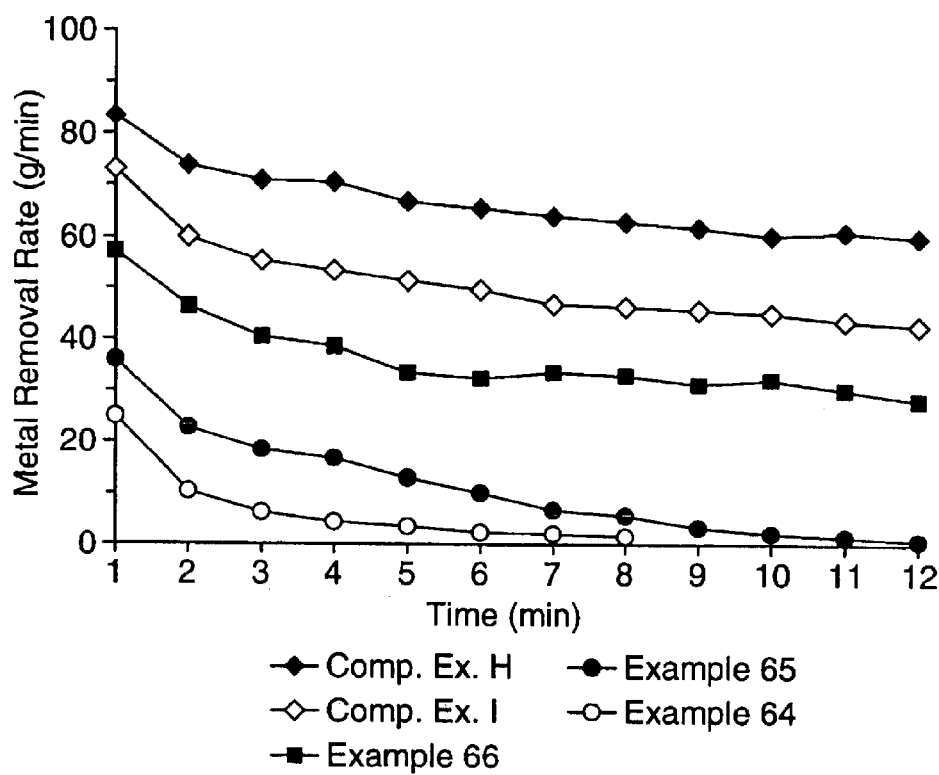
FIG. 14 is a graphical plot of Metal Removal Rate versus Time for abrasive discs of Examples 64–66, and Comparative Examples H and I on 1095 metal.
Figure 15:
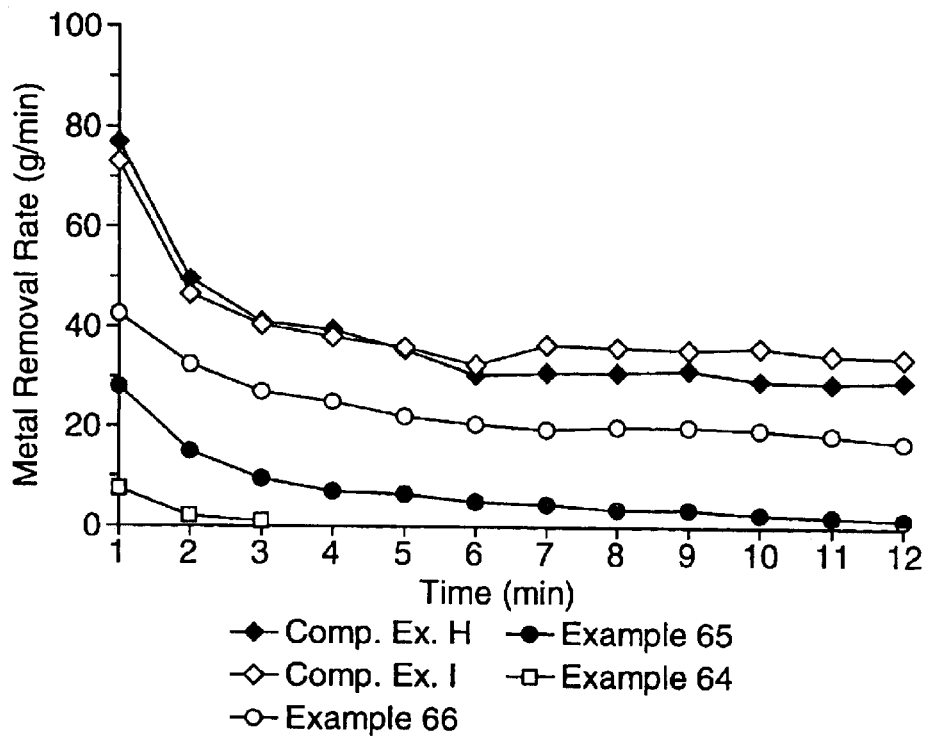
FIG. 15 is a graphical plot of Metal Removal Rate versus Time for abrasive discs of Examples 64–66, and Comparative Examples H and I on M2 metal.

Further, grinding data for the examples in Table 22 (above) is shown for 1095 and M2 metals in FIGS. 14 and 15, respectively.

TABLE 23

| Metal | Comp. Ex. H | Comp. Ex. I | Example 64 | Example 65 | Example 66 |
|---|---|---|---|---|---|
| 1008 | 595 g | 351 g | 932 g | 856 g | 873 g |
| 1012 | 1196 g | 858 g | 1010 g | 1194 g | 1125 g |
| 1018 | 1003 g | 848 g | 1031 g | 1068 g | 1014 g |
| 1035 | 817 g | 738 g | 550 g | 644 g | 661 g |
| 1045 | 650 g | 594 g | 220 g | 220 g | 342 g |
| 1095 | 558 g | 476 g | 35 g* | 100 g | 436 g |
| 4140 | 690 g | 683 g | 90 g | 168 g | 435 g |
| M2 | 377 g | 314 g | 3 g** | 19 g*** | 97 g |
| 304 ss | 143 g | 88 g | 50 g**** | 55 g**** | 88 g***** |

*test stopped after 7 minutes due to a low cut rate of 2 g/min.
**test stopped after 2 minutes due to a low cut rate of 1 g/min.
***test stopped after 5 minutes due to a low cut rate of 1 g/min.
****test stopped after 8 minutes due to a low cut rate of 1 g/min.
*****test stopped after 10 minutes due to a low cut rate of 1 g/min.

Figure 16:
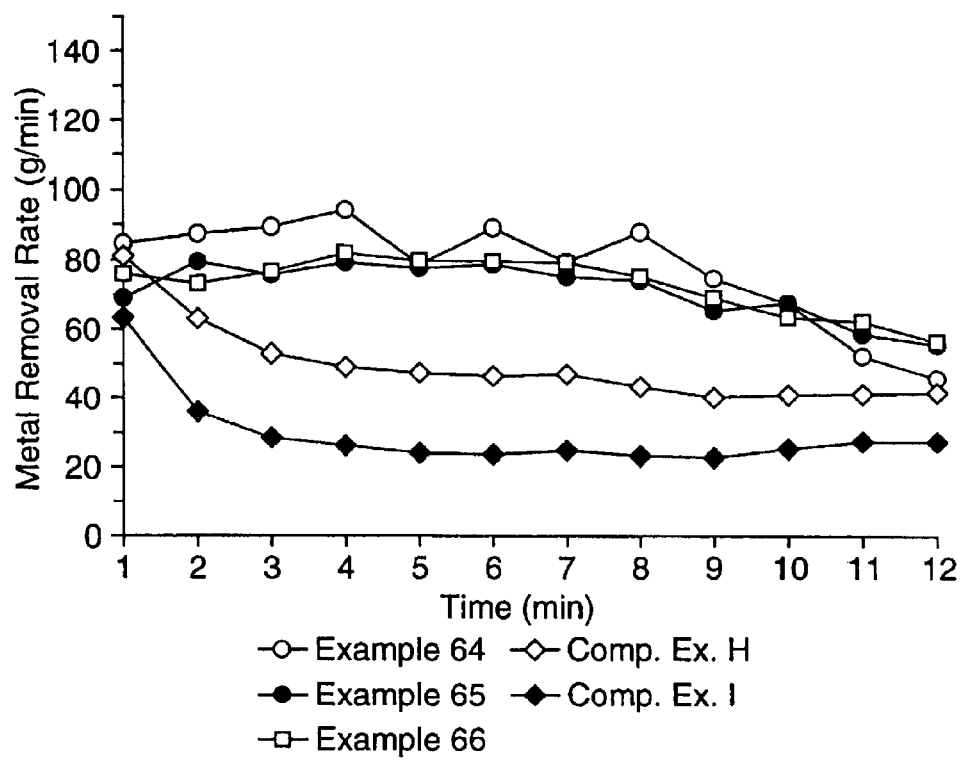
FIG. 16 is a graphical plot of Metal Removal Rate versus Time for abrasive discs of Examples 64–66, and Comparative Examples H and I on 1008 metal.

Further grinding data for the example in Table 23 (above) is shown for 1008 metal in FIG. 16.

TABLE 24

| Metal | Comp. Ex. H | Comp.Ex. I | Example 64 | Example 65 | Example 66 |
|---|---|---|---|---|---|
| 1008 | 1288 g | 888 g | 1221 g | 1149 g | 1354 g |
| 1012 | 1304 g | 1355 g | 1720 g | 1618 g | 1477 g |
| 1018 | 1363 g | 1326 g | 1998 g | 1866 g | 1730 g |
| 1035 | 1498 g | 1469 g | 1040 g | 1202 g | 1305 g |

Figure 17:
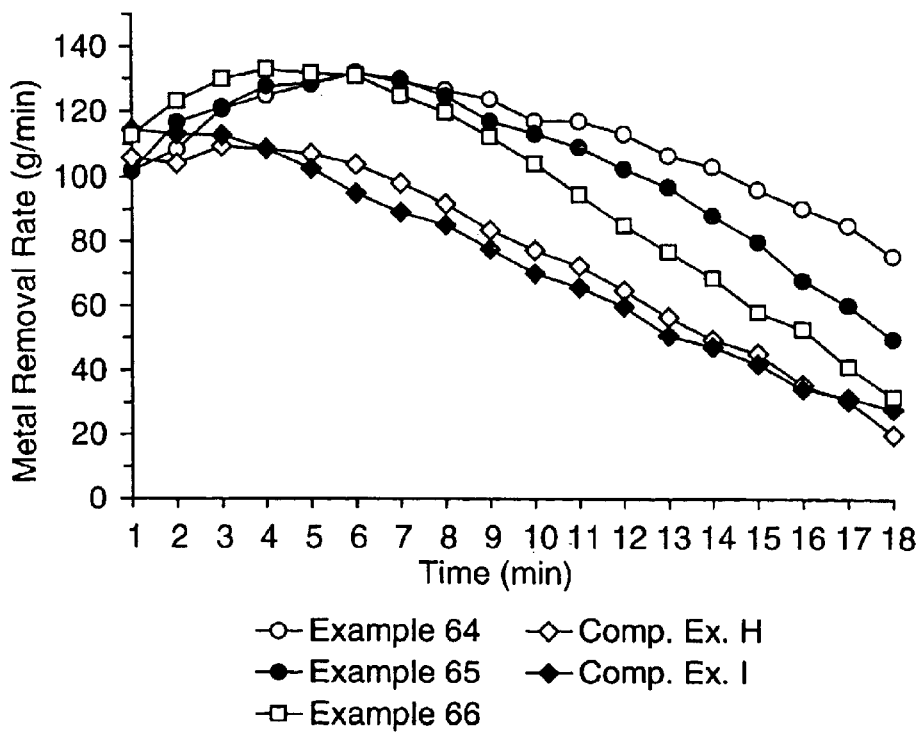
FIG. 17 is a graphical plot of Metal Removal Rate versus Time for abrasive discs of Examples 64–66, and Comparative Examples H and I on 1018 metal.

Further, grinding data for the example in Table 24 (above) is shown for 1018 metal in FIG. 17.

Grinding Performance of Example 64 and Comparative Example H

The grinding performance of Examples 64 and Comparative Example H coated abrasive discs were evaluated as described above under the heading "Grinding Performance of Example 1 and Comparative Example A," except the length of the test was 18 minutes and the applied load was 14.0 kg. The total cut after 12 and 18 minutes of grinding is reported in Table 25, below.

TABLE 25

| Example | 12 Min. total cut, g | 18 Min. Total cut, g |
|---|---|---|
| Comp. Ex. H | 1370 | 1522 |
| 64 | 1898 | 2654 |

Example 67

A 0.25 gallon (946 ml) polyurethane mill jar ("Abbethane Jar") was charged with 390.4 grams of yttria-stabilized zirconia powder ("HSY 3.0"), 97.6 grams of alumina powder ("APA 0.5"), 12.9 grams of lanthanum oxide powder (obtained from Molycorp, Inc., Brea, Calif.), 1.6 gram of ammonium hydrogen citrate powder (catalog #24,756-1), and 170.4 grams of distilled water. About 1100 grams of yttria-stabilized zirconia milling media (9.53 mm diameter; 95% zirconia; obtained from Tosoh Ceramics) were added to the mill jar, and the mixture milled for 48 hours to de-agglomerate and mix the powders.

Following milling, the slurry was dried as described in Example 2. The organic component was burned out of the flakes by heating them in air at 600° C. for 1 hour. The flakes were heated from room temperature to 600° C. at a heating rate of about 1° C./min., held at 600° C. for 1 hour, and then cooled to room temperature by turning off the power to the furnace.

About 250 grams of the burned-out flakes were sintered in air at 1475° C. for 2 hours using an electrically heated furnace ("Model KKSK-666-3100"). The flakes were heated to 1475° C. at about 20° C./min., held for 2 hours at 1475° C., and cooled to room temperature at about 20° C./min.

Figure 18:
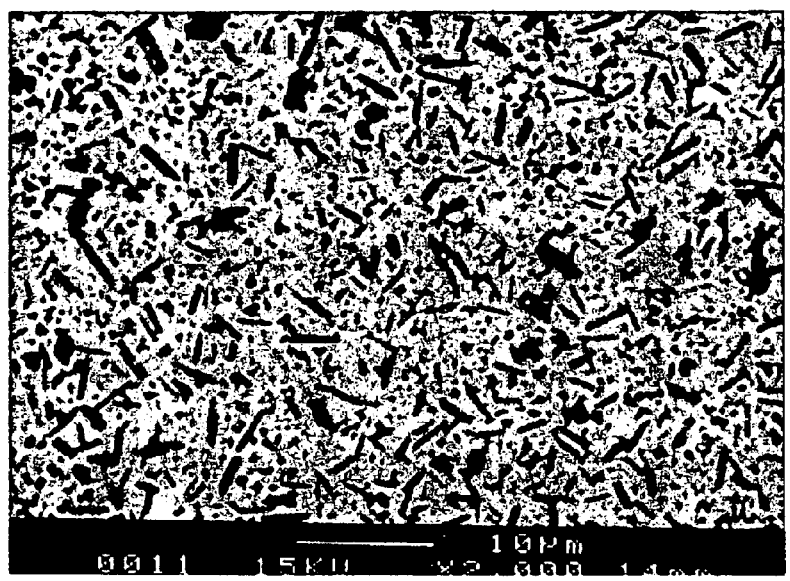
FIG. 18 is a scanning electron photomicrograph of a polished cross-section of Example 67 abrasive materials.

FIG. 18 is a digital image of a scanning electron microscope (SEM) micrograph of a polished surface of Example 67. The polished surface was prepared as described in Example 3 for microhardness testing. The polished surface was coated with a thin layer of carbon and viewed at an angle normal to the polished face using a scanning electron microscope (obtained under the designation "JEOL Model 840 SEM" from JEOL, Ltd. of Akishima, Japan) in the back-scattered electron imaging (BSEI) mode. Referring to FIG. 18, in addition to the dispersed $Al_2O_3$ phase (equiaxed/round and dark) and the zirconia (light phase), the microstructure contains a third phase (also dark), which was present in the shape of elongated rods/platelets. The small amount of the third phase precluded the direct phase determination by the x-ray technique used. Energy-dispersive x-ray analysis (EDAX) of this phase, however, suggests that it is β-hexaaluminate ($LaAl_{11}O_{18}$).

Example 68

Example 68 coated abrasive discs were prepared as described in Example 1, except 27 grams of Example 45 abrasive particles were used in place of the Example 1 abrasive particles.

Grinding Performance of Examples 67–68 and Comparative Example A

The grinding performance of Examples 67–68 and Comparative Example A coated abrasive discs were evaluated as described above under the heading "Grinding Performance of Example 1 and Comparative Example A," except the length of the test was 24 minutes and the applied load was 7.3 kg. The total cut after 12 and 24 minutes of grinding is reported in Table 26, below.

TABLE 26

| Example | 12 min. total cut, g | 24 min. Total cut, g |
|---|---|---|
| Comp. Ex. A | 986 | 1918 |
| 67 | 1155 | 2245 |
| 68 | 946 | 1817 |

Example 69

Example 69 was prepared as described for Example 54, except as follows. A 1.6 gallon (6054 ml) polyurethane mill jar ("Abbethane Jar") was charged with 3000 grams of yttria-stabilized zirconia powder ("HSY 3.0"), 9.0 grams of ammonium hydrogen citrate powder (catalog #24,756-1), and 900 grams of distilled water. About 3240 grams of yttria-stabilized zirconia milling media (9.53 mm diameter; 95% zirconia; obtained from Tosoh Ceramics) were added to the mill, and the mixture was milled for 54 hours to de-agglomerate and mill the powders.

Following milling, the slurry was dried and the flakes heated to 690° C. as described in Example 2. Flakes were then heat-treated in argon at 1140° C. for 1 hour using a controlled atmosphere furnace (Model No. HTG-7010, available from Astro Industries of Santa Barbara, Calif.). The flakes were heated from room temperature to 1140° C. at a heating rate of about 10° C./min., held at 1140° C. for 1 hour, cooled to 800° C. at a cooling rate of about 10° C./min., and then cooled to room temperature by turning off the power to the furnace.

Flakes were then crushed mechanically using a "Chipmunk" jaw crusher, as described in Example 53, and graded as described in Example 54 to produce particles. The resultant particles were then pre-sintered in argon at 1420° C. for 70 minutes using a controlled atmosphere furnace (Model No. HTG-7010). The particles were heated from room temperature to 1420° C. at a heating rate of about 10° C./min., held at 1420° for 70 minutes, cooled to 800° C. at a cooling rate of about 10° C./min., and then cooled to room temperature by turning off the power to the furnace. The particles were then HIPed as described in Example 54. The density of the resulting Example 69 articles was 6.07 g/cm$^3$, which was 100.3% of what was believed to be what was believed to be theoretical density.

Multiple batches of Example 69 abrasive particles were made to perform the belt grinding described below. Exact amount of various raw materials in these multiple batches varied by less than 0.5% from the standard amounts stated above. Processing temperatures varied by less than ±5° C. from the standard temperatures stated above.

Example 69 coated abrasive belts were prepared in the following manner. A "Grade 36" blend of mineral was produced by combining graded particles as shown in Table 27, below.

TABLE 27

| Mineral | Coarse + 32GG | Control – 32GG + 38GG | Fine – 38GG |
|---|---|---|---|
| 69 | 14% | 44% | 42% |
| Comp. Ex. J | 12% | 45% | 43% |
| Comp. Ex. K | 12% | 46% | 42% |
| Comp. Ex. L | 13% | 45% | 42% |

A phenolic make resin of the same composition as described in Example 1 was coated onto an 8.9 cm wide continuous YF cloth backing. The wet make resin weight was about 310 g/m$^2$. Immediately after the make coat was applied, the sintered abrasive particles were electrostatically coated onto the make coated cloth backing. The abrasive coating weight was about 1250 g/m$^2$. The make resin was precured for 120 minutes at 88° C. Then the cryolite-filled phenolic size coat was coated over the make coat and abrasive particles. The wet size weight was about 400 g/m$^2$. The size resin was cured for 12 hours at 99° C. The coated backing was converted into two different sized belts (6.35 cm.×96.5 cm and 7.6 cm×335.3 cm) using known methods. The coated abrasive belts were flexed prior to testing.

Comparative Example J

Comparative Example J coated abrasive belts were prepared as described in Example 69, except sol-gel derived abrasive particles ("321 CUBITRON") that had been graded as shown in Table 27 (above) and combined to make a "Grade 36" were used in place of the Example 69 abrasive particles. The abrasive coating weight was about 740 g/m$^2$.

Comparative Example K

Comparative Example K coated abrasive belts were prepared as described in Example 69, except sol-gel derived abrasive particles ("201 CUBITRON") that had been graded as shown in Table 27 (above) and combined to make a "Grade 36" were used in place of the Example 69 abrasive particles. The abrasive coating weight was about 720 g/m$^2$.

Comparative Example L

Comparative Example L coated abrasive belts were prepared as described in Example 69, except sol-gel derived abrasive particles ("222 CUBITRON") that had been graded as shown in Table 27 (above) and combined to make a "Grade 36" were used in place of the Example 69 abrasive particles. The abrasive coating weight was about 730 g/m$^2$.

Grinding Performance of Example 69 and Comparative Examples J–L

Figure 19:
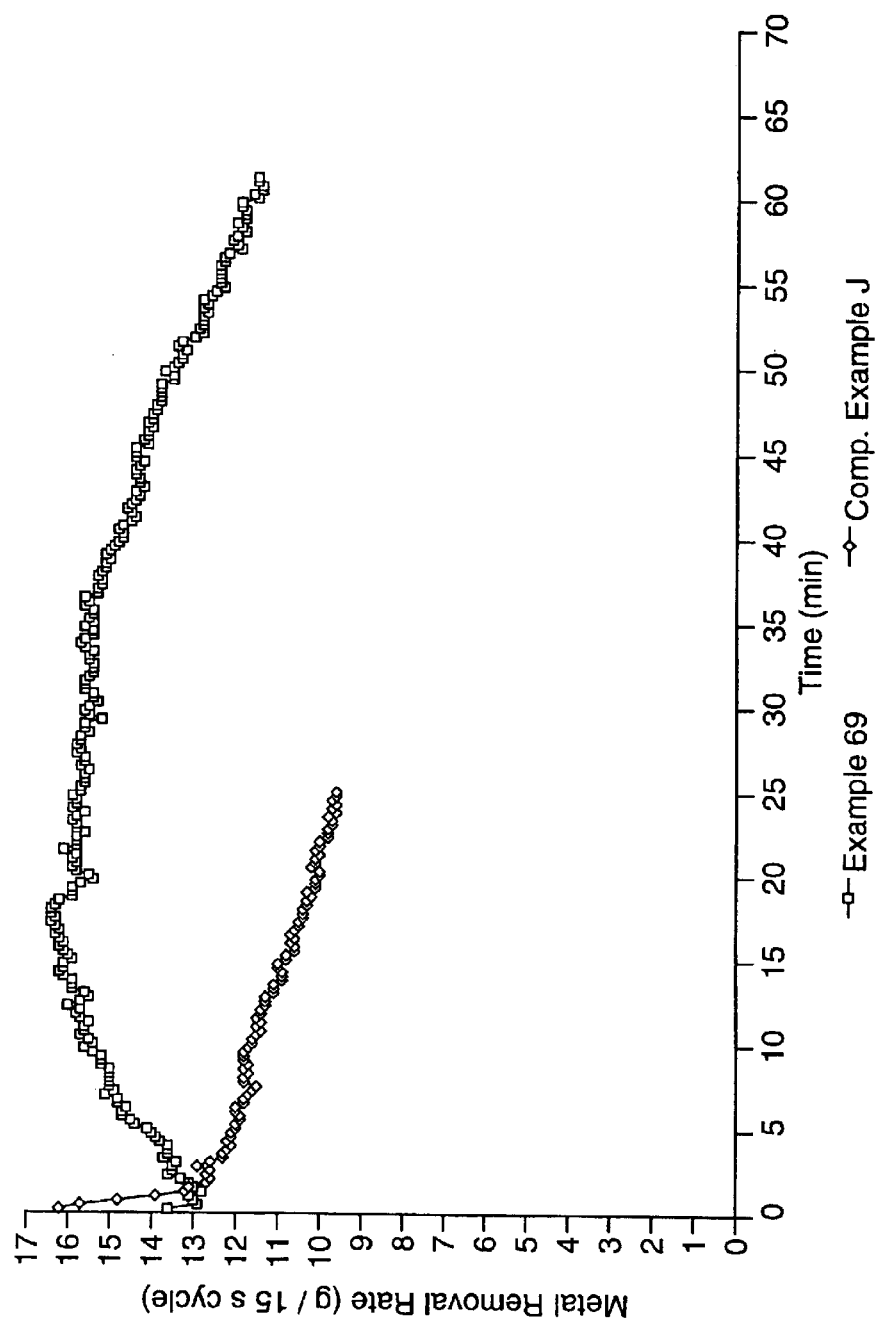
FIG. 19 is a graphical plot of Metal Removal Rate versus Time for abrasive belts of Example 69 and Comparative Example J.

The grinding performance of Example 69 and Comparative Examples J–L coated abrasive belts (6.35 cm.×96.5 cm) were evaluated using an abrasive belt grinder (Model #CFD60 available from Hammond Machinery of Kalamazoo, Mich.). 1018 mild steel workpieces, measuring 1.91 cm×1.91 cm×40.6 cm long, were ground in 15-second chamfer cycles utilizing a backup air pressure on the belt of about 47 psi (0.32 MPa) and a belt speed of about 1143 surface meters per min. Belts were ground until the per-cycle cut rate was 75% of their maximum sustained cut rate. Results are shown in Table 28 (below) and in FIG. 19.

TABLE 28

| Mineral | Maximum Sustained Cut Rate (g/15 sec cycle) | # of cycles to reach 75% of Max Sustained Cut Rate | Total cut, g |
|---|---|---|---|
| 69 | 16.2 | 230 | 3396 |
| Comp. Ex. J | 12.9 | 100 | 1126 |

The grinding performance of Examples 69 and Comparative Examples J–L coated abrasive belts (7.6 cm×335.3 cm) were evaluated on a Thompson Surface Grinder (Model # C12, available from Thompson Grinder Company, Springfield, Ohio). 1018 mild steel workpieces, measuring 1.26 cm by 17.8 cm×10.2 cm, were ground dry, utilizing a constant 12 mil (0.3048 mm) in-feed rate to an endpoint of about 1340 g (1 workpiece). The table speed was about 762 cm per minute, and the belt speed was about 1524 meters per minute. The 1340 gram endpoint normal pressure was measured, and the results are shown in Table 29, below.

TABLE 29

| Example | Endpoint Normal Pressure, MPa |
|---|---|
| 69 | 0.697 |
| Comp. Ex. J | 0.900 |
| Comp. Ex. K | 1.124 |
| Comp. Ex. L | 0.862 |

The lower the endpoint pressure, the better the belt performed.

Example 70

Example 70 was prepared as described in Example 69 except as follows. The abrasive grain was graded to a grade 80 by screening and blending 40 percent by weight −60+70 mesh, 40 percent by weight −70+80 mesh, and 20 percent by weight −80+100 mesh. The grade 80 abrasive particles were bonded to a 25.4 cm×45.7 cm section of C weight paper using an epoxy-acrylate make resin having the composition (40.7% by weight of a bisphenol-A epoxy resin having an epoxy equivalent wt. of 185–192, obtained under the trade designation "EPON 828" from Shell Chemical, Houston, Tex.; 0.6% by weight di-t-amyloxalate, obtained from the 3M Company, St. Paul, Minn.; 4.5% by weight TMPTA trimethylol propane triacrylate, obtained under the trade designation "SR351" from Sartomer Co., Exton, Pa.; 2.8% by weight 1,4-cyclohexanedimethanol, obtained under the trade designation "CHDM" from Eastman Chemical Company, Kingsport, Conn.; 29.5% by weight of a bisphenol-A epichlorohydrin based epoxy resin, epoxy equivalent wt. of 525–550, obtained under the trade designation "EPON 1001F" from Shell Chemical, Houston, Tex.; 20.3% by weight of a high molecular weight polyester, obtained under the trade designation "DYNAPOL S-1227" from Creanova, Piscataway, N.J.; 1.0% by weight 2,2-dimethoxy-1,2-diphenyl-1-ethanone, obtained under the trade designation "IRGACURE 651" from Ciba Geigy Company, Ardsley, N.Y.; and 0.6% by weight η-[xylenes (mixed isomers)]-η-cyclopentadienyliron(II)-hexafluoroantimonate, obtained from the 3M Company, St. Paul, Minn.).

The make resin was applied with a knife coater at 82° C. to provide a coating weight of about 25–30 g/m². The resin was then activated by passing once through a UV Processor, trade designation "EPIQ 6000", available from Fusion Systems Corp., Rockville, Md., with a Fusion D bulb at 79 watts/cm and 50 ft/min. (15.2 m/min.). The sintered zirconia abrasive particles were immediately electrostatically coated at about 345 g/m² and the sample thermally cured for 15 minutes at 127° C.

An epoxy-acrylate size resin having the following composition was roll coated over the make coat and abrasive particles at a wet coating weight of about 150 g/m²: 44.0% by weight of a cycloaliphatic epoxy resin, obtained under the trade designation "ERL 4221" from Dow Chemical, Midland, Mich.; 19.0% by weight trimethylol propane triacrylate, obtained under the trade designation "SR 351" from Sartomer Co., Exton, Pa.; 1.0% by weight photoinitiator, obtained under the trade designation "DAROCURE 1173" from Ciba Specialty Chemicals, Tarrytown, N.Y.; 3.0% by weight triaryl sulfonium hexafluoroantimonate, under the trade designation "UVI 6974" from Union Carbide Corp., Hahnville, La.; and 33.0% by weight anhydrous sodium potassium aluminosilicate filler, obtained under the trade designation "MINEX-3" from L.V. Lomas Ltd., Brampton, Ontario, Canada. The sample was irradiated by passing twice through the UV processor under the same conditions applied for the make coat, and then thermally cured for 15 minutes at 138° C. After sitting overnight at 23° C., the sample was flexed and then attached to a backing of pressure sensitive adhesive and converted to either 12.7 cm or 15.2 cm discs.

Comparative Example M

Comparative Example M coated abrasive discs were prepared as described in Example 70, except the abrasive grain was a sol-gel derived alumina-based abrasive grain, marketed under the trade designation "CUBITRON 222" by the 3M Company, screened and blended to grade 80. The abrasive coat weight was about 215 g/m².

Comparative Example N

Comparative Example N coated abrasive discs were prepared as described in Example 70, except the abrasive grain were blue fused alumina abrasive particles, available under the trade designation "FSX" from Treibacher Co., Villach, Austria, screened and blended to grade 80, were used in place of the sintered grade 80 zirconia particles. The abrasive coat weight was about 215 g/m².

Comparative Example O

Comparative Example O coated abrasive discs were prepared as described in Example 70, except the abrasive grain were silicon carbide abrasive particles, available from Washington Mills Co., Niagara Falls, N.Y., under the trade designation "SiC", screened and blended to grade 80, were used in place of the sintered zirconia particles. The abrasive coat weight was about 170 g/m².

Comparative Example P

Comparative Example P coated abrasive discs were prepared as described in Example 70, except the abrasive grain were fused alumina-zirconia abrasive particles, available from Norton Company, Worcester, Mass., under the trade designation "NZX", screened and blended to grade 80, were used in place of the sintered zirconia particles. The abrasive coat weight was about 240 g/m².

Comparative Example Q

Comparative Example P were P80 coated abrasive discs available under the trade designation "IMPERIAL"from the 3M Company, St. Paul, Minn.

12.7 cm. diameter circular specimens of Example 70 and Comparative Examples M–P were attached to a dual action sander, available from National Detroit, Inc., Rockford, Ill. The discs were dulled for 30 seconds on a panel section of 1018 steel using 80 psi (550 kPa) air pressure. Abrasion tests were then run for 2 minutes, in 30 second intervals, at a sander pressure of 80 psi (550 kPa), on black base coat/clear coat painted cold rolled steel panel workpieces (E-coat: ED5000; Primer: 764–204; Base coat: 542AB921; Clear coat: K8010A, purchased from ACT Laboratories, Inc., Hillsdale, Mich.). The sander was operated at an angle of 15° to the workpiece. The weight loss of the workpiece is listed as total cut in grams in Table 30, below.

TABLE 30

| Example | 2 minute total cut, g |
| --- | --- |
| Example 70 | 18.8 |
| Comp. Ex. M | 14.7 |
| Comp. Ex. N | 14.1 |
| Comp. Ex. O | 6.7 |
| Comp. Ex. P | 12.5 |

Further, 15.2 cm. diameter discs were evaluated as per the method used for the 12.7 cm. discs, except the pre-dulling step on 1018 steel was omitted, and the random orbital sander, (available from Hutchins Co., Pasadena, Calif.), was operated at an air pressure of 90 psi (619 kPa). Cut values are listed in Table 31, below.

TABLE 31

| Example | 2 minute total cut, g |
| --- | --- |
| Example 70 | 12.1 |
| Comp. Ex. Q | 8.9 |

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. An abrasive article comprising a binder and a plurality of abrasive particles, wherein at least a portion of the abrasive particles are abrasive particles comprising at least 65.0 percent by weight sintered, polycrystalline zirconia, based on a total weight of the abrasive particle; wherein said abrasive article is selected from the group consisting of coated abrasive articles, bonded abrasive articles, nonwoven abrasive articles, and abrasive brushes.

2. The abrasive article of claim 1, wherein the abrasive particles comprise at least 70.0 percent by weight sintered, polycrystalline zirconia, based on the total weight of the abrasive particle.

3. The abrasive article of claim 1, wherein the abrasive particles comprise at least 75.0 percent by weight sintered, polycrystalline zirconia, based on the total weight of the abrasive particle.

4. The abrasive article of claim 1, wherein the abrasive particles comprise at least 80.0 percent by weight sintered, polycrystalline zirconia, based on the total weight of the abrasive particle.

5. The abrasive article of claim 1, wherein the abrasive particles comprise at least 85.0 percent by weight sintered, polycrystalline zirconia, based on the total weight of the abrasive particle.

6. The abrasive article of claim 1, wherein the abrasive particles comprise at least 90.0 percent by weight sintered, polycrystalline zirconia, based on the total weight of the abrasive particle.

7. The abrasive article of claim 1, wherein the abrasive particles comprise sintered, polycrystalline zirconia that is at least partially stabilized.

8. The abrasive article of claim 7, wherein the abrasive particles further comprise a stabilizing metal oxide in an amount of up to about 14.0 percent by weight, based on the total weight of the abrasive particle.

9. The abrasive article of claim 8, wherein the abrasive particles comprise from about 86.0 to about 97.0 percent by weight of the sintered, polycrystalline zirconia; and further comprise from about 14.0 to about 3.0 percent by weight of the stabilizing metal oxide, based on the total weight of the abrasive particle.

10. The abrasive article of claim 7, wherein the abrasive particles comprise sintered, polycrystalline zirconia at least partially stabilized with a stabilizing metal oxide selected from the group consisting of calcium oxide, magnesium oxide, cerium oxide, yttrium oxide, gadolinium oxide, ytterbium oxide, neodymium oxide, terbium oxide, praseodymium oxide, dysprosium oxide, holmium oxide, samarium oxide, scandium oxide, lanthanum oxide, promethium oxide, europium oxide, erbium oxide, thulium oxide, lutetium oxide, titanium oxide, germanium oxide, iron oxide, copper oxide, zinc oxide, yttrium-niobium oxide, yttrium-tantalum oxide, and combinations thereof.

11. The abrasive article of claim 1, wherein the abrasive particles further comprise up to 40.0 percent by weight of at least one non-stabilizing metal oxides, based on the total weight of the abrasive particle.

12. The abrasive article of claim 1, wherein the abrasive particles further comprise up to 40.0 percent by weight of at least one metal oxide selected from the group consisting of aluminum oxide, hafnium oxide, silicon oxide, iron oxide, calcium oxide, sodium oxide, magnesium oxide, rare earth oxides, yttrium oxide, titanium oxide, nickel oxide, and combinations thereof.

13. The abrasive article of claim 1, wherein the abrasive particles further comprise up to 40.0 percent by weight of aluminum oxide, based on the total weight of the abrasive particle.

14. The abrasive article of claim 1, wherein the abrasive particles comprise at least 65.0 to about 97.0 percent by weight of the sintered, polycrystalline zirconia, and further comprise from 0 to about 37.0 weight percent aluminum oxide and from about 3.0 to about 8.0 weight percent of yttrium oxide, based on the total weight of the abrasive particle.

15. The abrasive article of claim 1, wherein the abrasive particles comprise at least 65.0 to about 97.0 percent by weight of the sintered, polycrystalline zirconia, and further comprise from about 3.0 to about 8.0 weight percent of stabilizing yttrium oxide, from 0 to about 37.0 weight percent of aluminum oxide, and from 0 to about 10.0 weight percent of a second, non-stabilizing metal oxide, based on the total weight of the abrasive particle.

16. The abrasive article of claim 15, wherein the second, non-stabilizing metal oxide comprises lanthanum oxide, cerium oxide, praseodymium oxide, neodymium oxide, samarium oxide, europium oxide, gadolinium oxide, or combinations thereof.

17. The abrasive article of claim 1, wherein at least 50.0 percent of the zirconia has a tetragonal crystalline structure.

18. The abrasive article of claim 17, wherein at least 80.0 percent of the zirconia has a tetragonal crystalline structure.

19. The abrasive article of claim 18, wherein at least 90.0 percent of the zirconia has a tetragonal crystalline structure.

20. The abrasive article of claim 1, wherein the zirconia has an average crystal size of less than about 3 micrometers.

21. The abrasive article of claim 1, wherein the zirconia has an average crystal size of less than about 1 micrometer.

22. The abrasive article of claim 1, wherein the zirconia has an average crystal size of not greater than 0.5 micrometer.

23. The abrasive article of claim 1, wherein the abrasive particles have a specific density of at least 95.0 percent of theoretical density.

24. An abrasive article comprising abrasive particles having a particle size distribution ranging from fine to coarse, wherein at least a portion of the abrasive particles are abrasive particles comprising at least 65.0 percent by weight sintered, polycrystalline zirconia, based on a total weight of a given abrasive particle, wherein said abrasive article is selected from the group consisting of coated abrasive articles, bonded abrasive articles, nonwoven abrasive articles, and abrasive brushes.

25. The abrasive article of claim 24, wherein the plurality of abrasive particles further comprises other abrasive particles.

26. An abrasive article comprising abrasive particles having a particle size distribution ranging from fine to coarse and a specified nominal grade, wherein at least a portion of the abrasive particles are abrasive particles comprising at least 65.0 percent by weight sintered, polycrystalline zirconia, based on a total weight of a given abrasive particle, wherein said abrasive article is selected from the group consisting of coated abrasive articles, bonded abrasive articles, nonwoven abrasive articles, and abrasive brushes.

27. The abrasive article according to claim 26 wherein said specified nominal grade of said abrasive particles is selected from the group consisting of ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600.

28. The abrasive article according to claim 26 wherein said specified nominal grade is selected from the group consisting of P16, P24, P36, P40, P50, P60, P80, P100, P120, P150, P180, P220, P320, P400, P500, P600, P800, P1000, and P1200.

29. The abrasive article according to claim 26 wherein said abrasive particles have a specified nominal grade selected from the group consisting of JIS16, JIS24, JIS36, JIS46, JIS54, JIS60, JIS80, JIS220, JIS240, JIS280, JIS320, JIS360, JIS400, JIS600, JIS1000, JIS1500, JIS2500, JIS4000, JIS6000, JIS8000, and JIS10,000.

30. An abrasive article comprising a backing, a binder, and a plurality of abrasive particles; wherein at least a portion of the abrasive particles are abrasive particles comprising at least 65.0 percent by weight sintered, polycrystalline zirconia, based on a total weight of a given abrasive particle.

31. The abrasive article of claim 1, wherein the article is a coated abrasive article, and further comprises a backing.

32. The abrasive article of claim 1, wherein the article is a bonded abrasive article.

33. The abrasive article of claim 1, wherein the article is a nonwoven abrasive article, and further comprises a nonwoven web.

34. The abrasive article of claim 1, wherein the article is a brush.

35. A method or abrading a surface, said method comprising:

contacting the abrasive article of claim 1 with a surface of a workpiece; and moving at least one of said abrasive article or said surface relative to the other to abrade at least a portion of said surface.

* * * * *